United States Patent [19]
Suzuki et al.

[11] Patent Number: 5,949,346
[45] Date of Patent: Sep. 7, 1999

[54] LIGHT-DRIVEN DISPLAY DEVICE

[75] Inventors: Akihiko Suzuki, Kagamigahara; Makoto Tamaki, Iwakura; Osamu Yamanaka, Aichi-ken; Tadanobu Iwasa; Hisao Yamaguchi, both of Ichinomiya; Kazuhiro Sakai, Gifu-ken; Takemasa Yasukawa; Akihiro Misawa, both of Ichinomiya; Hiroshi Sugihara, Ogaki, all of Japan

[73] Assignee: Toyoda Gosei Co., Ltd., Nishikasugai-gun, Japan

[21] Appl. No.: 08/660,711

[22] Filed: Jun. 7, 1996

[30] Foreign Application Priority Data

| Jun. 7, 1995 | [JP] | Japan | 7-140134 |
| Jun. 7, 1995 | [JP] | Japan | 7-140135 |
| Aug. 1, 1995 | [JP] | Japan | 7-196821 |
| Nov. 24, 1995 | [JP] | Japan | 7-305843 |
| Nov. 30, 1995 | [JP] | Japan | 7-311813 |
| Mar. 29, 1996 | [JP] | Japan | 8-075056 |
| Mar. 29, 1996 | [JP] | Japan | 8-075057 |
| Mar. 29, 1996 | [JP] | Japan | 8-075058 |

[51] Int. Cl.$^6$ ............................. G08B 5/22; B60Q 1/00
[52] U.S. Cl. .......................... 340/815.45; 340/815.42; 340/815.47; 340/815.78; 340/525; 340/461; 345/35; 345/39; 362/23; 362/26; 362/31; 362/32; 116/286; 116/288; 116/290
[58] Field of Search ............... 340/815.42, 815.45, 340/815.47, 815.78, 815.75, 525, 461, 462, 466; 362/23, 26, 29, 30, 31, 32, 800; 116/284, 290, 286, 287, 288; 345/35, 39, 46

[56] References Cited

U.S. PATENT DOCUMENTS

| 1,217,912 | 3/1917 | Bruns | 362/61 |
| 1,245,836 | 11/1917 | Waggoner | 362/337 |
| 1,323,684 | 12/1919 | Elliott | 362/331 |
| 1,839,022 | 12/1931 | Froget | 362/334 |

(List continued on next page.)

FOREIGN PATENT DOCUMENTS

| 0 029 638 | 6/1981 | European Pat. Off. . |
| 0 492 543 | 7/1992 | European Pat. Off. . |
| 0 503 400 A1 | 9/1992 | European Pat. Off. . |
| 0 521 339 | 1/1993 | European Pat. Off. . |
| 0 600 158 A1 | 8/1993 | European Pat. Off. . |
| 0 600 158 A1 | 6/1994 | European Pat. Off. . |
| 799 418 | 6/1936 | France . |
| 799 964 | 6/1936 | France . |
| 1 466 370 | 12/1966 | France . |
| 603 666 | 9/1934 | Germany . |
| 694291 | 7/1940 | Germany . |
| 16675 | 5/1955 | Germany . |
| 1 835 318 | 7/1961 | Germany . |
| 1 125 856 | 3/1962 | Germany . |
| 27 50 828 | 5/1979 | Germany . |
| 80 34 379 | 5/1982 | Germany . |
| 31 38154 A1 | 4/1983 | Germany . |
| 3500899 A1 | 7/1986 | Germany . |
| 3718439 A1 | 12/1988 | Germany . |
| 3904656 A1 | 8/1990 | Germany . |
| 4310605 A1 | 10/1993 | Germany . |
| 94 05 535 U | 10/1994 | Germany . |

(List continued on next page.)

OTHER PUBLICATIONS

Waitl, et al, "Hintergrund–beleuchtung mit LEDs," Elektronik, Jan. 1991 pp. 96–99.
Legende, "Head Up Display for Rolling Stock," Patents Abstracts of Japan, Jun. 21, 1993, vol. 17/No. 324.
*Patent Abstracts of Japan*, Section P:P–836, vol. 13, No. 89 & JP 62371229, Jan. 1997.

*Primary Examiner*—Donnie L. Crosland
*Attorney, Agent, or Firm*—Pillsbury Madison & Sutro LLP

[57] ABSTRACT

An LED display device has an indicator having a housing. The housing has at least one incident portion which receives light from at least one LED. The incident portion has a reflection surface at its inside surface. LEDs emit light from one side or one longitudinal end of the incident portion. A refraction plate may be provided to direct emission of the incident light for viewing by a user.

14 Claims, 53 Drawing Sheets

U.S. PATENT DOCUMENTS

| | | | |
|---|---|---|---|
| 1,944,154 | 1/1934 | Dickson | 340/815.76 |
| 2,003,804 | 6/1935 | Falge | 359/528 |
| 2,050,429 | 8/1936 | Dorey | 362/224 |
| 2,195,672 | 4/1940 | Gerrells | 362/24 |
| 2,328,329 | 8/1943 | Dickson . | |
| 2,818,500 | 12/1957 | Franck | 362/337 |
| 2,831,394 | 4/1958 | Heenan | 340/815.76 |
| 3,049,616 | 8/1962 | Davis | 362/330 |
| 3,064,378 | 11/1962 | Onksen | 40/204 |
| 3,093,324 | 6/1963 | Dobrikin | 362/337 |
| 3,179,796 | 4/1965 | Rolph | 362/339 |
| 3,204,093 | 8/1965 | Heenan | 362/310 |
| 3,262,224 | 7/1966 | Hardesty | 116/286 |
| 3,383,676 | 5/1968 | Nagel | 359/361 |
| 3,425,056 | 1/1969 | Dawson | 340/815.76 |
| 3,539,799 | 11/1970 | Dangauthier | 362/328 |
| 3,716,710 | 2/1973 | Clostermann | 362/339 |
| 3,740,119 | 6/1973 | Sakurai | 359/628 |
| 3,764,800 | 10/1973 | Clostermann | 362/330 |
| 3,921,569 | 11/1975 | Miller et al. | 116/286 |
| 4,045,794 | 8/1977 | Ohta | 340/461 |
| 4,115,843 | 9/1978 | Nagel | 362/291 |
| 4,118,763 | 10/1978 | Osteen | 362/339 |
| 4,177,505 | 12/1979 | Carel | 362/309 |
| 4,337,759 | 7/1982 | Popovich | 126/684 |
| 4,371,916 | 2/1983 | De Martino | 362/31 |
| 4,411,493 | 10/1983 | Miller | 359/595 |
| 4,470,011 | 9/1984 | Masuda | 324/166 |
| 4,497,860 | 2/1985 | Brady, Jr. | 428/156 |
| 4,498,733 | 2/1985 | Flanagan | 359/531 |
| 4,530,041 | 7/1985 | Yamai | 362/268 |
| 4,562,515 | 12/1985 | Lautzenheiser | 362/33 |
| 4,642,736 | 2/1987 | Masuzawa | 362/31 |
| 4,680,684 | 7/1987 | Wolber | 362/223 |
| 4,755,921 | 7/1988 | Nelson | 362/307 |
| 4,768,300 | 9/1988 | Rutili | 40/546 |
| 4,789,921 | 12/1988 | Aho | 362/348 |
| 4,799,137 | 1/1989 | Aho | 362/309 |
| 4,805,984 | 2/1989 | Cobb, Jr. | 385/133 |
| 4,823,246 | 4/1989 | Dilouya | 362/328 |
| 4,838,076 | 6/1989 | Ferrada | 73/489 |
| 4,984,144 | 1/1991 | Cobb, Jr. et al. | 362/339 |
| 5,084,698 | 1/1992 | Sell | 345/83 |
| 5,214,413 | 5/1993 | Okabayyashi et al. | 340/705 |
| 5,268,823 | 12/1993 | Yergenson | 362/32 |
| 5,269,187 | 12/1993 | Hanson | 340/416 |
| 5,276,591 | 1/1994 | Hegarty | 362/31 |
| 5,293,154 | 3/1994 | Ginzel et al. | 340/461 |
| 5,327,328 | 7/1994 | Simms et al. | 362/26 |
| 5,369,416 | 11/1994 | Haverty et al. | 345/39 |
| 5,529,014 | 6/1996 | Ohta et al. | 116/286 |
| 5,546,888 | 8/1996 | Skiver et al. | 116/286 |

FOREIGN PATENT DOCUMENTS

| | | |
|---|---|---|
| 52-10697 | 1/1977 | Japan . |
| 52-104142 | 9/1977 | Japan . |
| 54-66577 | 5/1979 | Japan . |
| 60-57388 | 4/1985 | Japan . |
| 60-140082 | 9/1985 | Japan . |
| 60-168185 | 11/1985 | Japan . |
| 60-187406 | 12/1985 | Japan . |
| 63-60487 | 3/1988 | Japan . |
| 5-256671 | 10/1993 | Japan . |
| 327 630 | 4/1930 | United Kingdom . |
| 400 029 | 10/1933 | United Kingdom . |
| 1021159 | 3/1966 | United Kingdom . |
| 1133367 | 11/1968 | United Kingdom . |
| 1507725 | 4/1978 | United Kingdom . |
| 2172733 | 9/1986 | United Kingdom . |
| 2254724 | 10/1992 | United Kingdom . |
| 2257812 | 1/1993 | United Kingdom . |
| 2268304 | 1/1994 | United Kingdom . |
| 22 76751 | 5/1994 | United Kingdom . |
| WO 88/04789 | 6/1988 | WIPO . |

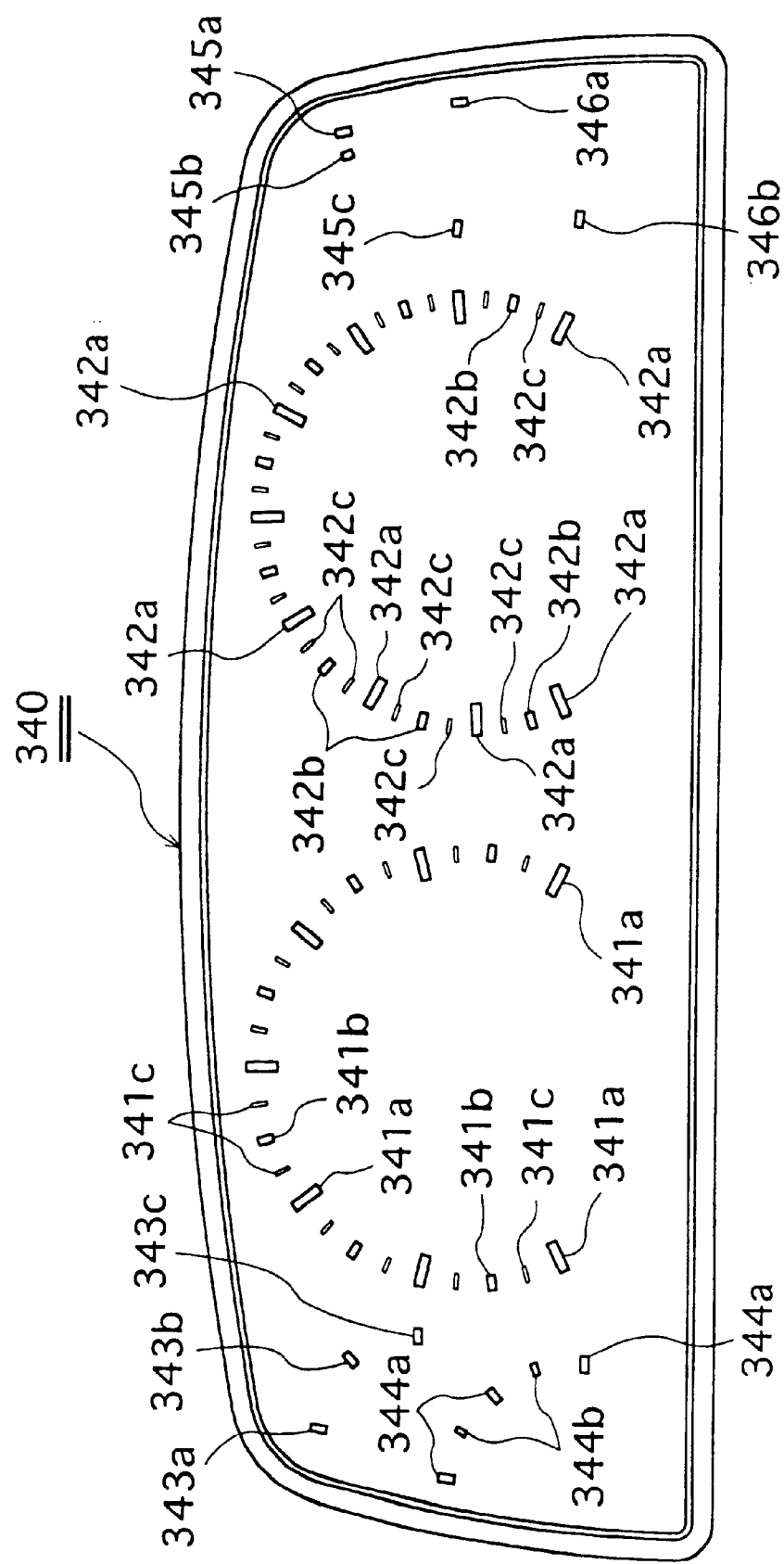

FIG.63a
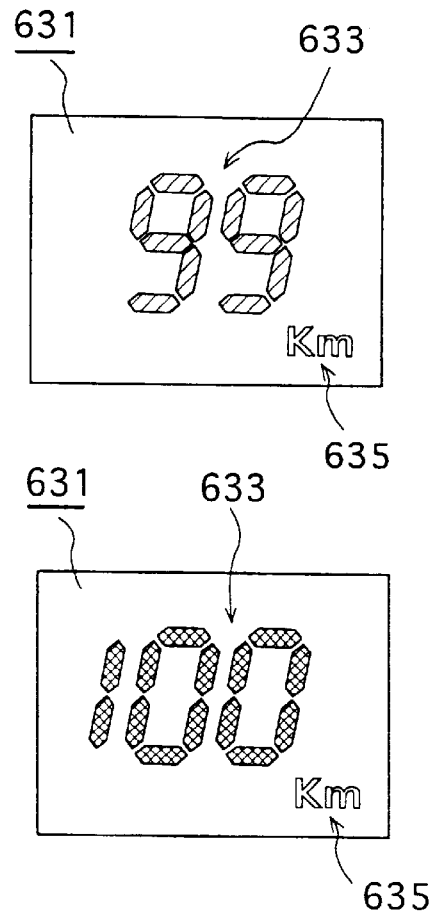
FIG.63b
FIG.64
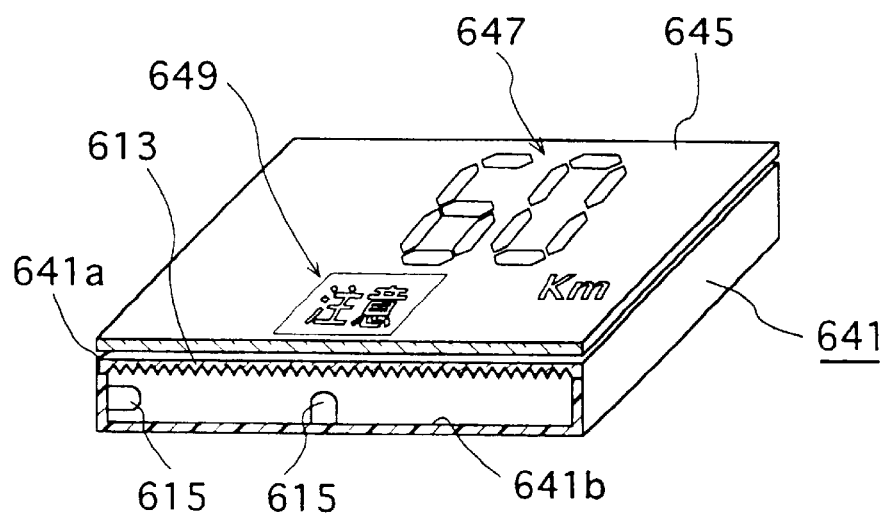

LIGHT-DRIVEN DISPLAY DEVICE

BACKGROUND OF THE INVENTION

RELATED APPLICATION DATA

The present disclosure is related to the disclosures provided in Japanese patent applications 7-140134, filed Jun. 7, 1995, 7-140135, filed Jun. 7, 1995, 7-196821, filed Aug. 1, 1995, 7-305843, filed Nov. 24, 1995, 7-311813, filed Nov. 30, 1995, 8-075056, filed Mar. 29, 1996, 8-075057, filed Mar. 29, 1996, and 8-075058, filed Mar. 29, 1996. The content of each and every one of these applications is hereby expressly incorporated by reference herein in its entirety.

FIELD OF THE INVENTION

This invention relates to a light-driven display device. More specifically, the present invention may comprise an LED display device which can be applied to a vehicle meter, such as a speed meter or a tachometer for cars. This invention can be especially applied to a vehicle meter having elements, such as a scale, pointer and dial and so on, which freely emit light in fixed colors using an LED, and a display which freely displays images such as an optional figure and so on using an LED. In addition, it can be also applied to a liquid crystal display which can display with liquid crystal having optional colors by using an LED having different color as a back light means.

DESCRIPTION OF THE RELATED ART

Commonly, a magnetic type speed meter is used for a conventional speed meter used in a vehicle. This speed meter comprises a dial, pointer and drive unit for displaying speed by rotating and driving the pointer. It displays speed per hour on the scale of the dial using the pointer.

On the other hand, a vehicle meter such as a speed meter, and so on, serves as part of the vehicle's interior in addition to conveying information about speed and so on. A vehicle meter occupies a main part of an instrument panel which attracts drivers' attention the most, and its design is important. Therefore, many kinds of attempts have been made to provide meters of a kind and disposition that caters to diversified tastes and sensitivities of present day users.

Moreover, it is preferable to dispose a vehicle meter such as a speed meter as distant as possible from the users' eyes while taking farsightedness into consideration.

However, due to complicated machinery and wearing of used mechanical parts, a conventional vehicle meter needs improvements in maintenance and display accuracy. In addition, its design is limited to one at manufactured time and it can not be changed according to the tastes of users. Moreover, a conventional design including as machinery constitutional parts comprised of a dial and a pointer can not correspond to various tastes of users and it needs improvement.

Furthermore, a conventional vehicle meter can not be thin type so that it needs space for a driving means and some depth for a meter panel. Therefore, freedom degree of design for a, meter panel become small and it also needs improvement at the point of design. In addition, on account of the same reason as the above, an interval between a vehicle meter and eyes position of users can not be large and it also needs improvement at the point of visibility while taking farsightedness of middle and old aged people into consideration.

In addition, one type of conventional display, displays images such as figures and so on using an LED. However, it displays images in dot by disposing an LED which can emit light of full color in the state of dot matrix and making the LED at fixed dot position emit light of fixed color.

However, such a display is limited in that reducing the dot size requires reducing the size of the LED composing each dot. Its picture quality needs improvement, e.g., by smoothing of outlines of images. In addition, this display requires the use of many LEDs which can emit full color light and productive cost should be also improved.

A warning lamp or the like may be arranged at a vehicle meter for notifying drivers of malfunctions of fixed parts through the sense of sight by lighting. However, area of a warning lamp on a meter panel is relatively small and even if the warning lamp is lit, it is difficult for a driver to see and recognize the warning while the driver looks forward through a windshield during driving. In addition, when a car exceeds 100 km per hour, a warning buzzer may let a driver know that the vehicle is above a set speed through the sense of hearing. Nevertheless, in case of the excess of setting speed on an ordinary road, there is no other way to recognize it for the driver except seeing a pointer of a speed meter and a scale of a dial.

A conventional liquid crystal display has been provided which uses color liquid crystal. However, this color liquid crystal display does not have enough brightness and does not comprise an LED display device which can display optional colors using LEDs of three primary colors comprising red, green and blue.

A conventional liquid crystal display needs improvement in its brightness as described above. On the other hand, a conventional LED display device needs improvement in production costs. Its production costs are high because it needs many LEDs, and wiring and other components must be provided for each LED.

SUMMARY OF THE INVENTION

The present invention is provided to improve upon display devices used in vehicles, such as vehicle meters. In order to achieve this end, one or more aspects of the invention may be followed in order to bring about one or more specific objects and advantages, such as those noted below.

A first object of the invention is to provide an improved LED display device which can be applied to a vehicle meter. The LED display device may be improved by reducing the number of mechanical parts, improving product quality such as durability, reliability and indication accuracy and so on, being formed as a thin type display device increasing the degree of design freedom, and/or enlarging an interval between eyes of users and the display device.

A second object of the invention is to provide a display device which can be applied to a vehicle meter and have peculiar design effect by using an LED.

A third object of the invention is to provide a display device which can be applied to a vehicle meter, have peculiar design effect by using an LED and simplify the constitution for it.

A fourth object of the invention is to provide an LED display device which can be applied to a vehicle meter, display desired images by using an LED and improve the picture quality.

A fifth object of the invention is to provide an LED display device which can be applied to a vehicle meter and give warning to drivers as the first information through the sense of sight promptly and surely by lighting or flashing on and off the whole dial, and other parts, which may be lit in fixed color.

A sixth object of the invention is to provide an LED display device which can be applied to a vehicle meter and freely change the color of a dial and other elements as desired according to tastes of users.

A seventh object of the invention is to provide an LED display device which can be applied to a vehicle meter and freely change the color of a dial and so on to a preferred color according to outside surroundings such as day and night and seasons.

An eighth object of the invention is to provide an LED display device which can be applied to a vehicle meter and control the change of brightness of a dial on a meter panel according to an amount of light incident on the meter panel.

A ninth object of the invention is to provide an LED display device which can be applied to a vehicle meter and confirm a current speed in relation to a speed limit of a road while driving the vehicle promptly and surely by comparing the values with each other.

A tenth object of the invention is to provide an LED display device whose peculiar design effect can be achieved and which can be more easily produced at a reduced cost.

An eleventh object of the invention is to provide an LED display device which can be applied to a vehicle meter and improve product quality such as visibility and so on by more efficiently using light from an LED.

A twelfth object of the invention is to provide an LED display device which can be applied to a liquid crystal display and indicate at a low cost and with an optional color and enough brightness.

An LED display device is provided according to one aspect of the invention comprises. An indicator has a photoconductor provided on a predetermined area so as to be able to display a fixed range of variable. An LED is disposed at such a position so as to emit light into the photoconductor. The photoconductor conducts an incident light from the LED to a front side of the indicator to emit the incident light outside therefrom. A pointer indicates a current value of the variable using light emitted from the photoconductor.

An LED display device is provided according to another aspect of the invention. An indicator is provided having a number of photoconductor pieces of elongate plate shape disposed side by side in a fixed direction. Incident means are provided having one or more LEDs arranged at one longitudinal end of each of the photoconductor pieces, emitting light into a respective photoconductor piece in its longitudinal direction. Deflection means are provided on one of the opposite sides in a thickness direction of the photoconductor piece, and deflect the light in the longitudinal direction of the photoconductor piece from the incident means toward the thickness direction of the photoconductor piece, thereby radiating the light in the thickness direction.

An LED display device is provided according to another aspect of the invention. A photoconductor plate is provided substantially having the shape of a sector plate of a predetermined angle or of a disc plate. Incident means having an LED are disposed opposite to the photoconductor plate so as to emit light thereinto. A slitted disc overlaps and is joined to the photoconductor plate so as to be relatively rotatable. The slitted disc has a slit that extends radially so as to transmit the light from the photoconductor plate therethrough.

An LED display device is provided according to another aspect of the invention. A monochrome LCD element is provided having fixed LC shutters. A backlight is arranged at a rear side of the monochrome LCD element, and includes an LED capable of emitting different colors.

BRIEF DESCRIPTION OF THE DRAWINGS

FIG. 38 is a front view of a cover lens used in the LED display device in the thirteenth embodiment of the invention.

FIG. 63a is a plan view showing a speed indication of a speed meter in a normal mode as an LED display device in a twenty-third embodiment of the invention.

FIG. 63b is a plan view showing the speed indication of the speed meter in a warning mode in the twenty-third embodiment of the invention.

FIG. 64 is a perspective view showing a speed meter as an LED display device in a twenty-fourth embodiment of the invention.

DESCRIPTION OF THE EXEMPLARY EMBODIMENTS

Figure 1:
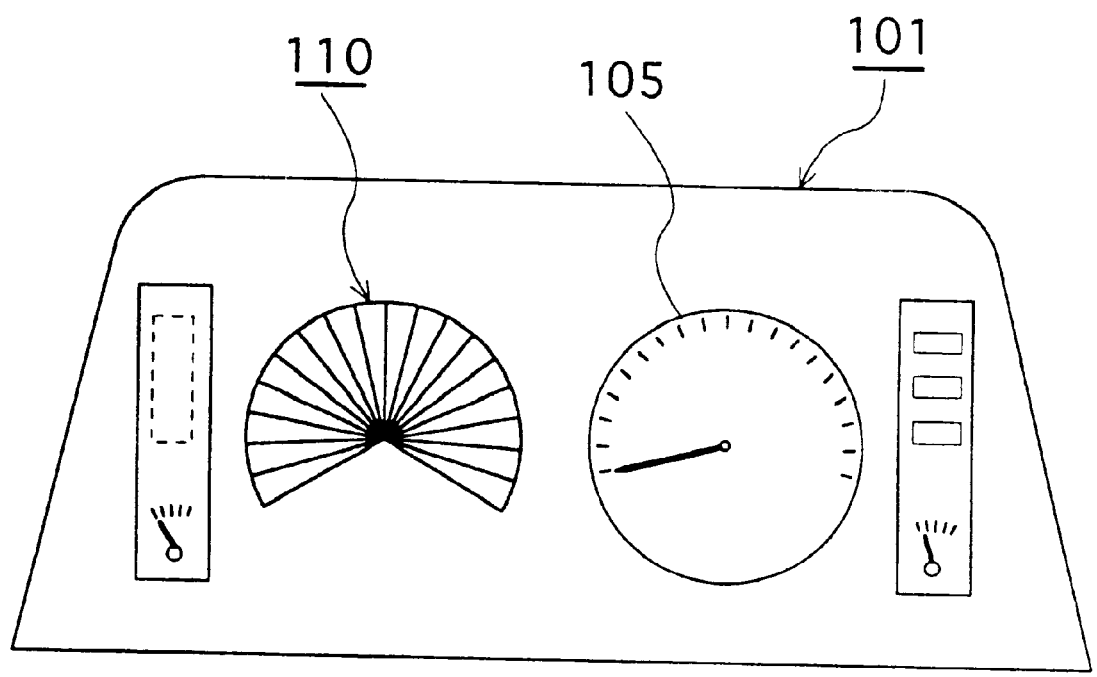
FIG. 1 is a front view showing a whole car meter to which an LED display device is applied in a first embodiment of the invention.

Various kinds of embodiments of the present invention will now be described. In each embodiment, the same or corresponding reference symbols or reference numerals are used for the same or corresponding elements.

FIG. 1 to FIG. 6 show a vehicle meter as an LED display device in a first embodiment.

Figure 2:
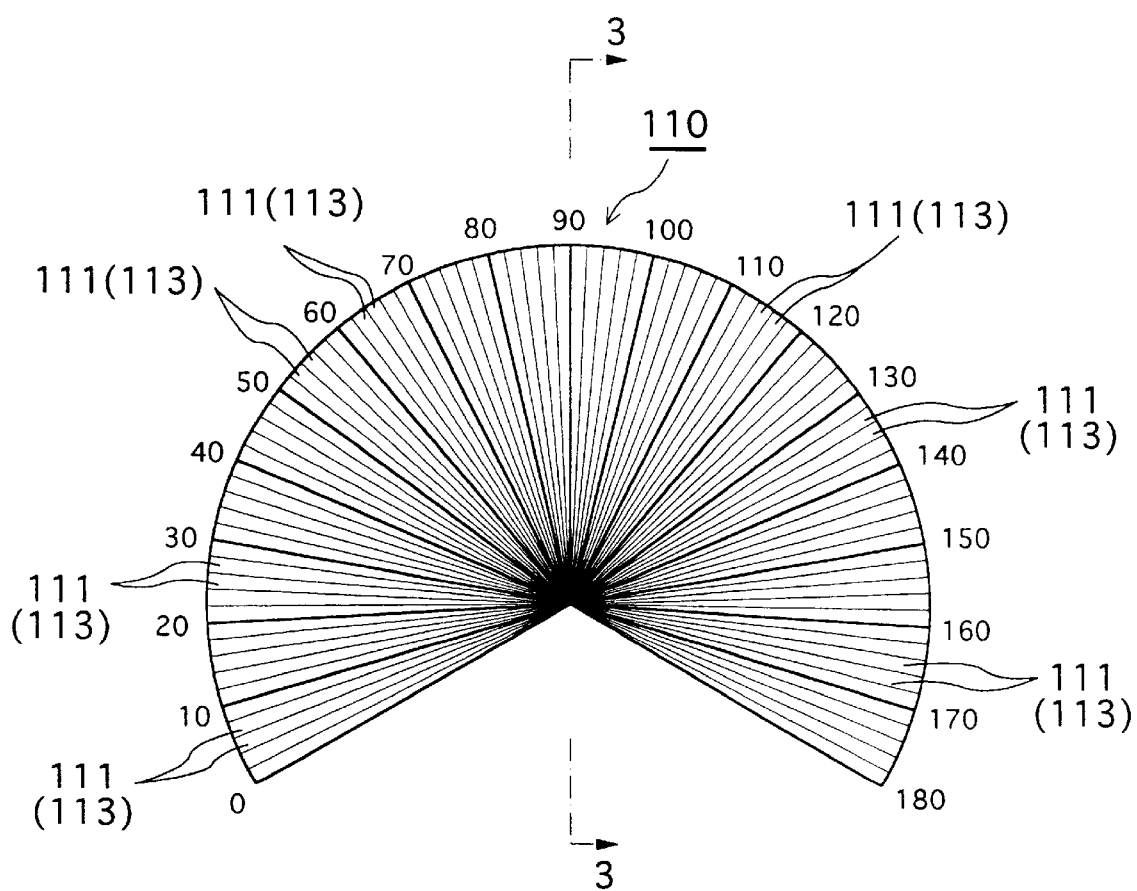
FIG. 2 is a plan view showing a speed meter as the LED display device in the first embodiment of the invention.
Figure 3:
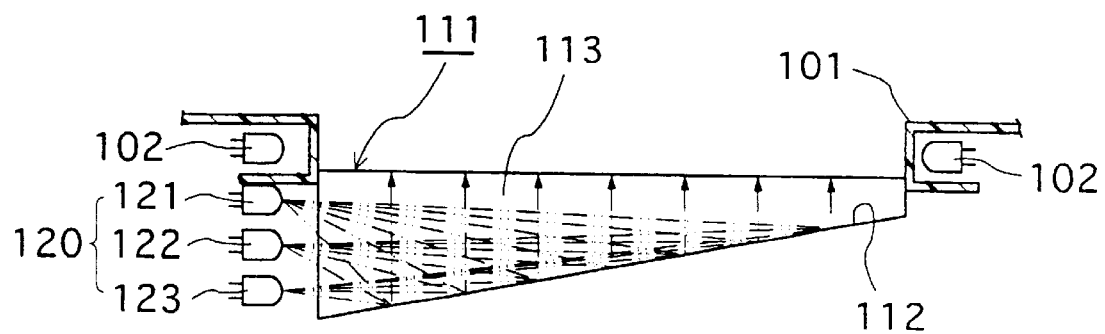
FIG. 3 is an end view taken along the line 3—3 in FIG. 2.

In FIG. 1 and FIG. 2, a vehicle meter in the present embodiment is embodied in a meter panel 101 which may include items such as a speed meter, tachometer, fuel gauge and water temperature gauge. The particular illustrated vehicle meter is embodied in a speed meter of analog type. This speed meter has an indicator 110, at a fixed position of the meter panel 101, of substantially planar sector shape whose central angle is about 240 degrees. It is formed by joining plural radially extending photoconductor pieces 111 within a common plane. Scale numbers "0, 10, 20, . . . , 180" indicating various speeds are engraved at the periphery of the indicator 110. An LED 102 for emitting light in fixed color is disposed (see FIG. 3) for lighting around the indicator 110. In the illustrated embodiment, it is also effective to use an LED which emits ultraviolet or near ultraviolet rays and so on, and to make the number indicating a speed ultraviolet in color instead of the LED 102 for emitting visible ray. The indicator 110 indicates in the same way as analog indication of a tachometer 105 on the meter panel 101.

The photoconductor piece 111 is made of a photoconductor such as an acrylic board or the like and has a substantially sector shape. Its thickness is larger at the periphery and deceases towards the center (right side in FIG. 3). A reflection surface 112 treated with a coating to have a white surface is provided to a back surface of the photoconductor piece 111 (the lower side in FIG. 3). It is also possible to set the reflection angle of the reflection surface 112 so as to reflect incident light from the periphery of the photoconductor piece 111 without white coating treatment. Each photoconductor piece 111 has a long and narrow triangular planar shape, formed by dividing the indicator 110 in the circumference direction at fixed intervals of equal angle. Many photoconductor pieces 111 comprise the indicator 110, and are disposed closely along a common plane. They are integrally formed at the upper surface side of indicator 110. Each photoconductor piece 111 comprises a pointer 113 of a speed meter in the first embodiment. In the first embodiment, each pointer 113 indicates 2 km per hour by dividing a speed display scale respectively indicating 10 km per hour into five.

Moreover, a red LED 121, a green LED 122 and a blue LED 123 are disposed one by one in the thickness direction (i.e., along a direction extending orthogonally below the upper surface of indicator 110) at the periphery of each photoconductor piece 111. Namely, they are each at the position facing the periphery of each pointer 113 and they can emit light into the photoconductor piece 111 of each pointer 113. An LED unit 120 in the present embodiment is comprised of a set of LEDs, including red LED 121, green LED 122 and blue LED 123, each being disposed so as to face toward a corresponding pointer 113. Emission of light is controlled under a driver 131, described hereafter (Ref. to FIG. 5), through the selection of an LED 121, 122 and 123 having fixed color of the LED unit 120. By these mechanisms, the LED unit 120 is lit to a desired color and light enters into the corresponding photoconductor piece 111 of the pointer 113. Then, light of a desired color which goes out from the LED unit 120 travels from the periphery side of the corresponding pointer 113 to the center side along the photoconductor piece 111 and goes out to the front surface side by being reflected by the reflection surface 112. In this manner, a driver can recognize it as light in specific color.

Figure 4:
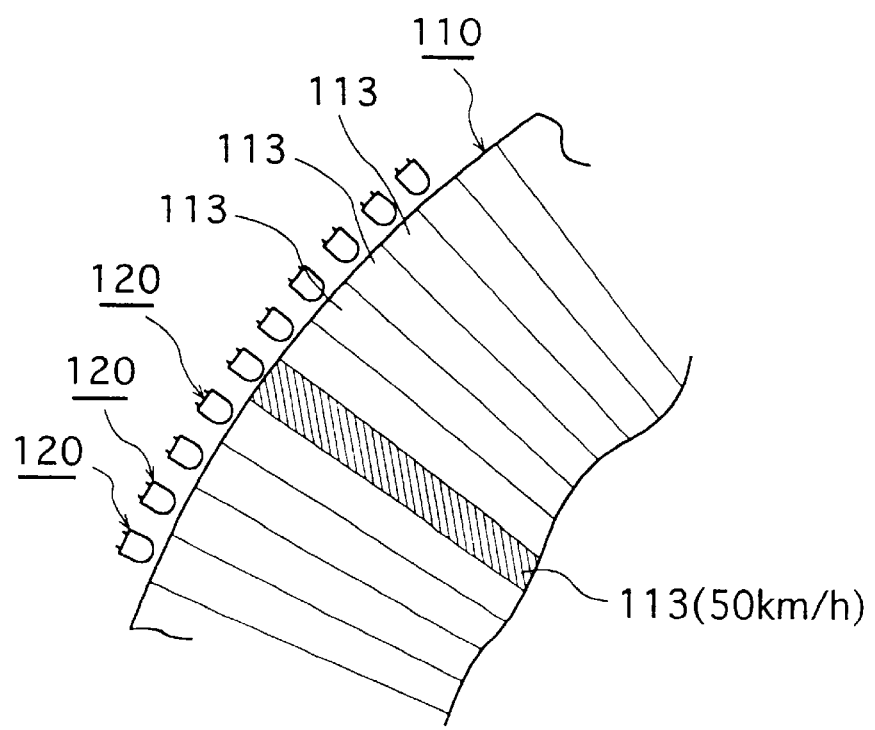
FIG. 4 is an enlarged plan view of the speed meter in FIG. 2.

As shown in FIG. 4, a separate LED unit 120 is disposed facing a corresponding photoconductor piece 111. Therefore, the LED units 120, which each comprise LEDs 121, 122 and 123 respectively having red, green and blue colors are provided in equal number to the number of pointers 113 in the direction of the periphery of the indicator 110, or the photoconductor piece 111 and they constitute a group of the red LED 121, a group of the green LED 122 and a group of the blue LED 123. Then, as described above, speed is indicated by lighting each LED unit 120 and one of the pointers 113 selectively. FIG. 4 shows the state that the pointer 113 at 50 km per hour is lit.

Next, the electrical components and the operation of a speed meter as a vehicle meter in the first embodiment will be described referring to FIG. 5 and FIG. 6.

A control unit 135 serves as a control means for controlling emitting. It may comprise, among other elements, a microcomputer having a CPU, a ROM and a RAM. It is used for controlling a speed indication by the pointer 113. The control unit 135 is used for executing a program, for example, as shown in FIG. 6, as a part of the circuit shown in FIG. 5.

Figure 5:
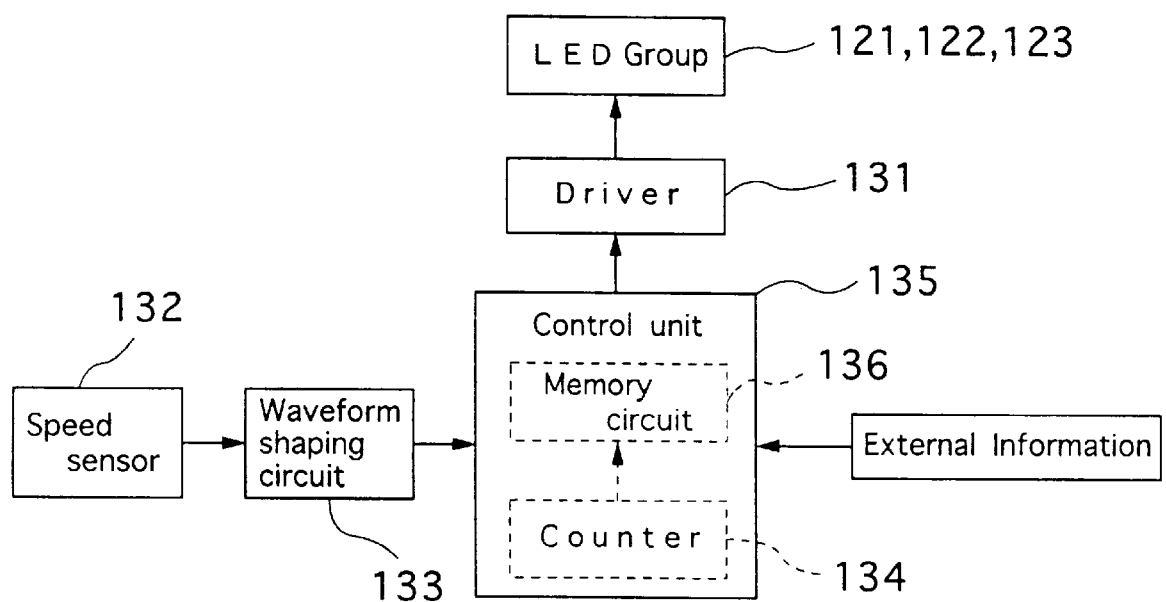
FIG. 5 is a block diagram showing a circuit constitution of the whole speed meter in the first embodiment of the invention.

In FIG. 5, a detecting signal from a speed sensor 132 is input into a counter 134 of the control unit 135 through a waveform shaping circuit 133 and it is calculated per fixed time. The calculated value is stored in a memory circuit 136. The recorded information is input into the driver 131, and used for controlling the emitting of each of LEDs 121, 122 and 123 of each LED unit 120 by the driver 131.

In the first embodiment, the control means comprises the driver 131, speed sensor 132, waveform shaping circuit 133 and control unit 135.

The flowchart of FIG. 6 will now be described.

If a rise in a signal from the speed sensor 132 is detected in step S1, a gate circuit (not shown) is opened, a speed signal is transmitted to the counter 134 through the waveform shaping circuit 133 and calculation is begun by the counter 134 in step S2. Then, if a measuring time which is previously set passes in step S3, the gate circuit is closed and the calculation operation performed by the counter 134 is stopped in step S4. Next, count data V2 of the counter 134 is compared with stored data V1 which is current speed data in step S5. If the subtraction V1–V2 is 2 km per hour or more, the count data V2 is transmitted to the driver 131 in step S6. On the basis of this new count data V2, the driver 131 changes speed indication by the LED unit 120 in step S7. Namely, on the speed meter, the LED unit 120 corresponding to the pointer 113 indicating just before speed is turned off, the angle position of the pointer 113 corresponding to the speed of the count data V2 is calculated and the LED unit 120 corresponding to the pointer 113 is newly lit. The color of light emitted by the LED unit 120 for indicating speed can be a single color such as red, green or blue, or it can be a color obtained by mixing them. Then, in step S8, the count data V2 is stored into the memory circuit 136 and it becomes the stored data V1. The counter 134 is cleared by the control unit 135 in step S9. These operations from step S1 to step S9 are repeated.

Figure 6:
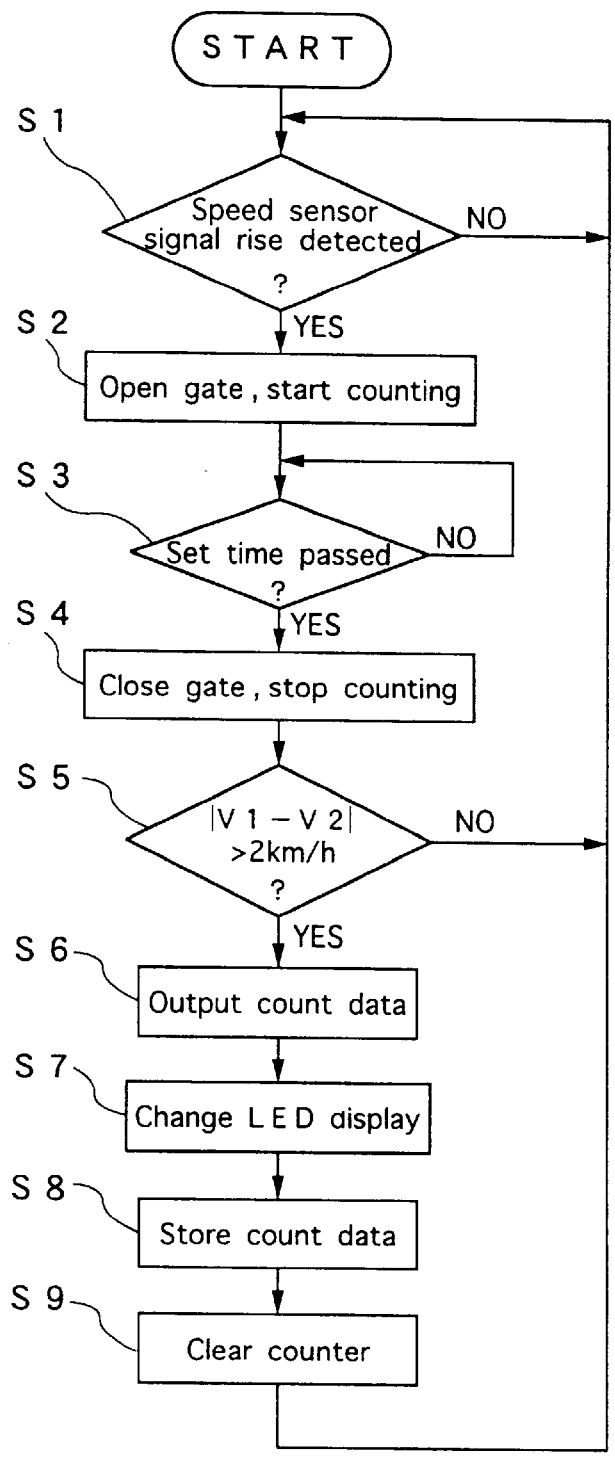
FIG. 6 is a flowchart showing the whole operation of the speed meter in the first embodiment of the invention.

The operation illustrated in the flowchart of FIG. 6 is generally similar to the control operation of a conventional speed meter, except for the indication control of the pointer 113 using the LEDs 121, 122 and 123 by the driver 131. In addition, in the above control operation of the speed indication, only the unit LED 120 corresponding to the pointer 113 for indicating speed emits light and only the pointer 113 emits light and is lit in fixed color. However, it is effective that the whole LED unit 120 emits light in balanced color with the color of the pointer 113 at the point of sight, for example, in white and the whole indicator 110 is lit in the color so that the contrast between the whole indicator 110 and the pointer 113 on indicating speed should be clear. Moreover, it is also effective to use another control means so that a signal for indicating speed can be input into the control unit 135. In addition, the LED unit 120 may comprise not three colors, red, green and blue of the LED 121, 122 and 123, facing pointer 113 as described above, but it may comprise only one color of the LED 121, 122 or 123. However, if the LED unit 120 comprises two or three colors of the LED 121, 122 and 123, it is possible to select various emission colors for the pointer 113 and to increase design flexibility.

Furthermore, outside information, for example, abnormal and/or warning information may be input and conveyed to the driver in some manner (e.g., with LEDs 102 and/or one or more of LEDs 121, 122, and 123). Such information may be an operational malfunction at a specified part of a vehicle and unusual approach to obstacles. The whole of the indicator 110, except for the corresponding pointer 113 or the pointer 113 indicating the vehicle speed, may be lit in fixed color in order to superimpose the outside information on the speed information represented by a particular pointer 113. In this manner, the outside information can be indicated on a speed meter and attract the driver's attention the most during driving. Accordingly, it is possible to give warning to drivers and so on effectively.

In the first embodiment, the light emitted from the LED unit 120 enters into the photoconductor piece 111 of the corresponding pointer 113. It is led from the photoconductor piece 111 to the reflection surface 112 and reflected to a front surface of the indicator 110 by the reflection surface 112, and the corresponding pointer 113 is lit. Therefore, a fixed value of a variable is indicated.

In the first embodiment, the indicator 110 indicates a variable (e.g., vehicle speed) by denoting the variable's current value. When the variable varies with time, the indicator 110 may indicate the transition of the variable from a previous (now changed) value to a current value. A change of a variable can be represented by the number of the emitting pointers 113, namely, by the change of emitting area of the indicator 110. For example, in case of a speed meter, a whole range of pointers 113 from the one at 0 km to the one at the current speed may emit light and the change of the central angle of the whole emitting pointer 113 represents the change of speed. In the alternative, only one pointer 113 comprising a single pointer 113 at the current speed may emit light, while the change of the central angle extending from 0 km to the pointer 113 emitting light represents a change in vehicle speed. In another way, only one pointer 113 at the position corresponding to the current value may emit light, while one pointer 113 at another position corresponding to the previous (now changed) value emits light. In another way, the whole indicator 110 may be lit up until a pointer 113 corresponding to the current value, and the color of the one pointer 113 at previous value is changed.

Therefore, drivers can recognize speed as a variable by viewing the pointer 113 emitting light at a fixed angle position on the indicator 110. Accordingly, conventional machinery parts such as a pointer and a driving means for the pointer are unnecessary. As a result, the need for conventional machinery parts can be reduced and product quality such as durability, reliability and indication accuracy and so on can be improved. In addition, it is possible to shorten the depth size of the speed meter because of the reduction in size or elimination of the pointer and the driving means, thus making the product thinner and enlarging the degree of freedom in design. Moreover, the spatial interval between a speed meter and the driver's eyes can be enlarged.

In the first embodiment, when the indicator is used as a speed meter, the control means causes the LED unit 120, facing the photoconductor piece 111 at the fixed angle position to emit light of a fixed color according to the vehicle (e.g., car) speed as a variable. When it is used as another type of vehicle meter such as a tachometer or a fuel gauge, the constitution of the control means is changed according to the variable being indicated. In addition, the LED display device of the illustrated embodiment can be applied to meters used for indicating other variables.

In the first embodiment, the LED unit 120 comprises the LEDs 121, 122 and 123 having three primary colors, red, green and blue, so that the photoconductor piece 111 and the pointer 113 can be illuminated in optional colors and so that variables are represented in various modes by using optional colors. In addition, other plural information can be superimposed on the information about variables.

The LED unit 120 may comprise an LED of a single color. However, in case the LED unit 120 comprises LEDs of two or more optional colors, a variable can be represented by one of the plural colors or by a mixture of them.

In the illustrated first embodiment, the indicator 110 comprises a plurality of wedge-shaped photoconductor pieces 111 joined in the shape of a fan. Each photoconductor piece 111 has a left adjoining side surface and a right adjoining side surface. It is possible to provide a reflection film coating to the right and left adjoining side surfaces of each photoconductor piece 111. By providing this film, only the specific desired photoconductor piece 111 will emit clearly, and it is possible to prevent light from spreading to the next photoconductor piece 111. In the illustrated embodiment the photoconductor pieces 111 are joined to each other continuously in the circumference direction; accordingly, the reflection film can be provided to either the right or left adjoining side surface of the photoconductor piece 111. However, it is not necessary to provide a reflection film coating to the right or left adjoining side surfaces, or to the lower reflection surface 112 of the photoconductor piece 111. Even if no coating is provided to these surfaces, it is possible to reflect light from the LED unit 120 totally by properly setting the refractive index.

In the first embodiment, the indicator 110 is a sector whose central angle is 240 degrees. A planar photoconductor piece of substantial rectangular shape may be used, for example, instead of the planar photoconductor piece 111 of substantial triangle shape. If such rectangular photoconductor pieces are used, an indicator can be formed into a rectangular shape like a bar graph.

Namely, in a modification to the first embodiment, a photoconductor piece may be constituted by a planar photoconductor of substantial rectangular shape. The thickness of the piece at one end in the longitudinal direction is thinner than that at the other end, and its lower surface is formed into a reflection surface. Then, the LED unit 120 is disposed corresponding to the one end of each photoconductor piece. The photoconductor pieces are joined to each other while being disposed closely in the plane direction.

This kind of modification is as effective as that of the first embodiment; variables can be represented with substantially straight line shapes arranged in the form of a bar graph. In this case, the variable can be also represented by a combined number of emitting photoconductor pieces, namely, by a total emitting area on the indicator, or by the emission of only the one photoconductor piece located at a point corresponding to the variable's present value. The previous (recently changed) value may also be indicated contemporaneously with the current value indication by emitting light from a photoconductor piece at the previous value. In addition, the same control means as that of the first embodiment may be provided to cause an LED facing a photoconductor piece at a fixed point emit light according to speed. Moreover, in the same way as the first embodiment, an LED unit which enters light into a photoconductor piece can be comprised of LEDs of two or more colors, for example, three primary colors, red, green and blue. Furthermore, in the same way as described above, a reflection film coating can be provided to right and/or left adjoining side surfaces of each photoconductor piece.

FIG. 7 to FIG. 10 show a vehicle meter as an LED display device in a second embodiment of the invention.

Figure 7:
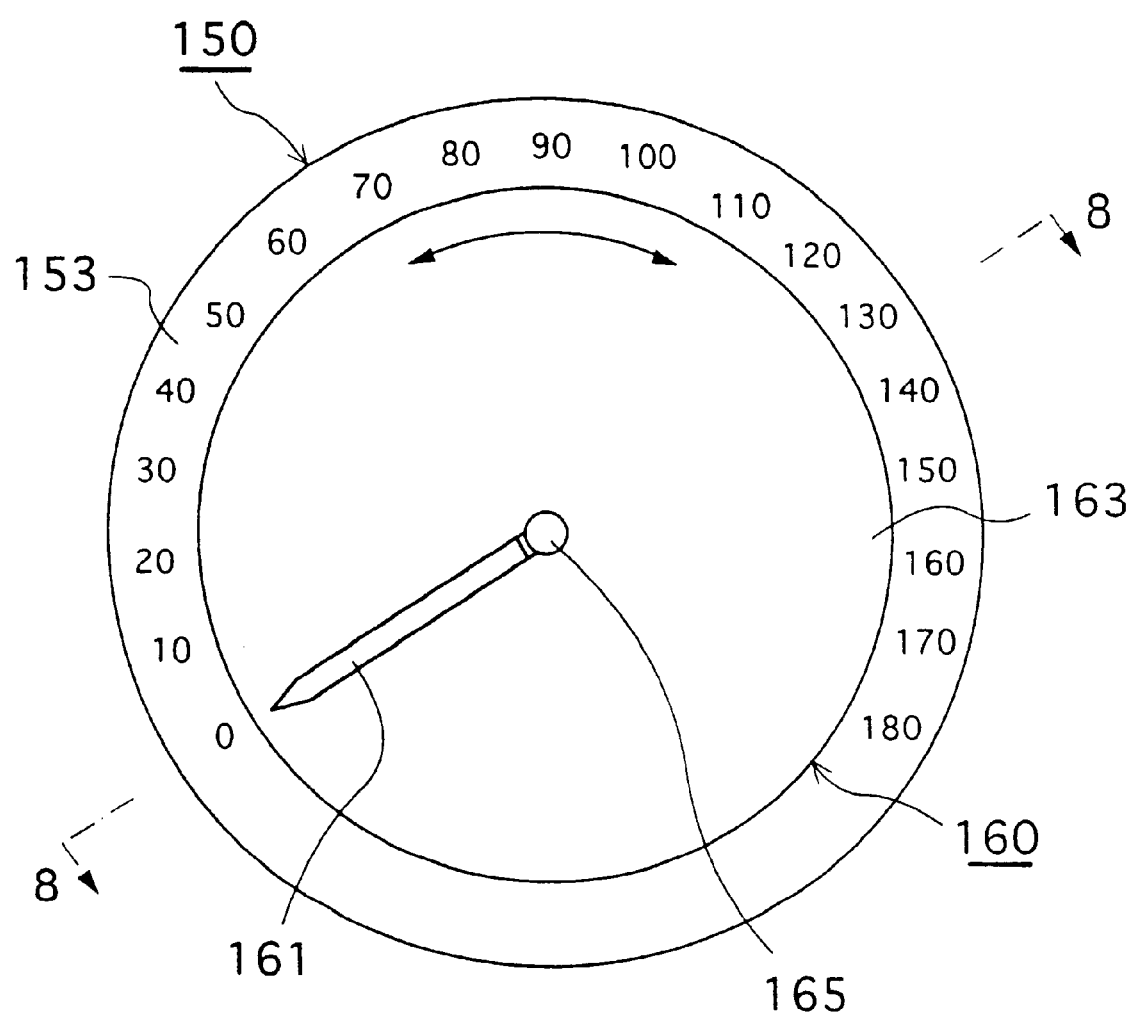
FIG. 7 is a plan view showing a speed meter as an LED display device in a second embodiment of the invention.
Figure 8:
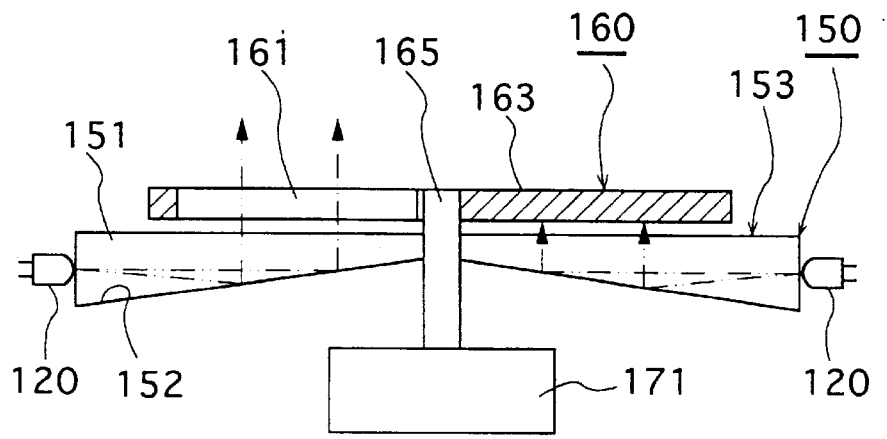
FIG. 8 is a sectional view taken along the line 8—8 in FIG. 7.

In FIG. 7 and FIG. 8, a speed meter as a vehicle meter in the second embodiment comprises a pointer disc 160 of round shape mounted on a photoconductor disc 150 of round shape. The photoconductor disc 150 comprises a photoconductive portion 151 of substantial disc shape made of acrylic materials and a reflection surface 152 having a white coating surface provided to a back surface of the photoconductive portion, like the indicator 110 of the first embodiment. The center part of the photoconductor disc 150 is thinner than the peripheral part thereof and the width of the center part is narrower in plane than the peripheral part thereof, so that the photoconductor disc 150 forms a substantial sector shape having a fixed central angle. A scale portion 153 for indicating speed is formed on the peripheral part of the photoconductor disc 150. As a matter of course, a meter panel 101 in the present embodiment does not need to indicate speed. The photoconductor disc 150 is fixed so as not to rotate relative to the meter panel 101.

A given number of LED units 120 are disposed at the periphery of the photoconductive portion 151. Each LED unit 120, which can emit light of fixed colors like red, green and blue, is disposed on the peripheral surface of the photoconductive portion 151 facing the center of the photoconductive portion 151. Each LED unit 120 can enter light into the photoconductive portion 151. Light entering into the photoconductive portion 151 is directed to a front surface side of the pointer disc 160 through use of the reflection surface 152. A plurality of the LED units 120 are disposed at fixed angle and fixed angular intervals in the circumference direction, so that the whole surface of the photoconductor disc 150 can be lit uniformly.

The pointer disc 160 is substantial disc shaped and has a diameter smaller than that of the photoconductor disc 150. It is concentrically mounted on the photoconductor disc 150 so that the scale portion 153 is exposed. The pointer disc 160 is made of resin materials or the like which can cut off light. A pointer 161 is formed by cutting out, at a fixed angle position of the pointer disc 160, a radially extending slit shape. The pointer disc 160 has a light shielding portion 163 which is opaque except for the pointer 161. Therefore, the light of the pointer disc 160 from the LED unit 120 is cut off by the light shielding portion 163, and it penetrates only the pointer 161. Moreover, the center of the pointer disc 160 is connected to a drive unit 171 so as to be driven through use of a drive shaft 165, and it can be freely rotated in relation to the photoconductor disc 150. The drive unit 171 is disposed inside the meter panel 101, and it rotates the pointer disc 160 through use of the drive shaft 165 according to the amount of car speed, under the control of a driver 181, described hereafter.

The kinds of colors emitted by LED units 120 and the amount of the LED units 120 to be provided can be properly selected to ensure that the scale portion 153 is recognized well by clear and uniform lighting of the photoconductor disc 150, and speed indication by the pointer 161 is possible while the light from the photoconductor disc 150 sufficiently penetrates the pointer 161 of the pointer disc 160. In addition, like the first embodiment, it is possible to freely change the emitting color of the photoconductor disc 150 while the LED unit 120 comprises the LEDs 121, 122 and 123 having different colors and disposed in the direction of the thickness of the photoconductor disc 150. In the alternative, the LED unit 120 may comprise an LED lamp containing an LED chip of three primary colors. In this case, a vehicle meter is provided with an enhanced ability to change/customize its design.

Figure 9:
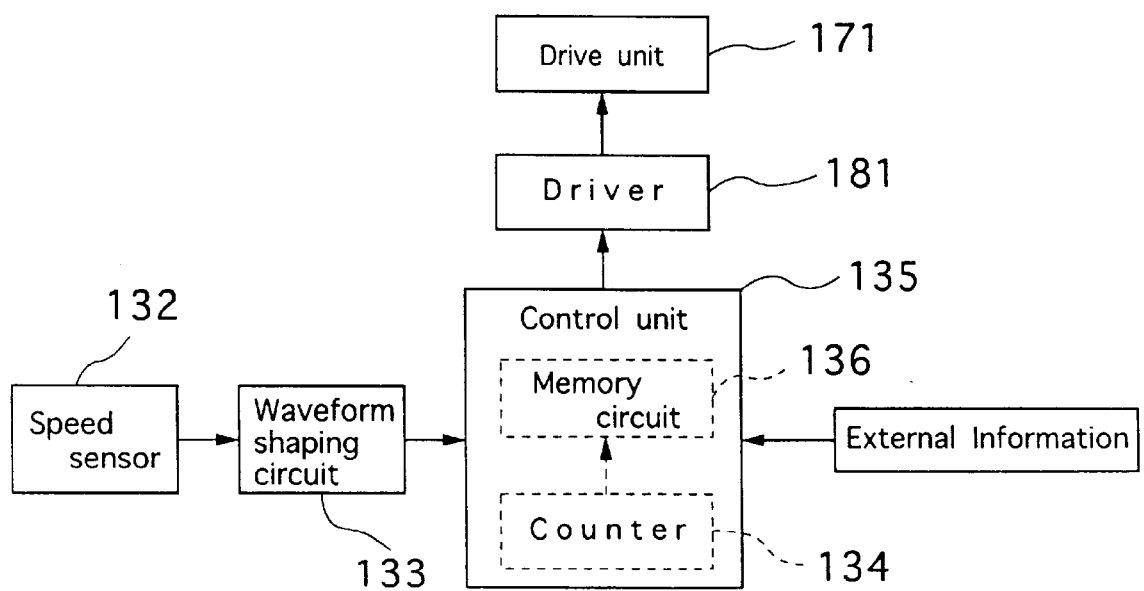
FIG. 9 is a block diagram showing a circuit constitution of the whole speed meter in the second embodiment of the invention.
Figure 10:
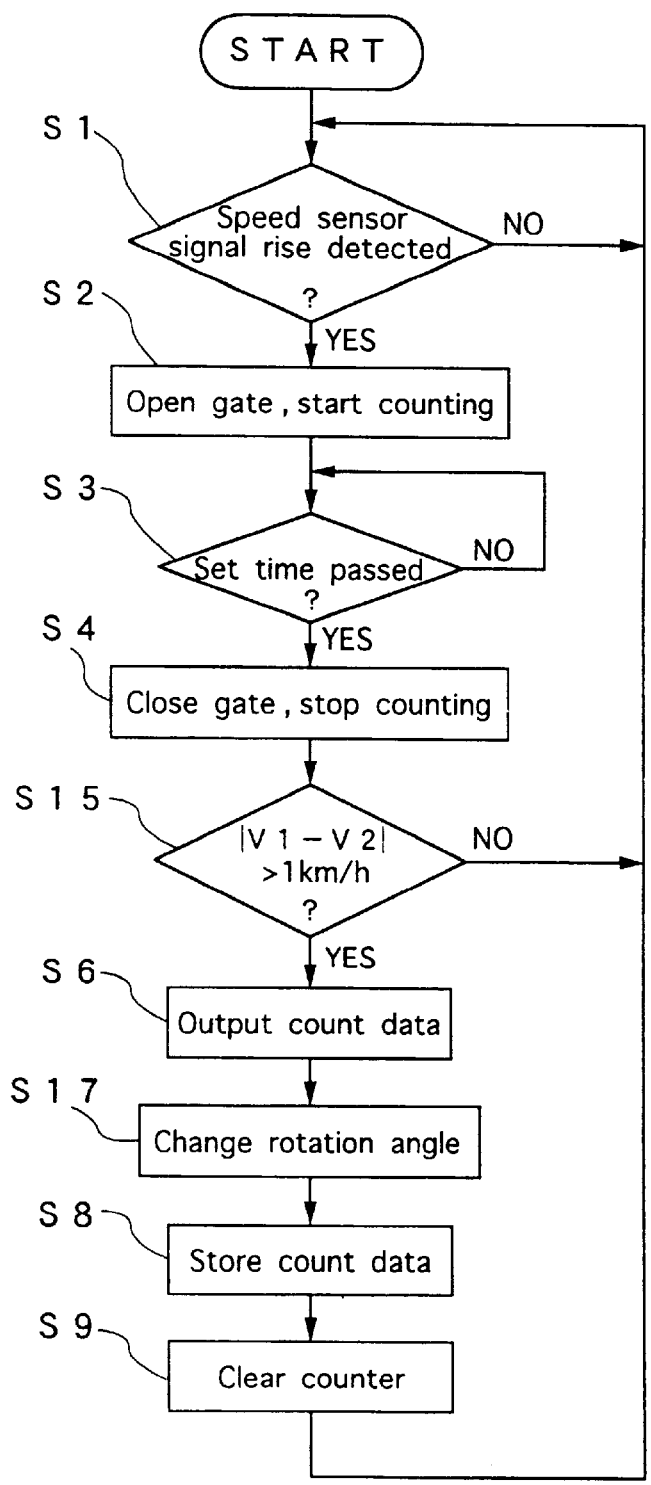
FIG. 10 is a flowchart showing the whole operation of the speed meter in the second embodiment of the invention.

Next, an indicator control system and the operation of a speed meter, each provided in the second embodiment, are described referring to FIG. 9 and FIG. 10.

Generally, the speed meter of the second embodiment has the same electrical constitution as that of the first embodiment (Ref. to FIG. 5), and it operates according to the same program as that of the first embodiment (Ref. to FIG. 6). In the first embodiment, speed is indicated by changing the position of the pointer 113 into the angle position corresponding to the current speed while the driver 131 controls the emission of the group of the LED 121, 122 and 123. On the other hand, in the second embodiment, speed is indicated by changing the position of the pointer 161 into the angle position corresponding to the current speed while the driver 181 connected to the memory circuit 136 of the control unit 135 controls the rotation of the drive unit 171.

Namely, in FIG. 9, the driver 181 of the speed meter in the second embodiment is connected to the memory circuit 136 and the drive unit 171 is connected to the driver 181. Other components of the system illustrated in FIG. 9 are the same that of the first embodiment. In the present embodiment, control means are provided for controlling the rotation of the pointer disc 160 in relation to the photoconductor disc 150. The control means comprises a speed sensor 132, a waveform shaping circuit 133, a control unit 135, the drive unit 171 and the driver 181.

In FIG. 10, in the speed meter of the second embodiment, after calculation by the counter 134 in step S1 to step S4, count data V2 of the counter 134 is compared with stored data V1 which is a current indicating speed data in step S15. Only when the subtraction V1–V2 is 1 km per hour or more, the count data V2 is transmitted to the driver 181 in step S6. On the basis of the new count data V2, the driver 181 controls the rotation direction and the rotation amount of the drive unit 171 in step S17 and it changes speed indication of the pointer 161 while controlling the rotation of the pointer disc 160. Namely, the angle position of the pointer 161 to the scale position 153 is calculated according to the speed of the count data V2, and the drive unit 171 rotates the pointer disc 160 through the drive shaft 165 so as to dispose the pointer 161 at the above angle position. Other operations are the same as those of the first embodiment. In the second embodiment, the photoconductor disc 150 is always lit by driving and lighting the LED unit 120 during above operations.

In the second embodiment, the light generated from the LED unit 120 enters from the circumference of the photoconductor disc 150 into the photoconductive portion 151, is led from the photoconductive portion 151 to the reflection surface 152, is reflected by the reflection surface 152 and reaches a front surface of the photoconductor disc 150. At this time, the light from the photoconductor disc 150 is blocked by the light shielding portion 163 except the scale portion 153 and the pointer 161.

Therefore, drivers can recognize only the scale portion 153 of the photoconductor disc 150 and the lit pointer 161 of the pointer disc 160. As a result, the pointer 161 can be illuminated with light by using the LED unit 120, and a unique design can be obtained by the lit pointer 161 and the scale portion 153 illuminated with light emitted at the circumference of the photoconductor disc 150. In addition, the LED unit 120 is disposed at the outer circumference of the photoconductor disc 150, so that a larger number of LEDs can be provided and the photoconductor disc 150 can be brighter.

Moreover, during operation of the indicator, the pointer disc 160 is rotated relative to the photoconductor disc 150 at an angle according to running speed under the control of the control means, and the illuminated pointer 161 points out the indicated speed on the scale portion 153 at the fixed angle position. Therefore, drivers can recognize the current running speed by seeing the pointer 161 positioned at the angle according to the running speed. As a result, the pointer 161 can be displayed with lighting by using the LED unit 120, and a unique design effect can be obtained by the use of an illuminated pointer 161 and a scale portion 153 illuminated with light emitted at the outer circumference of the photoconductor disc 150.

In the second embodiment, the LED unit 120 is provided at or near the outer circumference of the photoconductor disc 150. However, if a hole is bored through the center of the photoconductor disc 150, it is possible to provide an LED unit 120 to the internal circumference of the photoconductor disc 150. With this modification of the second embodiment, the thickness of the photoconductor disc 150 is contrary to that of the second embodiment as shown in FIG. 8, that is, the photoconductor disc 150 is thicker at the circumference of the hole and thinner at the outer periphery.

For the sake of convenience, this modification of second embodiment is described while using codes for a vehicle meter. The photoconductor disc 150 in this modification is comprised of a photoconductor whose thickness at the center part is thicker than that at the outer circumference, and whose lower surface comprises the reflection surface 152. The photoconductor disc 150 is substantially sector shaped and has a fixed central angle by making the width of the center part narrower than that of the outer circumference. The scale portion 153 is disposed near the outer circumference of the photoconductor disc 150. The LED unit 120 is disposed at the internal circumference side of the photoconductor disc 150, and it emits light into the photoconductor disc 150. The pointer disc 160 is substantially disc shaped, and has a diameter smaller than that of the photoconductor disc 150. It is mounted on the photoconductor disc 150 so as to freely rotate relative to the photoconductor disc 150. The pointer disc 160 has a pointer 161 cut out in the shape of a slit extending radially so that light from the photoconductor disc 150 can go through it.

Therefore, when the LED unit 120 emits light, the light enters into the photoconductive portion 151 from the inner circumference at the center of the photoconductor disc 150. Then, it goes to the reflection surface 152, and is reflected to the front surface of the photoconductor disc 150 by the reflection surface 152. At this time, the light from the photoconductor disc 150 is blocked by the light shielding portion 163 of the pointer disc 160 disposed at the front surface side of the photoconductor disc 150.

Therefore, drivers can recognize only the scale portion 153 of the photoconductor disc 150 and the pointer 161 of the pointer disc 160. As a result, the pointer 161 can be displayed in an illuminated state by using the LED unit 120, and a unique design can be obtained by the lit pointer 161 and the lit scale portion 153 illuminated with light emitted at the circumference of the photoconductor disc 150.

By providing an LED unit 120 at the internal circumference of the photoconductor disc 150, the whole photoconductor disc 150 can be lit uniformly even if the LED unit 120 comprises a small number of LEDs.

The above-described second embodiment comprises a pointer disc 160 which can rotate freely in relation to the photoconductor disc 150. It is connected with and driven by the drive unit 171. However, it is effective to have a configuration where the photoconductor disc 150 can freely rotate in relation to the pointer disc 160, the photoconductor disc 150 being connected with the drive unit 171. In this case, if the pointer 161 is fixed at the fixed angular position on the meter panel 101, for example, at a vertical position, drivers can always recognize the pointer 161 at a stationary position, and easily and accurately confirm the vehicle running speed. The second embodiment can be modified into various modified configurations as long as the photoconductor disc 150 and the pointer disc 160 rotate relative to each other in some manner, and the pointer 161 can point the fixed speed indication.

The first and the second embodiments can be embodied in other gauges like a tachometer and so on in addition to a speed meter. In addition, the control systems and processes are not limited to those illustrated in FIGS. 5, 6, 9 and 10. Furthermore, the resolution of the pointer 113 in the first embodiment is set to 2 km per hour; but it is also possible and appropriate to set the resolution of the pointer 113 to less (e.g., 1 km per hour) or more (e.g., 3 km or more per hour), taking into account certain factors such as the size of the LEDs 121, 122 and 123, and the emission characteristic thereof.

Figure 11:
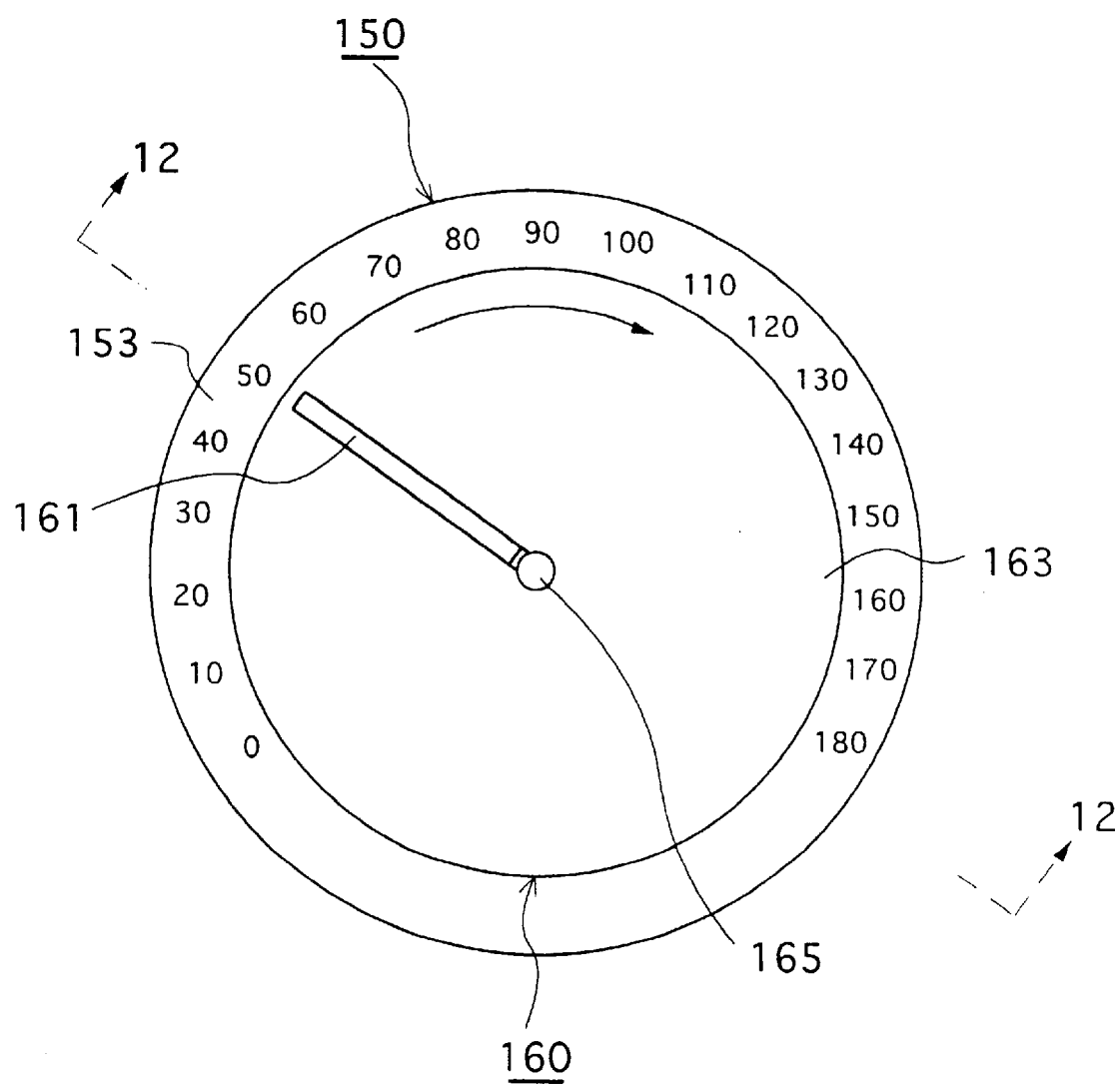
FIG. 11 is a plan view showing a speed meter as an LED display device in a third embodiment of the invention.
Figure 12:
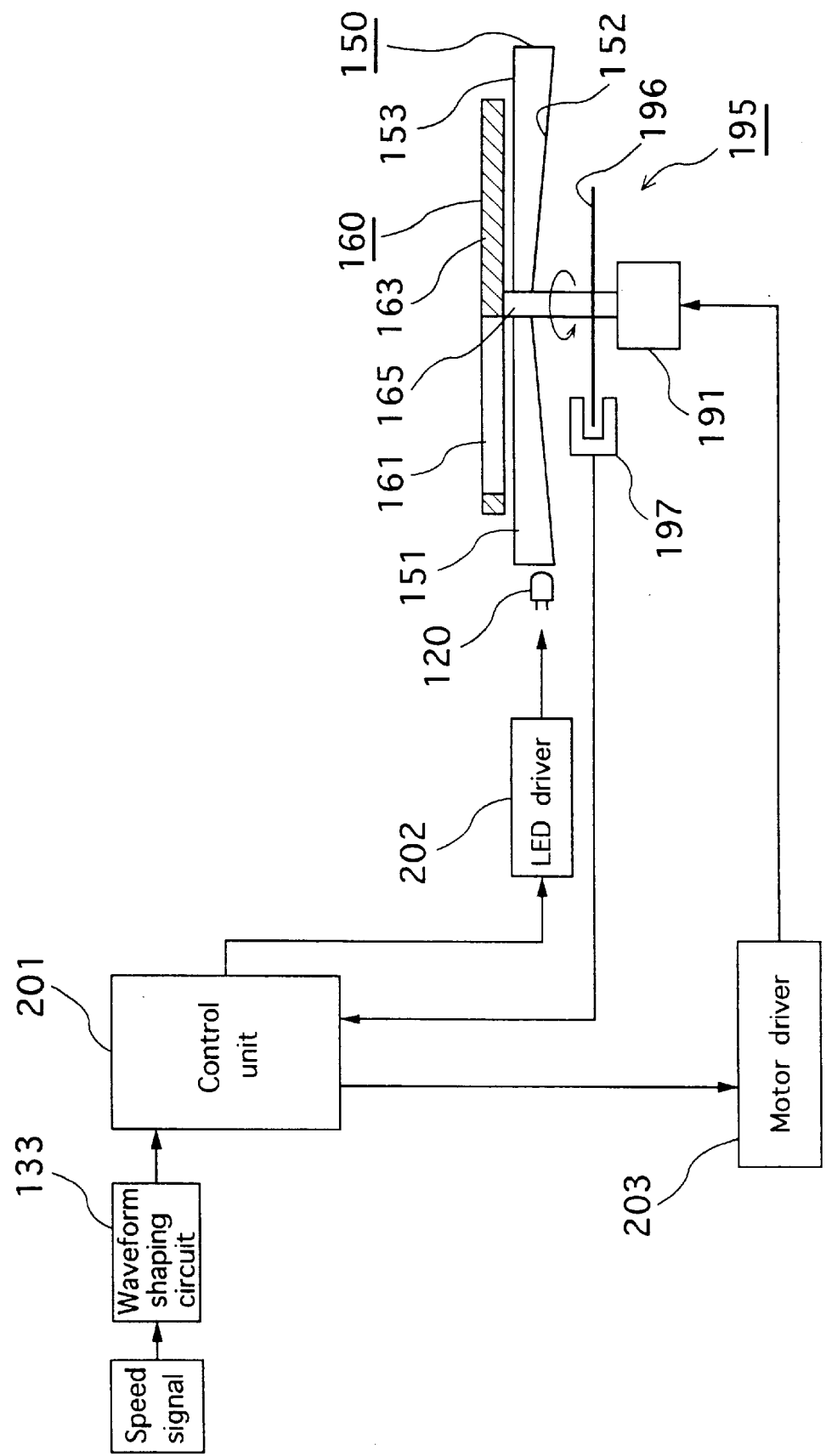
FIG. 12 is a sectional view taken along the line 12—12 in FIG. 11 showing the speed meter together with a block diagram of various electrical components in the third embodiment of the invention.
Figure 13:
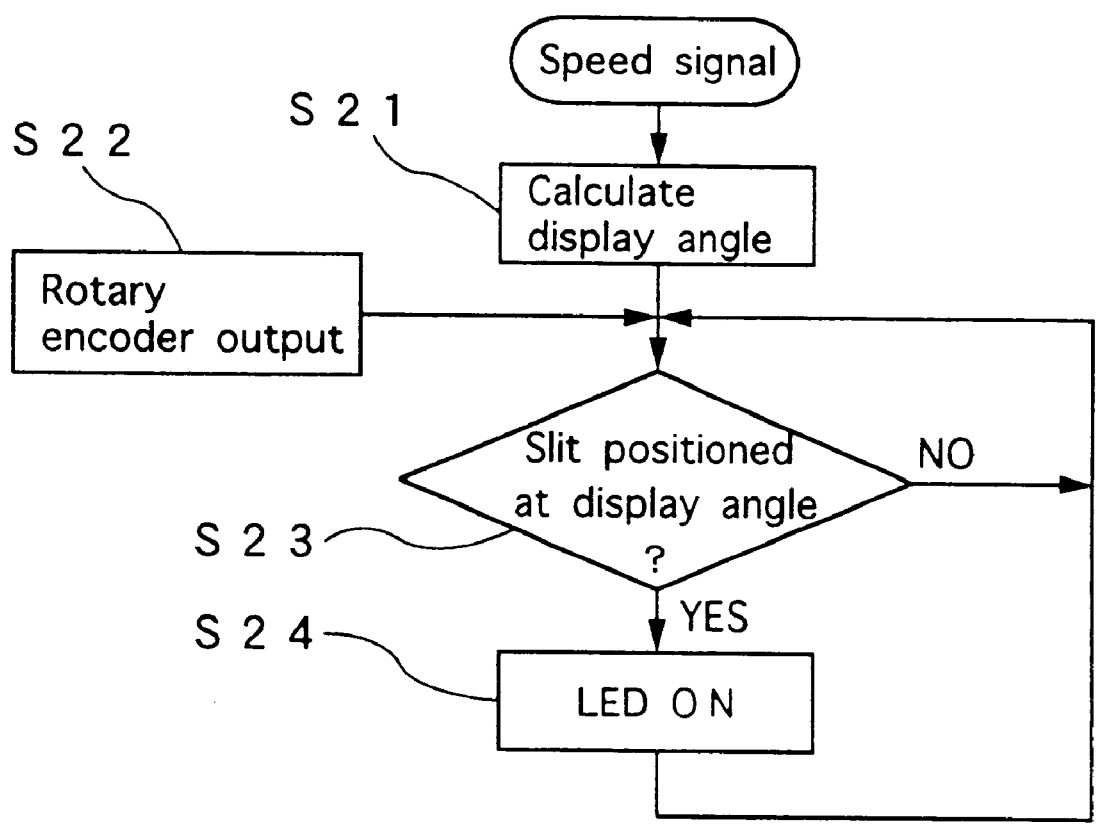
FIG. 13 is a flowchart showing an operation of the speed meter in the third embodiment of the invention.

FIG. 11 to FIG. 13 show a vehicle meter as an LED display device in a third embodiment of the invention.

In FIG. 11, the LED display device in the third embodiment is embodied in a speed meter of a car as a vehicle meter like the second embodiment and it has the same outward appearance as that of the second embodiment. Namely, the speed meter in the third embodiment comprises a photoconductor disc 150, a pointer disc 160 and an LED unit 120 comprised of an LED 121, 122 and 123 having different colors in the same way as the second embodiment. In the speed meter of the second embodiment, the drive unit 171 rotates the pointer disc 160 through the drive shaft 165 in the clockwise or counterclockwise direction, and the pointer 161 is disposed at a fixed angular position. On the other hand, in the speed meter of the third embodiment, a drive unit 191 is provided which comprises a motor as a rotation drive means. The motor rotates a pointer disc 160 through use of a drive shaft continuously in high speed in a particular fixed direction (for example, in the clockwise direction).

As shown in FIG. 12, in the third embodiment, a rotary encoder 195 is provided. The rotary encoder 195 comprises a slit disc 196 and a photo interrupter 197. The slit disc 196 is fixed to the drive shaft 165 and the photo interrupter 197 of the rotary encoder 195 is connected to a control unit 201. The rotation angle position of the pointer 161 of the pointer disc 160 is transferred through the drive shaft 165 to the rotary encoder 195, which detects the position and inputs it to control unit 201. Like the control unit 135 in the third embodiment, a car speed signal from a speed sensor 132 (Ref. to FIG. 9) is input into the control unit 201 through a waveform shaping circuit 133 and current speed is calculated. The control unit 201 is connected to an LED driver 202 having the same constitution as the driver 131 (Ref. to FIG. 5) in the second embodiment for driving the LED unit 120. It controls emission of the LED unit 120 through use of the LED driver 202 on the basis of a car speed signal from the waveform shaping circuit 133 and a signal from the rotary encoder 195 showing an angle position of the pointer 161. Namely, each time the pointer 161 rotating continuously arrives at a scale position of the scale portion 153 indicating current speed, the control unit 201 turns the LED unit 120 on momentarily, and the photoconductor disc 150 is lit. At other scale positions, the control unit 201 turns the LED unit 120 off and the photoconductor disc 150 is extinguished. The control unit 201 is connected to a motor driver 203 and the drive unit 191 is driven by the motor driver 203 so as to rotate in high speed in the above-noted fixed direction.

A control means in the third embodiment comprises the speed sensor 132, the waveform shaping circuit 133, the rotary encoder 195, the control unit 201 and the LED driver 202. Only when the pointer 161 is at the fixed angular position, the photoconductor disc 150 is lit by driving the LED unit 120. The rotation drive means comprises the drive unit 191 for rotating the pointer disc 160 continuously in the fixed direction, and the motor driver 203.

Next, operations of a vehicle meter as the LED display device in the third embodiment are described referring to FIG. 13.

As shown in FIG. 13, in step S21, the control unit 201 in the third embodiment calculates vehicle speed (car speed in the illustrated embodiment) on the basis of a car speed signal from the waveform shaping circuit 132 in the same way as the first embodiment (Ref. to steps S1~S4 in FIG. 6), and it calculates the scale position of the scale portion 153 according to current speed, namely, the indication angle position of a car speed to be pointed by the pointer 161. Under the control of the control unit 201, drive of the drive unit 191 by the motor driver 203 rotates the pointer disc 160 in high speed in the fixed direction (clockwise direction). On the other hand, the control unit 201 inputs an output signal from the rotary encoder 195 in step S22 and it judges in step S23 whether the pointer 161 rotating in high speed is at the indication angle position calculated in step S21 or not. When the control unit 201 judges that the pointer 161 is at the indication angle position, the LED unit 120 emits light In step S24 and the front surface of the photoconductor disc 150 is lit.

Therefore, light generated by the LED unit 120, which enters into the photoconductive portion 151 of the photoconductor disc 150, is reflected by the reflection surface 152, and reaches the front surface side of the pointer disc 160 through the pointer 161 of slit shape. Then, it indicates with lighting the scale position (hereinafter "speed indicating position") of the scale portion 153 according to the current speed. The pointer disc 160 continuously rotates at a high speed in the fixed direction, and the pointer 161 arrives at the speed indicating position at each rotation cycle. Therefore, the control unit 201 turns the LED unit 120 on synchronously with the rotation cycle of the pointer 161, and the front surface of the photoconductor disc 150 is lit at each speed indicating position. As a result, the speed indicating position is indicated by lighting. In addition, the control unit 201 controls the on and off operation of the LED unit 120 using the LED driver 202, so that the photoconductor disc 150 is extinguished at all positions except the above speed indicating position by turning off the LED unit 120. Theoretically, at this time, the indication of the pointer 161 is performed due to on and off flashing of the LED unit 120 each time the pointer 161 arrives at the speed indicating position. However, the pointer 161 seems to be at a standstill owing to afterimage effect because the pointer 161 rotates at a high speed. Namely, the pointer 161 is recognized as if it was in the stationary state at the speed indicating position, due to afterimage effect through the sense of sight by increasing the flashing on and off frequency to a critical fusion frequency or higher. Therefore, it is preferable that the rotation speed of the pointer 161 is set to such a speed to cause the flashing on and off frequency to equal or exceed the critical fusion frequency, while the light in an on state is recognized as on.

In case the car speed changes by increasing or decreasing, the timing of flashing on of the LED unit 120 is staggered according to the amount of increase or decrease. For example, when car speed increases by 1 km per hour, the timing is delayed by 1 km per hour. To the contrary, when car speed decreases by 1 km per hour, the timing is advanced by 1 km per hour. In case the change of car speed is 2 km per hour or more, the timing is also staggered by the change amount. The delay and advance of the timing can be performed by one rotation of the pointer 161 or by plural rotations of it. The number of rotations of the pointer 161 in relation to increasing or decreasing of car speed by 1 km per hour is preferably set to be large, so that the movement of the speed indication by the pointer 161 will seem smooth.

In the third embodiment, the pointer disc 160 is rotated continuously in the fixed direction by the drive unit 191 using the motor driver 203 under the control of the control unit 201. In addition, under the control of the control unit 201, the LED driver 202 turns the LED unit 120 on each time the pointer 161 comes to the fixed angle position (speed indicating position). It turns the LED unit 120 off when the pointer 161 is at positions other than the speed indicating position. Light radiated from the LED unit 120 when turned on enters into the photoconductive portion 151 from the periphery of the photoconductor disc 150 and is directed toward the reflection surface 152. It is reflected to the front surface of the photoconductor disc 150 by the reflection surface 152. At this time, light not corresponding to the scale portion 153 and the pointer 161 from the photoconductor disc 150 is blocked by the pointer disc 160. Therefore, drivers can recognize only the scale portion 153 and the pointer 161.

As a result, the third embodiment can have the same effect as that of the second embodiment. In the third embodiment, the pointer disc 160 is rotated in the fixed direction in particular, so that a mechanism for rotating the pointer disc 160 in both directions like the second embodiment is not necessary and the drive unit 191 can have simple constitution such as a direct current motor and so on. In addition, the LED unit 120 has good response, so that it emits light accurately when the pointer 161 comes to the fixed angle position, and it does not cause any error in variable indication.

In the third embodiment, the LED unit 120 is constituted so as to be lit only when the pointer 161 comes to the speed indicating position. The constitution can be changed so that the timing of flashing on of the LED 120 is controlled by the control unit 201 so that speed indication can be a zone which continues from a position before the fixed angle of the speed indicating position to the speed indicating position. In this case, the quantity of light emitted by the LED unit 120 can be controlled so that the zone indication can be such one of radar type as becomes brighter gradually as towards the speed indicating position and becomes the brightest at the speed indicating position. In addition, in the third embodiment, the pointer 161 and the scale portion 153 can be lit in optional colors by using LEDs having different colors to implement LED unit 120. For example, LEDs 121, 122 and 123 having red, green and blue respectively may be used like the second embodiment.

Moreover, in the third embodiment, the photoconductor disc 150 comprised of the photoconductive portion 151 has a larger diameter than that of the pointer disc 160 and its outer circumference has the scale portion 153, so that the scale portion 153 is also flashed on and off according to the timing of flashing of the LED unit 120. However, the photoconductor disc 150 may also be formed with a photoconductive portion having a tapered cross-section which is disc shaped. It has the same or smaller diameter as the pointer disc 160, and its thickness becomes thinner towards the internal circumference. In this case, a scale portion for indicating a variable such as speed and so on can be provided to the outer circumference of the pointer disc 160.

Then, by continuously illuminating only the scale portion by another light source, users like drivers may more easily recognize the indication. In the third embodiment, it is possible to bore a hole of round shape at the center of the photoconductor disc, like the second embodiment. In addition, it is possible to provide the photoconductor disc with a tapered cross-section whose thickness becomes thinner towards the outer circumference and to dispose the LED unit 120 within the internal circumference of the photoconductor disc.

Figure 14:
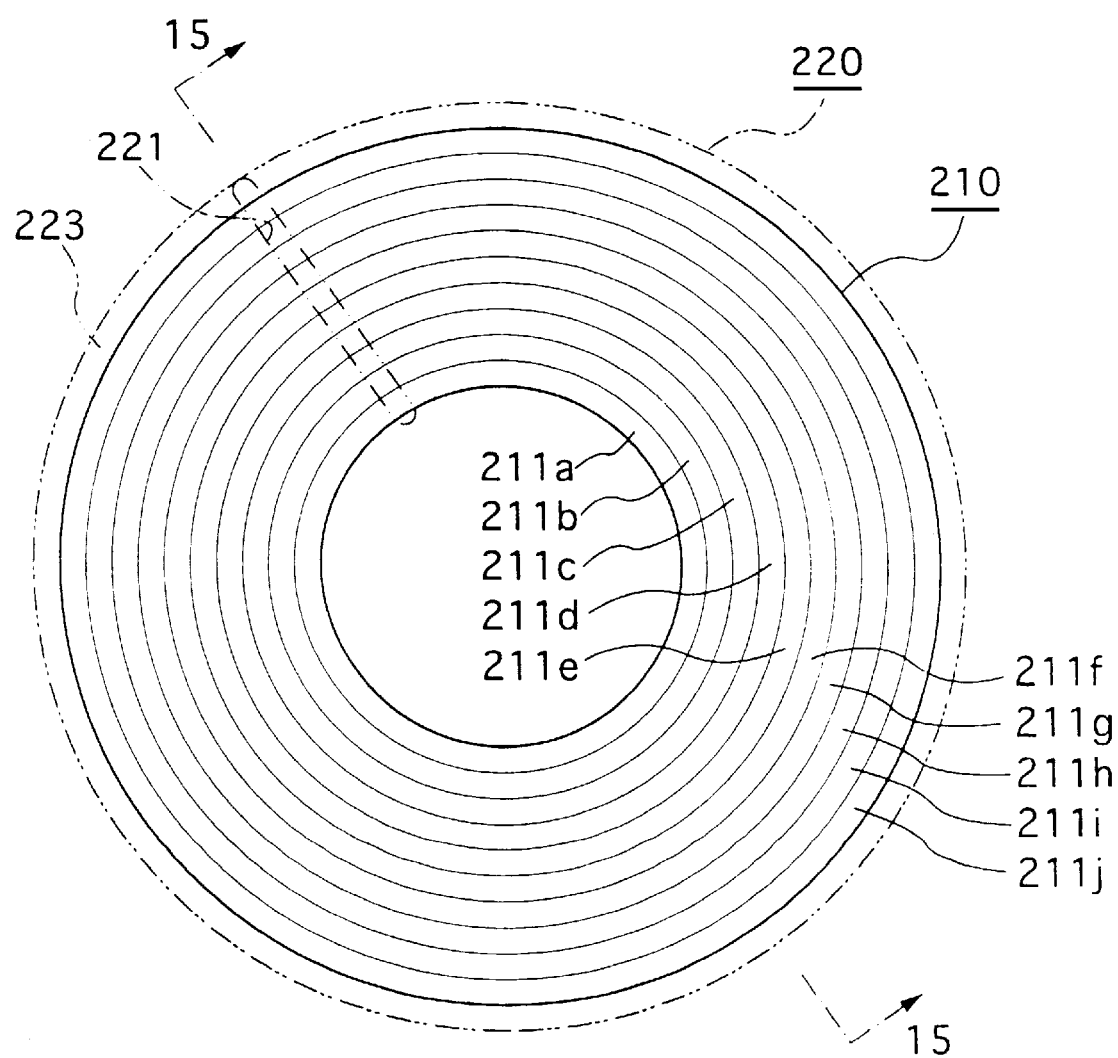
FIG. 14 is a plan view showing a speed meter in a fourth embodiment of the invention.
Figure 15:
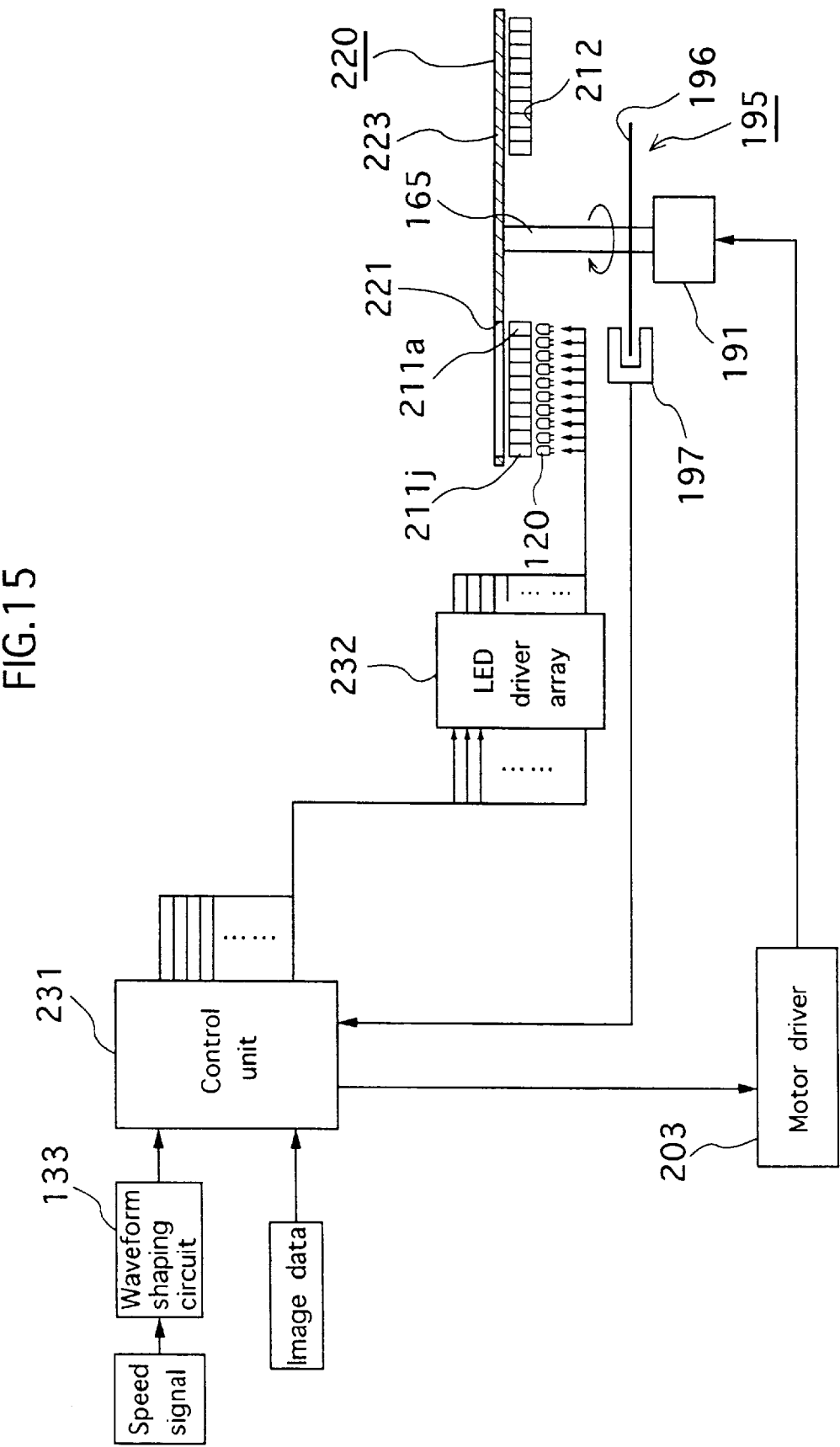
FIG. 15 is a sectional view taken along the line 15—15 in FIG. 14 showing the speed meter together with a block diagram of various electrical components in the fourth embodiment of the invention.
Figure 16:
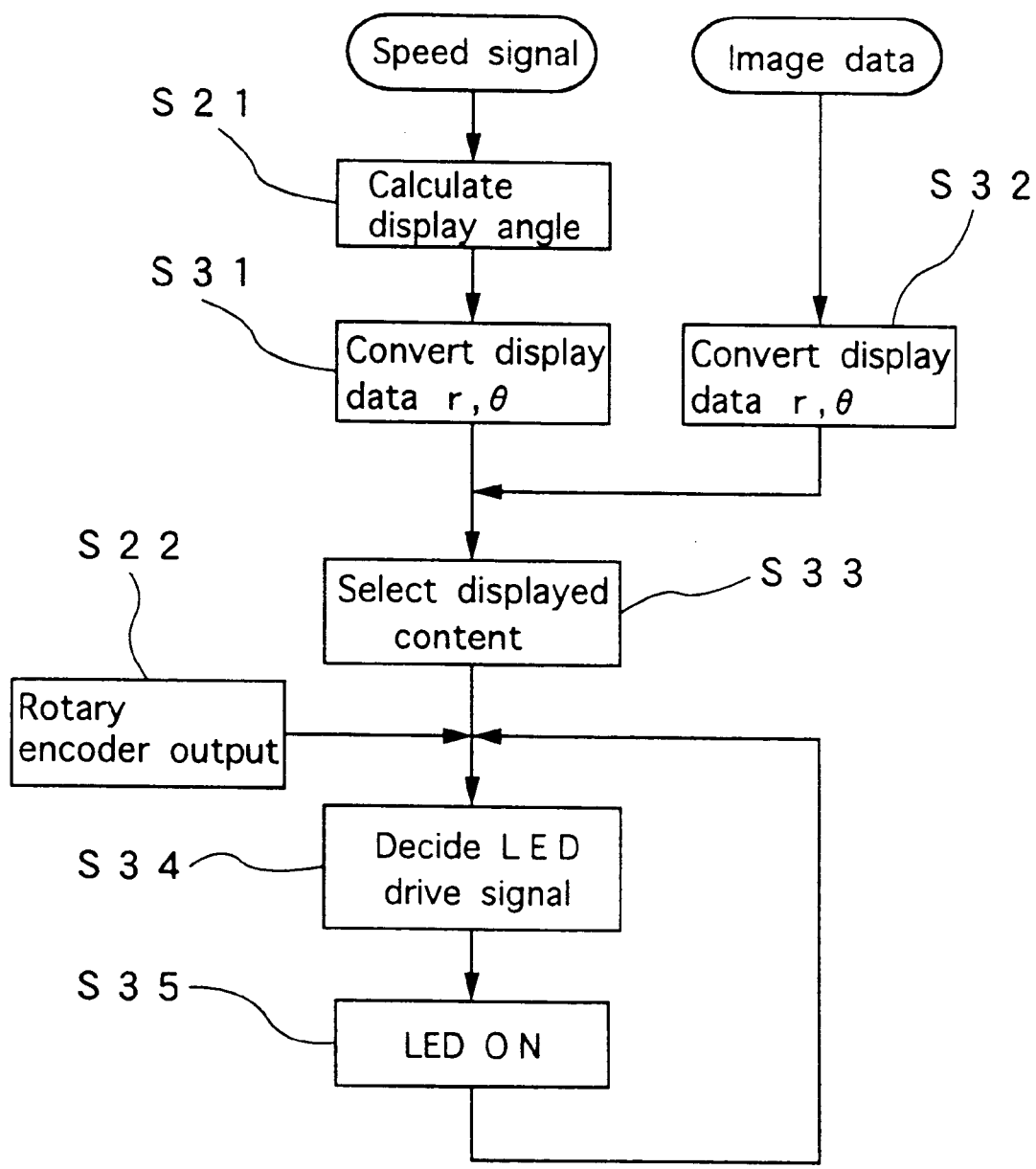
FIG. 16 is a flowchart showing an operation of the speed meter in the fourth embodiment of the invention.

FIG. 14 to FIG. 16 show a vehicle meter as an LED display device in a fourth embodiment of the invention.

In FIG. 14, the LED display device in the fourth embodiment can be embodied in a car speed meter as a vehicle meter, like the third embodiment, and it can be also embodied as a general-purpose display. Namely, the LED display device in the fourth embodiment is formed by concentrically mounting a slitted disc 220 having the same constitution as the pointer disc 160 of the second and third embodiments on a light emitting disc 210. The light emitting disc 210 is formed in the shape of a disc by closely disposing plural ring-shaped photoconductors 211*a*, 211*b*, 211*c*, 211*d*, 211*e*, 211*f*, 211*g*, 211*h*, 211*i* and 211*j*. They are circular in shape (doughnut board shape) and have different respective diameters so that they form a plurality (ten) of adjoining concentric circles. A hole is provided at the center of each of the circular photoconductors to make them ring-shaped.

As shown in FIG. 15, a reflection surface for reflecting light (only a lower surface of a reflection surface 212 is shown in the figure) is provided to parts of an inner side surface of the photoconductor 211*a* disposed at the most inside, and to an outer side surface of the photoconductor 211*j* disposed at the most outside. A reflection surface is also provided on boundary surfaces among adjoining photoconductors 211*a*~211*j* and on lower surfaces of respective photoconductors 211*a*~211*j*, except parts where an LED unit 120 is disposed. The reflection surface may be formed by metal evaporation or white plating. Therefore, each photoconductor 211*a*~211*j* is independent photoconductively. An LED unit 120 is disposed under the lower surface of the light emitting disc 210 at a fixed angular position corresponding to each photoconductor 211*a*~211*j*, and it can enter light into each of them freely.

Specifically, a plurality of the LED units 120 are disposed at fixed intervals and at fixed angular positions in the direction of the circumference under the lower surface of each photoconductor 211*a*~211*j*, and enter light there in the direction of the thickness of the photoconductor 211*a*~211*j*. The reflection surface 212 is not provided to the position where each LED unit 120 is disposed under the lower surface of each photoconductor 211*a*~211*j*, so that light from the LED unit 120 can enter there. In addition, reflection means are provided for changing the travel direction of light which goes upward out of the LED unit 120 and leading the light along the circumference of each photoconductor 211*a*~211*j*.

In the fourth embodiment, it is possible to make the whole lower surface of the photoconductor 211*a*~211*j* a transmission surface to which the reflection surface 212 is not provided. Many LED units 120 may accordingly be disposed in the direction of the circumference of each photoconductor 211*a*~211*j*, to light each photoconductor 211*a*~211*j* uniformly in the direction of the circumference. In this case, the reflection surface is provided to only the inner side surface of the photoconductor 211*a* disposed at the most inside, to the outer side surface of the photoconductor 211j disposed at the most outside and to the boundary surfaces among adjoining photoconductors 211a~211j. However, it is enough only to light the whole of each photoconductor 211a~211j uniformly in the direction of the circumference by one LED in the fourth embodiment.

The slitted disc 220 is substantially disc shaped and is mounted on the light emitting disc 210 concentric with the light emitting disc 210, and it can rotate freely relative to the light emitting disc 210 in the same way as the pointer disc 160 of the second and third embodiments. The slitted disc 220 has a slit 221 formed by cutting radially so as to lead light from the photoconductor 211a~211j. A part of the slitted disc 220 except the slit 221 is a light shielding portion 223 for cutting off light. The diameter of the slitted disc 220 is a little larger than that of the light emitting disc 210. The two discs are configured so that the slit 221 extends from the photoconductor 211a disposed at the furthest inside position to the photoconductor 211j disposed at the furthest outside position of the light emitting disc 210. The slitted disc 220 is connected to a drive unit 191 comprised of a direct current motor and so on, which serve as a rotation drive means for driving the disc using a drive shaft 165 like the third embodiment. The slitted disc 220 is continuously rotated by the drive unit 191 at a high speed, in a fixed direction (in the clockwise direction in FIG. 14). As not shown, a scale portion having numbers for indicating car speed is provided on the light emitting disc 210 and/or at the outer circumference of the slitted disc 220. Therefore, it is possible to indicate car speed by the slit 221 of the slitted disc 220.

In the fourth embodiment, when the slit 221 of the slitted disc 220 arrives at the fixed angle position, the fixed photoconductors 211a~211j emit light selectively by controlling respective emission timing of the LED units 120 corresponding to each photoconductor 211a~211j according to a fixed picture data (image data) by means of a control means. Therefore, a crossing point by the slit 221 and the photoconductor 211a~211j becomes an indication part in the state of a dot and the fixed picture can be indicated owing to afterimage by combining the dot indication part in the direction of rotation of the slitted disc 220 with the one in the direction of a radius. "Picture" used in the above contains the indication by a straight line like a speed indication, as a matter of course.

As shown in FIG. 15, in the fourth embodiment, a slit disc 196 of a rotary encoder 195 is adhered to the drive shaft 165 and a photo interrupter 197 of a rotary encoder 195 is connected to a control unit 231. Then, rotation angle position of the slit 221 of the slitted disc 220 is detected by the rotary encoder 195 and input into the control unit 231.

Moreover, a car speed signal from a speed sensor 132 (Ref. to FIG. 9) is input into the control unit 231 through a waveform shaping circuit 133 in the same way as the second embodiment, and the control unit 231 calculates the current car speed. An LED driver array 232 is connected to the control unit 231, and the control unit 231 controls emission of each LED unit 120 of each photoconductor 211a~211j using the LED driver array on the basis of a car speed signal from the waveform shaping circuit 133, a signal meaning the angle position of the slit 221 of the slitted disc 220 and picture data. Namely, by the same control as the second embodiment, the control unit 231 controls the emission of the LED unit 120 through use of the LED driver array 232 on the basis of a car speed signal and an angle position signal about the pointer 161, and speed is indicated by the angular position of the slit 221. On the other hand, the control unit 231 indicates a picture on the basis of the picture data and the angle position signal about the slit 221, in addition to the above speed indication.

Specifically, in case of car speed indication, each time the slit 221 of the continuously rotating slitted disc 220 arrives at the angle position showing current speed, the control unit 231 turns all the LED units 120 of the photoconductors 211a~211j on momentarily, and the surface of the light emitting disc 210 emits light. When it comes to other angle positions, the control unit 231 turns the LED unit 120 off, and the light emitting disc 210 is extinguished. In case of picture indication, when the slit 221 comes to the fixed coordinates on the light emitting disc 210, the control unit 231 makes the corresponding LED units 120 of the photoconductors 211a~211j emit light according to the picture to be indicated.

The motor driver 203 is connected to the control unit 231, and the control unit 231 drives (rotates) the drive unit 191 the fixed direction at a high speed through use of the motor driver 203, like the third embodiment.

A control means in the fourth embodiment is comprised of the speed sensor 132, the waveform shaping circuit 133, rotary encoder 195, the control unit 231 and the LED driver array 232. A fixed image is indicated by an afterimage effect by controlling the emission timing of the LED unit 120 corresponding to each photoconductor 211a~211j according to the fixed picture.

Next, operations of a vehicle meter as the LED display device in the fourth embodiment are described referring to FIG. 16.

First of all, the control unit 231 in the fourth embodiment performs a process for indicating car speed in the same way as the third embodiment. Namely, in step S21, car speed is calculated on the basis of a car speed signal from the waveform shaping circuit 132 in the same way as the first embodiment (Ref. to step S1~step S4). The angle position of the light emitting disc 210 corresponding to current speed, namely, the indicating angle position for car speed to be indicated by the slit 221 of the slitted disc 220 is calculated. Then, in step S31, the control unit 231 converts the calculated indicating angle position into indication data (r, θ) showing coordinates on the light emitting disc 210. In this indication data, r means coordinates position in the radius direction. It is possible to select a number corresponding to the number of the photoconductor 211a~211j as r representing the position in the radius direction. θ means coordinates position in the circumference direction. It is possible to select an optional position of each photoconductor 211a~211j in the circumference direction in series as θ of the circumference direction. In case of car speed indication, emission from the photoconductor 211a~211j extends across the whole length of the slit 221, so that the position in the radius direction r means the selection of all photoconductors 211a~211j. In addition, the position in the circumference direction θ means the selection of the same angle position about all photoconductors 211a~211j for one speed indicating position.

On the other hand, in case of image indication, in step S32, the control unit 231 converts picture data on a desired picture to be indicated into indication data (r, θ), representing the indication position coordinates on the light emitting disc 210. Namely, the positions in the radius direction r and in the circumference direction θ on the light emitting disc 210 are decided according to the pictures to be indicated. It is possible to indicate an image or the like in full color by deciding emission colors of the photoconductors 211a~211j at the coordinates under the control of the control unit 231 at the same time.

After that, in step S33, the control unit 231 selects the indication content of the LED display device, namely, it selects between a speed indication or a picture indication by external input. It is possible to program the control unit so as to automatically switch a speed meter on the LED display device to a warning indication on the LED display device at the time of warning lamp lighting as the external input. Under the control of the control unit 231, the motor driver 203 drives the drive unit 191 and the slitted disc 220 rotates in the fixed direction (clockwise direction) at a high speed. In addition, in step S22, an output signal from the rotary encoder 195 is input and a current rotation angle position of the slit 221 is monitored. Then, in step S34, the control unit 231 decides an LED drive signal of the LED driver array according to the indication content selected in step S33, on the basis of the output signal from the rotary encoder 195.

Namely, in case of speed indication, the LED drive signal is decided on the basis of the indication data (r, θ) for speed indication. In case of picture indication, the LED drive signal is decided on the basis of the indication data (r, θ) for picture indication. The LED drive signal conveys the timing at which the LED unit 120 is driven and which LED unit 120 is driven by the LED driver array 232. When the slit 221 comes to the coordinates position, namely, the indication data position, the LED unit 120 for emission of the corresponding photoconductor 211a~211j emits light of a fixed color, and the photoconductor 211a~211j is lit on the basis of the LED drive signal synchronously with the coming of the slit 221. The LED unit 120 is extinguished at positions other than the coordinates position. Therefore, emission in a fixed color can be obtained at the fixed coordinates position of each photoconductor 211a~211j through the slit 221 which rotates at a high speed, and desired pictures such as letters and figures and so on can be displayed in addition to a speed indication owing to an afterimage effect, like the third embodiment.

The LED display device in the fourth embodiment controls the photoconductors 211a~211j together, so that it can be used as a speed meter for indicating car speed like the third embodiment and it can have the same effect. In addition, in the LED display device in the fourth embodiment, the control unit 231 controls the emission timing of the LED unit 120 corresponding to the photoconductor 211a~211j according to a picture to be indicated (speed indication or picture indication). When the slit 221 comes to the fixed angle position, the control unit 231 makes the fixed photoconductor 211a~211j emit light, and the photoconductor 211a~211j is lit. Therefore, light is radiated from the LED unit 120 through the slit 221 at the coordinates position of the light emitting disc 210 according to a picture and the picture is indicated by emission owing to an afterimage effect. At that time, the indication of the circumference direction by the photoconductor 211a~211j becomes continuous with the movement of the slit 221. Compared with a dot matrix indication, it is smoother. As a result, a desired picture can be indicated by using the LED unit 120, and the picture quality is improved.

It is preferable to make the width of the slit 221 as narrow as possible at the point of the improvement in picture quality. In addition, it is also preferable to make the width of each photoconductor 211a~211j as narrow as possible at the point of the improvement in picture quality. Moreover, if the number of the photoconductors 211a~211j is larger, then more kinds of images can be indicated.

Figure 17:
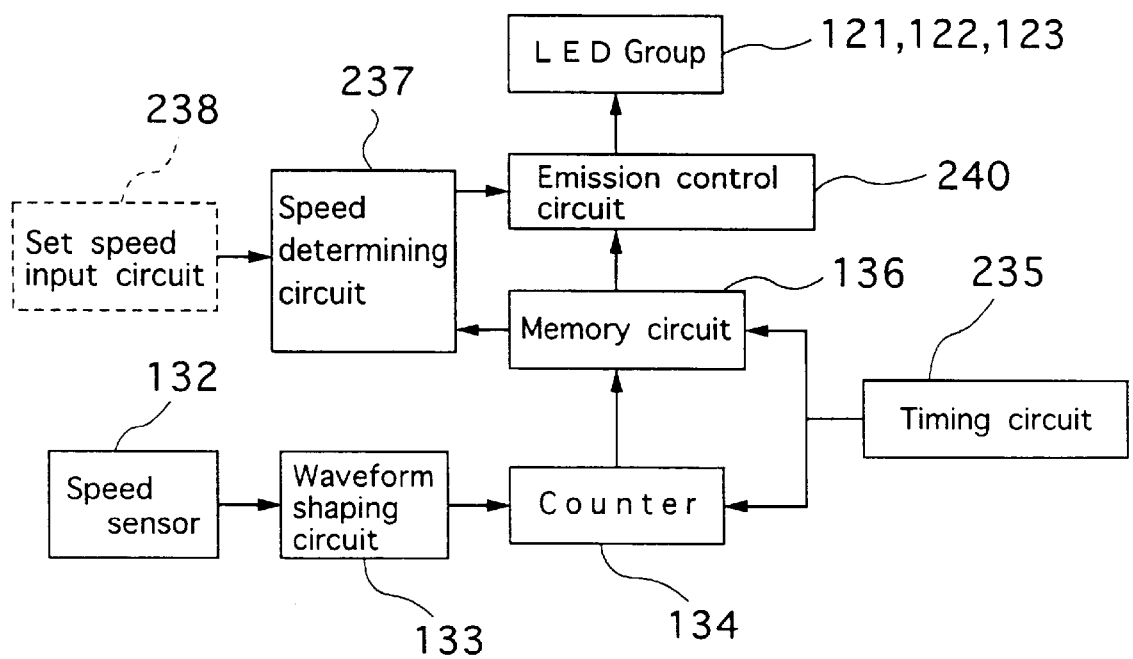
FIG. 17 is a block diagram showing a circuit corresponding to a speed meter as an LED display device in a fifth embodiment of the invention.
Figure 18:
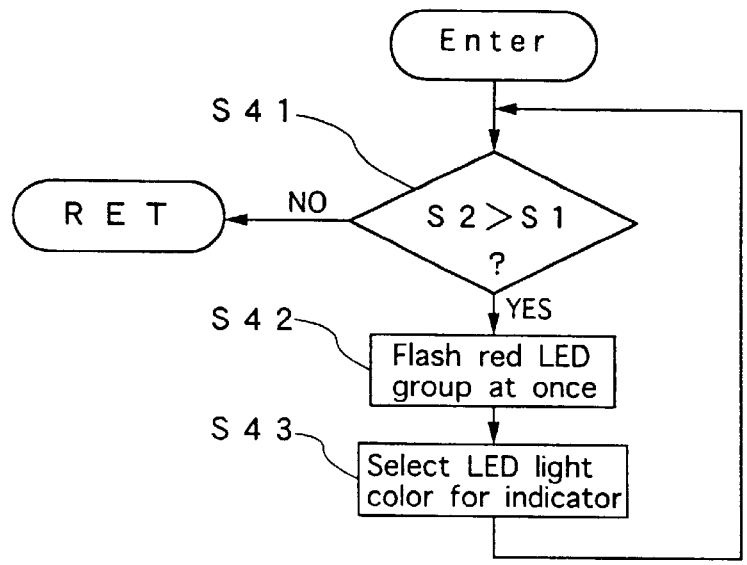
FIG. 18 is a flowchart showing a control operation of an excess speed warning for the speed meter, in the fifth embodiment of the invention.

FIG. 17 and FIG. 18 show a vehicle meter as an LED display device of a fifth embodiment in the invention.

The vehicle meter in the fifth embodiment can be applied to a car meter (not shown) where a speed meter, tachometer, fuel gauge, temperature gauge and so on are arranged like the first embodiment. It can be embodied in an analog speed meter in particular. The structure of the speed meter is the same as that of the first embodiment shown in FIG. 1 to FIG. 4. Namely, the speed meter of the fifth embodiment is comprised of an indicator 110 and an LED unit 120 like the first embodiment. However, the fifth embodiment is different from the first embodiment in its electrical control system, as shown in FIG. 17.

An emission control unit 240 in the fifth embodiment is comprised of a CPU, a ROM and a RAM (and other components), and it is used for controlling speed indication using a pointer 113 of the indicator 110 in the same manner as the control unit 130 of the first embodiment. For example, the emission control circuit 240 executes a main program which is the same as the program for indicating speed in the first embodiment shown in FIG. 6, as a part of a circuit shown in FIG. 17.

In FIG. 17, a detecting signal from a speed sensor such as a photoelectric type sensor or the like is input into a counter 134 through a waveform shaping circuit 133. The detecting signal is calculated from the opening of a gate to the closing of the gate by a timing circuit 235. Then, the calculated value is stored in a memory circuit 136, and it is input into the emission control circuit 240. It is used for controlling emission of each LED unit 120 and a group of LEDs 121, 122 and 123 by use of the emission control circuit 240. The calculated value determined by the counter 134 is input into a speed determining circuit 237, where it is used for judging whether or not the current speed exceeds a setting speed. When the current speed exceeds the setting speed, a warning operation is performed by the emission control circuit 240.

The fifth embodiment is characterized by the warning operation performed by the emission control circuit 240 which is described hereafter.

The setting speed is usually equal to a speed value (e.g., 100 km/h) of a superhighway which is previously input. The warning operation performed by the emission control circuit 240 is used for warning the driver on a superhighway with a common warning buzzer. It is possible to set the setting speed to an optional speed which users desire or to a speed limit of the road being traveled. Namely, as shown in FIG. 17, a set speed input circuit 238 is connected to the speed determining circuit 237. Other setting speeds such as a setting speed on an ordinary road and so on can be freely input by external input. The emission control circuit 240 can warn drivers when they are in excess of the setting speed. External input of the setting speed is usually performed by the users themselves. If a traffic information communication system is constructed in the future, setting speed data from an information beacon provided to a road being traveled can be input automatically.

Next, an emission control operation of the LEDs 121, 122 and 123 by the emission control circuit 240 at fixed warning time is described, referring to FIG. 18.

As shown in FIG. 18, when a running speed S2 exceeds a set speed S1 during a usual speed indication in step S41, the emission control circuit 240 makes all the red LEDs 121, namely, the group of the red LEDs 121 flash on and off in step S42 and a warning emission indication is performed viewable by the driver. The emission control circuit 240 makes the LED unit 120 of the pointer 113 have different emission color from that of the LEDs 121, 122 and 123 used for warning emission in step S43, and it keeps the speed indication. Namely, in the fifth embodiment, the warning emission color is red, so that the emission color of the LED unit 120 corresponding to the pointer 113 indicating the vehicle's speed is set to a color other than red. It is preferable to set it to a color having enough contrast to red, to facilitate the drivers' ability to distinguish through the sense of sight, for example, blue.

The fifth embodiment comprises a sensor circuit comprised of the speed sensor 132, the timing circuit 235, the counter 134 and the memory circuit 136, and an emission control means comprised of the speed determining circuit 237 and the emission control circuit 240 for lighting the whole indicator 110 and making drivers recognize when exceeding the setting speed as the first information. In case the set speed input circuit 238 is connected, the set speed input circuit 238 constitutes a part of the emission control means.

As mentioned above, in the fifth embodiment, for example, all the red LEDs 121 of the LED unit 120 flash on and off and emit light all together at the fixed warning time, namely, when the vehicle is moving at a speed exceeding the setting speed and the indicator 110 emits light for warning while flashing on and off. Red flashing light radiated from each red LED 121 enters into a corresponding radially extending photoconductor piece 111 of the pointer 113 from the periphery of the indicator 110. The incident light is led from the photoconductor piece 111 to the reflection surface 112, and it is reflected to the front surface of the indicator 110 by the reflection surface 112. Therefore, the corresponding pointer 113 is lit in red while flashing on and off. As a result, the whole indicator 110 is lit for warning while flashing on and off. Then, drivers are warned by seeing the emission of the indicator 110.

As a result, the indicator 110 is lit in a fixed color such as red and so on when the vehicle exceeds the setting speed on a superhighway or the like, and it can adequately warn drivers as the first information through the sense of the sight, momentarily and surely.

Next, a vehicle meter formed with an LED display device in a sixth embodiment to a ninth embodiment of the invention is described referring to FIG. 19 to FIG. 23.

The machinery constitution of the vehicle meter for the sixth embodiment to the ninth embodiment can be as described above for the first embodiment as shown in FIG. 1 to FIG. 3. In addition, the speed indicating control system can be as described above in relation to FIG. 5. Usually, speed is indicated by the pointer 113 according to the same main program as shown in FIG. 6.

On the other hand, the sixth to ninth embodiments are different from the fifth embodiment in its emission control of LEDs 121, 122 and 123 by an emission control means.

Figure 19:
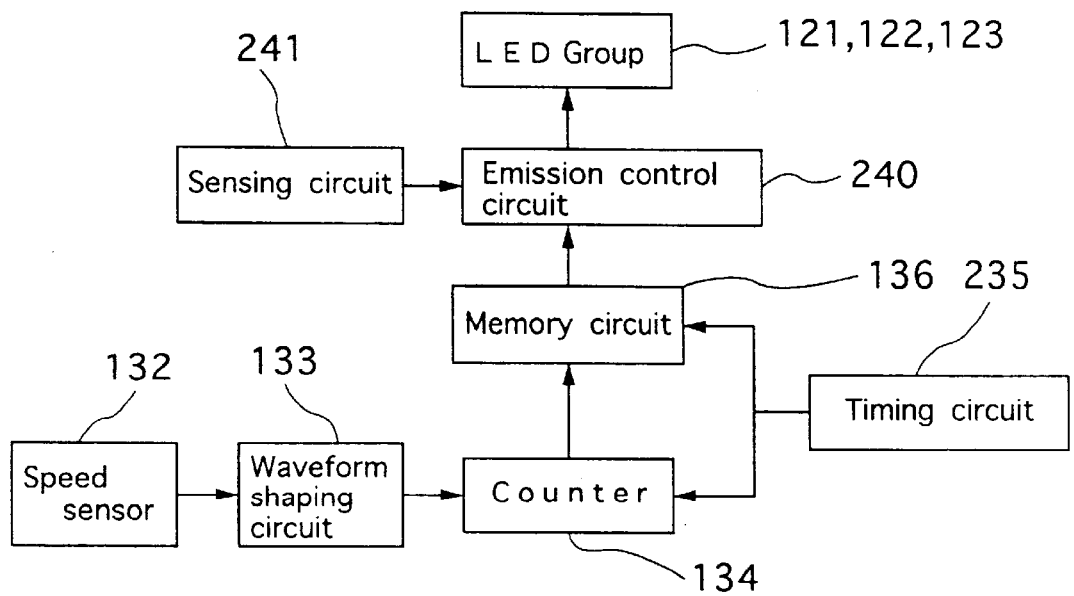
FIG. 19 is a block diagram showing a circuit corresponding to a speed meter as an LED display device in a sixth embodiment of the invention.

First, the electrical constitution (i.e., the control system) of the vehicle meter in the sixth embodiment of the invention is described referring to FIG. 19.

The vehicle meter of the sixth embodiment is different from that of the fifth embodiment in that a sensing circuit 241 having a function for detecting the distance between cars is connected to an emission control circuit 240 instead of a speed determining circuit 237. Other aspects of the system are the same as the fifth embodiment. Namely, the vehicle meter of the sixth embodiment performs warning emission operations using an indicator 110 according to the distance between cars. The emission control means is comprised of the sensing circuit 241 for detecting the distance and the emission control circuit 240 for lighting the indicator 110 for warning when the distance reaches a fixed value or less.

Figure 20:
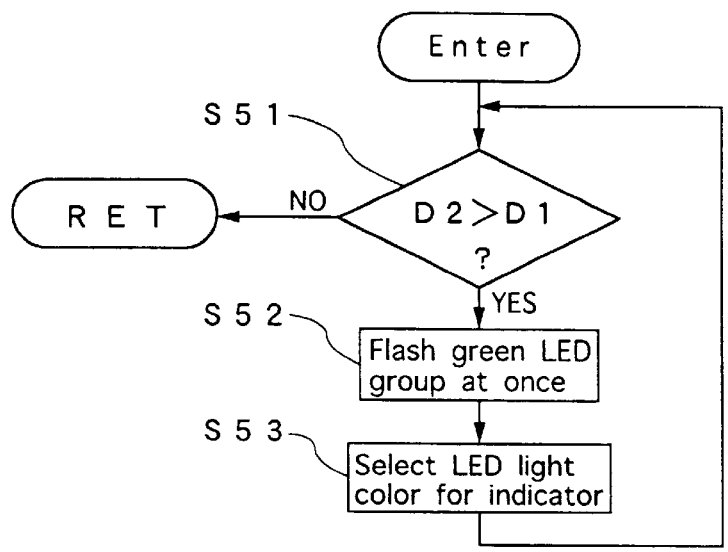
FIG. 20 is a flowchart showing a control operation of a warning emission for the speed meter in the sixth embodiment of the invention.

Next, operations of warning emission control of the vehicle meter in the sixth embodiment are described referring to FIG. 20.

As shown in FIG. 20, when a distance D2 is determined to be exceeding a predetermined distance D1 in step S51, performed during usual operation of speed indication, in step S52, the emission control circuit 240 makes all the green LEDs 122, namely, the group of green LEDs 122 flash on and off all together, and a warning emission indication is performed for drivers. In addition, the emission control circuit 240 makes the emission color by an LED unit 120 of the pointer 113 different from the colors of the LED 121, 122 and 123 used for warning emission in step S53 and it keeps speed indication by the pointer 113. Namely, in the sixth embodiment, warning emission color is green, so that the emission color of the LED unit 120 corresponding to the pointer 113 during indicating speed is set to a color other than green. It is preferable to set it to a color having enough contrast to green so that it catches the drivers' attention enough through the sense of sight, for example, red and so on.

In the sixth embodiment, for example, all the green LEDs 122 of the LED unit 120 flash on and off all together, and the indicator 110 emits light for warning while flashing on and off at the time of the fixed warning, namely, at the time when the distance is too short. Then, green flashing light radiated from each green LED 122 enters into the corresponding photoconductor piece 111 of the pointer 113 from the periphery of the indicator 110. The incident light is led from each photoconductor piece 111 to the reflection surface 112, and it is reflected to the front surface of the indicator 110 by the reflection surface 112. The reflected light makes the corresponding pointer 113 emit green light flashing on and off. As a result, the whole indicator 110 emits a warning light flashing on and off. Therefore, a driver receives a fixed warning by seeing the emission of the indicator 110.

As a result, when the distance is too short, the emission of the indicator 110 in a fixed color such as green and so on can give warning as the first information to a driver through the sense of sight momentarily and surely and call one's attention.

In the sixth embodiment, the most suitable distance for safety may be calculated taking into account the vehicle's running speed in order to give warning to a driver when the distance is not suitable.

Next, a vehicle meter in a seventh embodiment is described hereafter.

As not shown, the vehicle meter of the seventh embodiment has the same circuit constitution (control system) as that of the sixth embodiment except that the sensing circuit 241 in the sixth embodiment for detecting the distance shown in FIG. 19 is replaced with a sensing circuit for detecting a vehicle malfunction. Namely, an emission control means is provided in the seventh embodiment which comprises a sensing circuit for detecting a vehicle malfunction as a self diagnosis circuit, and an emission control means 240 for making an indicator 110 emit light to warn the driver of a vehicle malfunction on the basis of a signal from the sensing circuit.

Figure 21:
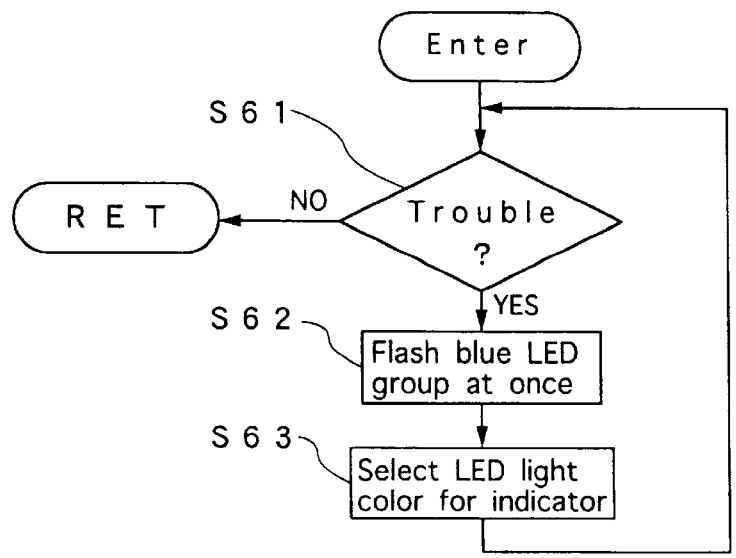
FIG. 21 is a flowchart showing a control operation of a warning emission for a speed meter as an LED display device in a seventh embodiment of the invention.

Next, operations of warning emission control for the vehicle meter in the seventh embodiment are described referring to FIG. 21.

When some malfunction is found somewhere in a vehicle during usual operation of speed indication, as determined in step S61, the emission control circuit 240 makes all blue LEDs 123, namely, a group of blue LEDs 123, flash on and off all together in step S62 and a warning emission indication is thus performed to alert the drivers. In addition, the emission control circuit 240 makes the emission color by an LED unit 120 of a pointer 113 different from the colors of an LED 121, 122 and the LED 123 used for warning emission in step S63 and it keeps speed indication by the pointer 113. Namely, in the seventh embodiment, the warning emission color is blue, so that the emission color of the LED unit 120 corresponding to the pointer 113 during indicating speed is set to be a color other than blue. It is preferable to set the speed indicating color to a color having enough contrast to blue so as to adequately call the drivers' attention through the sense of sight, for example, red and so on.

In the seventh embodiment, for example, all the blue LEDs 123 of the LED unit 120 flash on and off all together, and the indicator 110 emits light for warning while flashing on and off at the time of the fixed warning, namely, at the time when some malfunction occurs in a vehicle. Then, blue flashing light radiated from each blue LED 123 enters into a corresponding photoconductor piece 111 of the pointer 113 from the periphery of the indicator 110. The incident light is led from each photoconductor piece 111 to a reflection surface 112 and it is reflected to the front surface of the indicator 110 by the reflection surface 112. The reflected light makes the corresponding pointer 113 emit light of blue on flashing on and off. As a result, the whole indicator 110 emits light for warning while flashing on and off. Therefore, a driver notices a fixed warning by seeing the emission of the indicator 110.

As a result, when some malfunction occurs in a vehicle, the emission of the indicator 110 in a fixed color such as blue and so on can give warning as the first information to a driver through the sense of sight, momentarily and surely. The occupying area of a common warning lamp on a meter panel may typically be small, so that it is difficult to call driver's attention through the sense of sight who looks forward during driving. However, in the seventh embodiment, the whole indicator 110 emits light, so that the driver's attention can be called through the sense of sight easily and surely.

Next, a vehicle meter of an eighth embodiment is described.

In the fifth to seventh embodiments, the indicator 110 emits a warning light in the vehicle meter of the fifth to the seventh embodiments. In the eighth embodiment, an indicator 110 is provided which emits light at the point of visibility in the vehicle meter. However, its circuit constitution is the same as that of the sixth embodiment except that the sensing circuit 241 for detecting the distance in the second embodiment shown in FIG. 19 is replaced with a sensing circuit (not shown) for detecting light quantity.

Namely, the vehicle meter in the eighth embodiment has the same machinery constitution and electrical constitution as that in the fifth to seventh embodiments. On the other hand, an emission control means in the eighth embodiment is comprised of a sensing circuit for detecting light quantity in a car and an emission control means 240 for setting the emission color of the indicator 110 to blue group color when light quantity in a car is a predetermined value or less, and setting the one to red group color when the light quantity exceeds the predetermined value. The emission color of the indicator 110 can be one or more (combined) various colors by mixing the colors of LEDs 121, 122 and 123 with each other under emission control.

Figure 22:
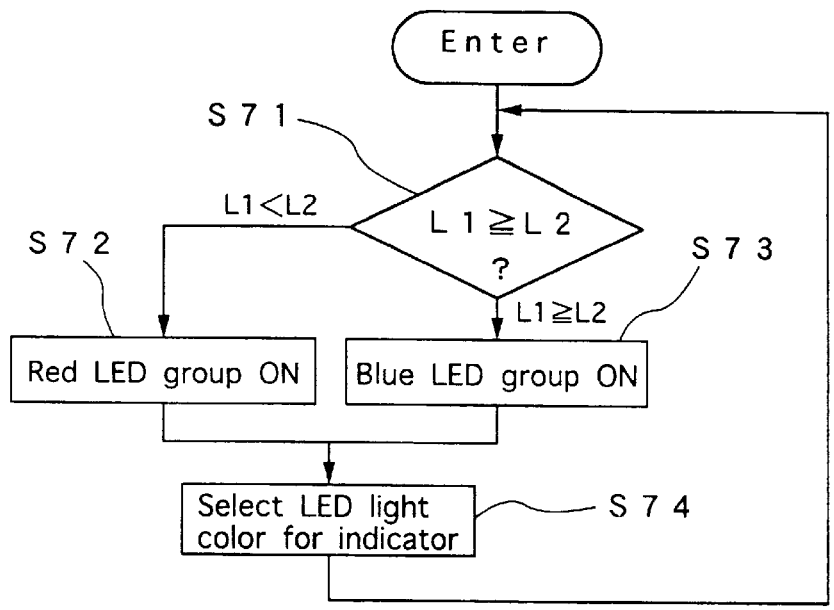
FIG. 22 is a flowchart showing a control operation of an emission for a speed meter as an LED display device in an eighth embodiment of the invention.

Next, an emission control operation of the vehicle meter in the eighth embodiment is described referring to FIG. 22.

First, when a driver gives a fixed operation starting condition to the emission control circuit 240, for example, an ignition switch is switched to ACC (accessory), or another provided switch is switched on and so on, the emission control circuit 240 judges in step S71 whether or not a current light quantity L2 exceeds a predetermined light quantity L1 which is previously set. The predetermined light quantity L1 is set at about a medium value between a light quantity corresponding to daytime and a light quantity corresponding to nighttime, according to the luminosity curve in the well-known Prukinje effect, e.g. at a value equivalent to a light quantity at the evening time. Such a light quantity detection can be carried out either inside or outside of a car. However, since an object of this embodiment is to improve the visibility of the meter located inside of the car, the light quantity is preferably detected inside the car. Next, if the current light quantity L2 exceeds the predetermined light quantity L1 (L1<L2) at the daytime or the like, the emission control circuit 240 drives the red LEDs 121 of all LED units 120, namely the red LED group, in step S72. On the other hand, if the current light quantity L2 is not more than the predetermined light quantity L1 (L1≧L2) which may occur, e.g., at nighttime or while driving in a tunnel, etc., the control circuit 240 lights up the blue LEDs 123 of all the LED units 120, namely the blue LED group, in step S73. In either case, the control circuit 240 differentiates the emission color of the LED unit 120 for the pointer 113 from the emission color of the LED 121, 122, 123 used for the indicator 110 in step S74, thereby keeping the speed indication- of the pointer 113 distinguished.

That is, in the eighth embodiment, the emission color of the LEDs 121, 122, 123 for the indicator 110 is red in step S72, and blue in step S73, so that the emission color of the LED unit 120 corresponding to the currently displayed pointer 113 is preferably a color having enough contrast to the red or blue to sufficiently catch the attention of the driver. For example, such a color may be set as blue or the like in the step S72, and red or the like in the step S73.

In the eighth embodiment, the emission color for the indicator 110 is automatically set to a bluish color or a reddish color according to the difference of the light quantity at the daytime or nighttime or the like. Namely, when the light quantity is small at the nighttime or in the tunnel or the like, the indicator 110 is illuminated with a bluish color which is regarded as a conspicuous color in view of the Prukinje effect. On the other hand, when the light quantity is large at the daytime or the like, the indicator 110 is illuminated with a reddish color which is regarded as a conspicuous color in view of the Prukinje effect. As a result, the indicator 110 and so on can be lit up with a suitable color depending on the light quantity in the exterior environment. Thus, the driver can always see the indicator 110 clearly regardless of the change in the light quantity.

Next, a ninth embodiment of a vehicle meter is described.

The ninth embodiment of the vehicle meter is different from the fifth to eighth embodiments in that the indicator 110 is illuminated in view of the user's comfort or for similar purposes, though the fifth to eighth embodiments do so for the purpose of warning or visibility. Still, the circuitry thereof is the same as the sixth embodiment except it substitutes a sensing circuit for detecting a temperature for the sensing circuit 241 for detecting the car distance of the sixth embodiment shown in FIG. 19. On the other hand, in the ninth embodiment of vehicle meter, an emission control means selectively combines the different colors of LEDs 121, 122 and 123 to emit various colors of light, thereby illuminating the indicator 110. Namely, the emission control means of this embodiment is composed of a sensing circuit for detecting the temperature and the emission control circuit 240. The control circuit 240 sets the emission color of the indicator into a warm color when the temperature is not more than a fixed value, while setting it into a cool color when the temperature is more than the fixed value, in accordance to the detection signals from the sensing circuit.

Figure 23:
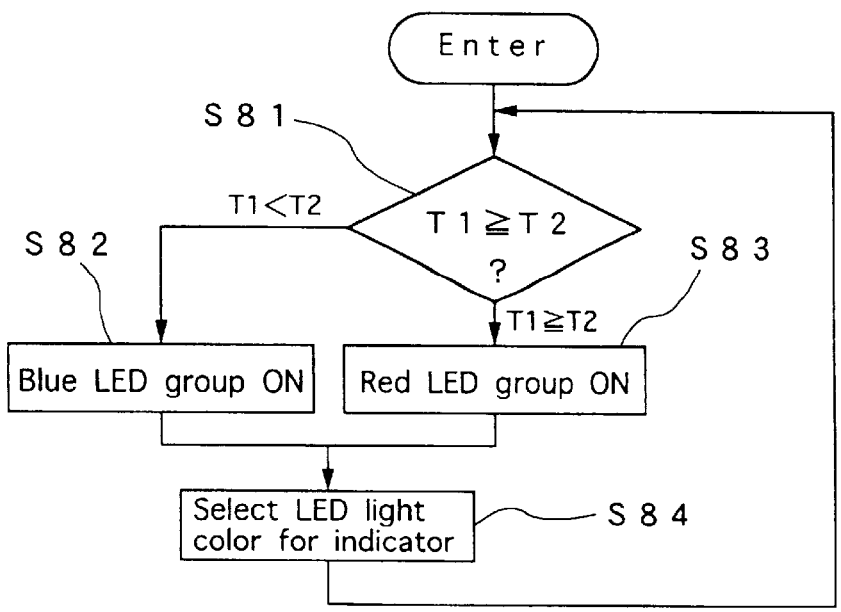
FIG. 23 is a flowchart showing a control operation of an emission for a speed meter as an LED display device in a ninth embodiment of the invention.

An emission control operation of the ninth embodiment of vehicle meter is described referring to FIG. 23.

First, when a driver gives a fixed operation starting condition to the emission control circuit 240, e.g., an ignition switch is switched to ACC (accessory) or on, or another provided switch is switched on and so on, the emission control circuit 240 judges in step S81 whether or not a current temperature T2 exceeds a predetermined temperature T1 which is previously set. The predetermined temperature T1 is set at about a medium value between a temperature which the user feels hot and a temperature which the user feels cold according to a rule of thumb or the like. Such a temperature detection can be carried out either inside or outside of a car. However, since an object of this embodiment is to make the user more comfortable inside the car, the temperature is preferably detected inside the car. Next, if the current temperature T2 exceeds the predetermined temperature T1 (T1<T2), e.g., in summer or the like, the emission control circuit 240 operates all the LED units 120 to emit a bluish color, for example by lighting all the blue LEDs 123 or the blue LED group, in step S82. On the other hand, if the current temperature T2 is not more than the predetermined temperature T1 (T1≧T2), e.g., in winter or the like, the control circuit 240 operates all the LED units 120 to emit a reddish color, for example by lighting all the red LEDs 121 or the red LED group, in step S83. In either case, the control circuit 240 differentiates the emission color of the LED unit 120 for the pointer 113 from the emission color of the LED 121, 122, 123 for the indicator 110 in step S84, thereby keeping the speed indication of the pointer 113 distinguished.

That is, in the ninth embodiment, the emission color of the LEDs 121, 122, 123 for the indicator 110 is blue in step S82, and red in step S83, so that the emission color of the LED unit 120 corresponding to the currently displayed pointer 113 is preferably such a color as has an enough contrast to the blue or red and draws sufficiently a visual attention of a driver. For example, such a color is set as red or the like in the step S82, and as blue or the like in the step S83. While the ninth embodiment chooses blue as the cool color and red as the warm color, other cool color or warm colors may be selected by appropriately operating each color of LED 121, 122 and 123 in combination. Moreover, the predetermined temperature T1 may be set to a plurality of values so that the emission color is changed gradually from the cool color to the warm color according to each value.

In the ninth embodiment, the emission color for the indicator 110 is automatically set to a warm color or a cool color according to a difference in the temperature inside the vehicle. Namely, when the temperature is high, in summer or the like, the indicator 110 is illuminated with a cool color like blue which gives the driver a cool feeling. On the other hand, when the temperature is low in winter or the like, the indicator 110 is illuminated with a warm color like red which gives the driver a warm feeling.

As a result, the indicator 110 and so on can be lit up with a suitable color depending on the temperature of the exterior environment. Thus, the indicator 110 always gives a pleasant feeling to the user. Meanwhile, the ornamentation of the meter can be diversified, thereby improving the decorative effects.

While the LEDs 121, 122 and 123 are driven in a variety of modes for the purpose of the visibility or the comfort of the driver, the illumination color of the indicator 110 may be changed according to the taste of the user by appropriately controlling the light emission of the LEDs 121, 122 and 123 through the emission control means via an operation of the user or the like. Namely, any desired color can be obtained by mixing colors of the LEDs 121, 122 and 123, in addition to the color of each LED 121, 122, 123 on its own, by selectively combining and lighting them by a duty control or the like. The light radiated from the LEDs 121, 122, 123 enters the corresponding photoconductor piece 111 from the circumference of the indicator 110 and is reflected by the reflection surface 112 toward the front surface of the indicator 110. Thus, the outgoing light is seen by the driver as the emitted light color.

As a result, the ornamental design of the vehicle meter can be varied easily and quickly in accordance with the diversified tastes, inclinations and so on of the user. Therefore, various ornamental designs can be obtained, so that the decorative effects of the LED unit can be improved. Namely, the vehicle meter is given a color changing function that the indicator 110 is illuminated with a desired color according to the taste or the likes of the user, by use of the emission control circuit 240.

Moreover, in the fifth to seventh embodiments, one of the single color LEDs 121, 122, 123 is flashed when the indicator 110 is illuminated for warning. Namely, the red LED 121 in the fifth embodiment, the green LED 122 in the sixth embodiment and the blue LED 123 in the seventh embodiment are flashed, respectively. However, other colors producible by LEDs 121, 122, 123 may be flashed instead of the above colors. That is, other colors may be flashed such as the green or blue LED 122, 123 in the fifth embodiment, the red or blue LED 121, 123 in the sixth embodiment and the red or green LED 121, 122 in the seventh embodiment. Furthermore, the emission color of the LED unit 120 may not be a single color like red, green or blue, but it may be a mixed color obtained by mixing them when flashing or lighting the indicator 110. In addition, the LED 121, 122, 123 may not be flashed; rather it may be continuously lit to keep the indicator 110 illuminated. Moreover, all the LED units 120 need not be lit, but a part of the LED units 120 may be lit, as long as substantially the whole indicator 110 can be illuminated to rapidly transmit a fixed warning as rapid information to the driver. For instance, every second or every few LED units 120 may be lit. In case of displaying the speed at the same time, the color of the LED or LEDs 121, 122, 123 used for lighting the pointer 113 for such speed indication is made different from the light color used for the warning indication.

However, if the emission color of the LED 121, 122, 123 is different according to the kind of the warning as in the fifth to seventh embodiments, it is easy to provide the vehicle meter with all three warning functions shown in these embodiments. Namely, in this case, the driver can surely recognize the kind of the warning according to the difference of the light color of the indicator 110.

The fifth, sixth or seventh embodiment may be structured to show the other warning information by the LED unit 120. For example, it may be structured to illuminate the indicator 110 in the same color as the current lighting color of the traffic light which is located in front of the car driver on the road. In this case, the emission control means is composed of a sensing circuit made of a color sensor or the like for detecting the present light color of the traffic light and the emission control circuit 240. The emission control circuit 240 controls the LED unit 120 to illuminate the indicator 110 in substantially the same color as the current color of the traffic light, on the basis of the detection signals of the sensing circuit. Thus, the indicator 110 is lit in the same color as the present color of the traffic light in front of the car on the road, thereby further attracting the attention of the driver who sees the traffic light. Therefore, the driver can accurately and correctly recognize the color of the traffic light.

The sixth embodiment of car distance warning operation may be changed such that the indicator 110 is illuminated for warning when the clearance distance between the car and an obstruction around the car is less than a certain amount. In this case, the emission control means is composed of a sensing circuit made of a distance sensor or the like for detecting the clearance between the vehicle and the obstacle and the emission control circuit 240. The emission control circuit 240 illuminates the indicator 110 for warning on the basis of the detection signals of the sensing circuit. Thus, when the clearance between the vehicle and the obstacle becomes a fixed value or less, the control means lights the indicator 110 for warning. Namely, if the clearance between the car and the obstacle becomes too small, the driver can quickly be alerted to such a fact as a first information, thereby promptly catching his or her attention.

The fifth to seventh embodiments may be structured such that the indicator 110 is operated to give a warning at the time of braking. In this case, the emission control means is composed of a sensing circuit for detecting if a back gear is selected or not and an emission control circuit. The emission control circuit lights up the indicator 110 when the back gear is selected on the basis of the detection signals of the sensing circuit. Thus, the indicator 110 is illuminated for warning by the control circuit when the back gear is selected, so that the driver can quickly be alerted as a first information of the warning without failure, and draw the driver's attention when the vehicle is driven backward.

Moreover, the fifth to seventh embodiments may be modified such that the indicator 110 is operated for a master warning for a variety of safety equipment that are applicable to an advanced safety vehicle (ASV). Main operations of such warnings include a warning for driving asleep, a warning for vehicle danger, a warning for an obstacle at nighttime, a warning for a following car approach, a warning for a road condition, a warning for a rear side area, a warning for lane deviation, a warning for a corner entering speed, and a warning for automatic braking. The LED unit may be structured such that the emission control means illuminates the indicator 110 for the warning when one of the above warnings is operated.

For example, in the case of warning for driving asleep, a sensing circuit properly provided on a vehicle detects and judges driver behavior indicating driving asleep, e.g., on the basis of a steering operation, an action of the vehicle or a driver or the like. Then, the indicator is illuminated to display the warning. In the case of the vehicle danger warning, a properly provided sensing circuit detects a vehicle danger such as a decrease in tire air pressure or a fire generation. Then, the indicator is illuminated for the warning. In the case of the obstacle warning at nighttime, a properly provided sensing circuit such as an infrared sensor detects a human being, obstacle, other cars or the like around the vehicle. Then, the indicator is illuminated for the warning.

In the case of the following vehicle approach warning, a properly provided sensing circuit such as a distance measuring sensor detects an abnormal approach of the following car. Then, the indicator is illuminated for the warning. In the case of the road condition warning, a road condition such as a traffic condition, weather change or present place is informed of by a sign beacon or an artificial satellite. Then, the indicator 110 is illuminated as desired.

In the case of the rear side area warning, a properly provided sensing circuit like a distance measuring sensor detects a vehicle that approaches from the rear side. Then, if the driver changes a lane or turns the car toward the right or left without noticing, the indicator 110 is illuminated for the warning. In the case of the lane deviation warning, a properly provided sensing circuit like a CCD camera detects a lane deviation of a vehicle, and the indicator 110 is illuminated for the warning, so that a driver is prevented from unconsciously deviating from a lane.

In the case of the corner entering speed warning, a properly provided sensing circuit detects a radius of a corner to which a vehicle enters by use of an external information source. Then, if the car's speed when approaching the corner is excessive, the indicator 110 is illuminated for the warning. In the case of the automatic braking warning, in a vehicle which is provided with an automatic brake for a purpose of preventing collision or the like, when a braking amount exceeds a predetermined threshold, the indicator 110 is illuminated for the warning, so that a driver is informed and warned in advance of the braking of the vehicle.

With the above structure, it is possible to carry out the master warning for the various functions of the ASV, which is recently demanded more and more, by the indicator 110 of the vehicle meter of the present invention.

Figure 24:
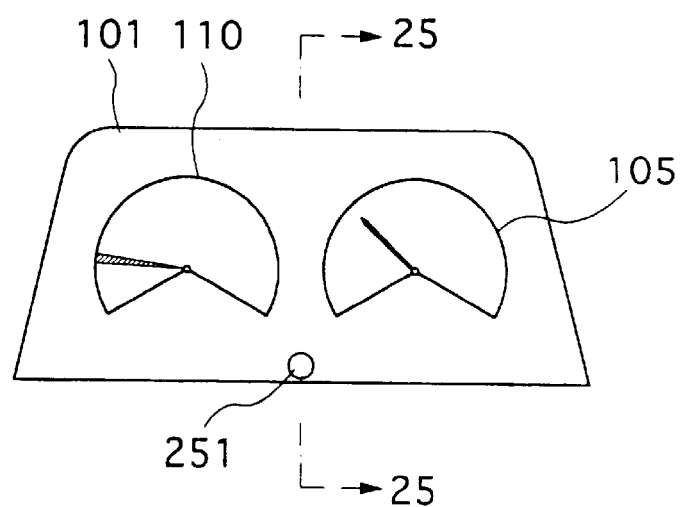
FIG. 24 is a plan view showing the whole car meter to which an LED display device is applied in a tenth embodiment of the invention.
Figure 25:
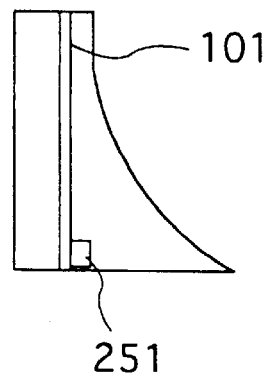
FIG. 25 is a sectional view taken along the line 25—25 in FIG. 24.

FIGS. 24 and 25 show a vehicle meter as a tenth embodiment of an LED display device of the invention.

The tenth embodiment illuminates the indicator in view of the visibility or the like as in the eighth embodiment. Though not shown, its circuitry is the same as the circuitry of the sixth embodiment, except it substitutes a sensing circuit for detecting light quantity for the sensing circuit 241 for detecting the car distance of the sixth embodiment shown in FIG. 19.

Namely, the vehicle meter of the tenth embodiment is disposed on the meter panel 101 as in the fifth to seventh embodiments. It has an indicator which comprises many radially extending photoconductor pieces 111 or pointers 113 and corresponding LED units 120 for radiating light into each photoconductor piece 111. On the other hand, an emission control means of the tenth embodiment comprises a sensing circuit for detecting a quantity of light entering the meter panel 101 and an emission control circuit 240. The emission control circuit varies the emitting light quantity of the LEDs 121, 122, 123 so as to change a luminance of the indicator 110 depending on the quantity of light entering the meter panel 101 on the basis of detection signals of the sensing circuit. The sensing circuit has a photo detecting sensor 251. The photo detecting sensor is located around a central position of a lower end of the meter panel 101, namely between the indicator 110 as the speedometer and the tachometer 105. A desired sensor may be used as the photo detecting sensor 251 such as a CdS (Cadmium Sulphide) detecting the light quantity by a resistance output, a photodiode detecting the light quantity by a current output, a phototransistor detecting the light quantity by an open-collector output, or the like.

In the tenth embodiment of the vehicle meter, first, when a driver gives a fixed operation starting condition to the emission control circuit 240, e.g., an ignition switch is switched to ACC (accessory) or on, or another provided switch is switched on and so on, the emission control circuit 240 changes the luminance of the LED 121, 122, 123 to be operated depending of the signal value outputted from the photo detecting sensor 251 in accordance with the incident light quantity. Thus, the visibility of the indicator 110 in the meter panel 101 is always kept good for the driver. Specifically, the control circuit 240 controls the emission of the LED 121, 122, 123 by the duty control or the like. Namely, it decreases the luminance of the indicator 110 when the incident light quantity to the meter panel 101 is small. On the other hand, it increases the luminance of the indicator 110 when the incident light quantity to the meter panel 101 is large.

In the tenth embodiment, the brightness or luminance of the indicator 110 is automatically changed in accordance with the difference from the incident light quantity to the amount of light of meter panel 101 during the daytime or nighttime. Namely, if the incident light quantity is small, e.g., at nighttime or when in a tunnel or the like, the indicator 110 is illuminated in a darker color. On the other hand, if the incident light quantity is large, e.g., during the daytime or the like, the indicator 101 is illuminated in a brighter color. As a result, the indicator 110 or the like can be set to a suitable color that makes it easy for the driver to see it. Therefore, the driver can always see the indicator 110 clearly regardless of the change of the light quantity.

Figure 26:
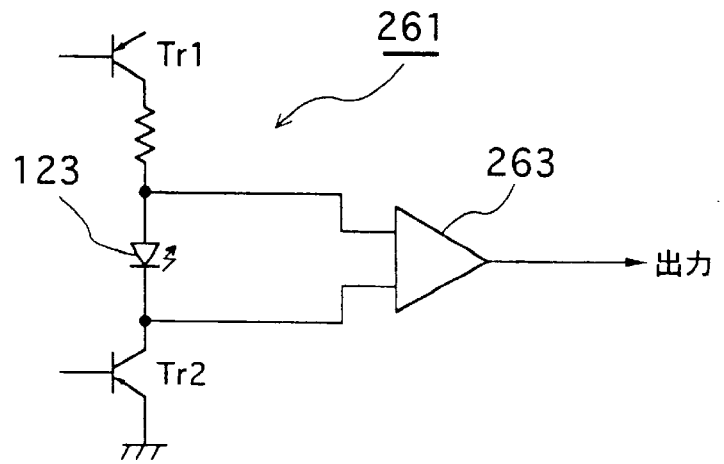
FIG. 26 is a circuit view showing a sensor circuit of a speed meter as an LED display device in an eleventh embodiment of the invention.

FIG. 26 shows a sensing circuit of a vehicle meter as a eleventh embodiment of an LED display device of the invention.

Referring to FIG. 26, the eleventh embodiment uses an LED which is off or does not emit light to the indicator among the LEDs 121, 122 and 123 as a photo detecting sensor. Namely, this embodiment substitutes such an off LED for the photo detecting sensor 251 of the tenth embodiment. The other structures are the same as the tenth embodiment. That is, a sensing circuit 261 of the eleventh embodiment utilizes the blue LED 123, for both the light emission and photo detection, among the LEDs 121, 122 and 123. This is because the blue 123 LED composed of GaN or the like functions as not only the light emitting element but also the photo detecting sensor. Therefore, the eleventh embodiment utilizes such characteristic of the LED, thereby making it unnecessary to additionally provide a photo detecting sensor. Other LEDs may be used instead of the above blue LED 123, as long as it is capable of functioning as a photo detecting sensor. Specifically, the sensor circuit 261 connects an amplifier 263 to opposite ends of the LED 123 so as to measure and output a voltage between both terminals of the LED 123. Both ends of the LED 123 are connected to transistors Tr1 and Tr2 for switching, respectively. Thus, the LED 123 is lighted by pulses, and the power supply time for the LED 123 is changed to variably control the supplied power thereto, thereby varying the luminance of the LED 123. Then, when the LED 123 is off at the time of a dynamic lighting of the LEDs 121–123, namely, either of the transistors Tr1 and Tr2 is off, the voltage between both terminals of the LED 123 is measured and outputted through the amplifier 263, thereby measuring the incident light quantity in the meter panel 101.

The eleventh embodiment needs no other photo detecting sensor, and presents advantages in that cost for the whole device can be reduced and the structure can be made compact, in addition to the advantages of the tenth embodiment.

The emission control means of the tenth or eleventh embodiments may be structured so as to have the function of the emission control means of the eighth embodiment. Namely, it may comprise a sensing circuit like the sensing circuit 261 or the like for detecting the light quantity inside the car and the emission control circuit 240. The emission control circuit in this case sets the illumination color of the indicator 110 in a bluish color when the light quantity inside the car is not more than a predetermined value, and in a reddish color when it is more than the predetermined value, on the basis of detection signals of the sensing circuit. Then, the emission control means may select and combine the different colors of LEDs 121, 122, and 123 to emit a desired color of light so as to illuminate the indicator in such color. Namely, the tenth or eleventh embodiment may be constructed such that it controls one or both of brightness and color of the indicator 110 or the like which constitutes the vehicle meter, depending on an intensity of the quantity of the light entering the meter panel 101. In this case, not only the luminance but also the illumination color of the indicator 110 can be changeably controlled, so that the indicator 110 can be shown to the driver always in an optimum illuminated state.

The tenth or eleventh embodiment may be combined with one of the fifth to seventh embodiments and ninth embodiment so as to also have the additional functions of that other embodiment. While the vehicle meter of the tenth or eleventh embodiment is illustrated in a specific embodiment as the indicator 110 of the speedometer, it may be provided in other vehicle meters like the tachometer 105.

Moreover, the fixed operations of the fifth to eleventh embodiments and the various modifications thereof may be performed by use of the LED display device of the second to fourth embodiments. Furthermore, the photoconductor disc 150 or the light emitting disc 210 may be used instead of the indicator 110 so as to be lighted by the LED units 120 at the time of a fixed warning operation. In this case, the pointer disc 160 or the slitted disc 220 is substituted with a mechanical structure similar to the conventional pointer of the speedometer so as to indicate the speed thereby.

Figure 27:
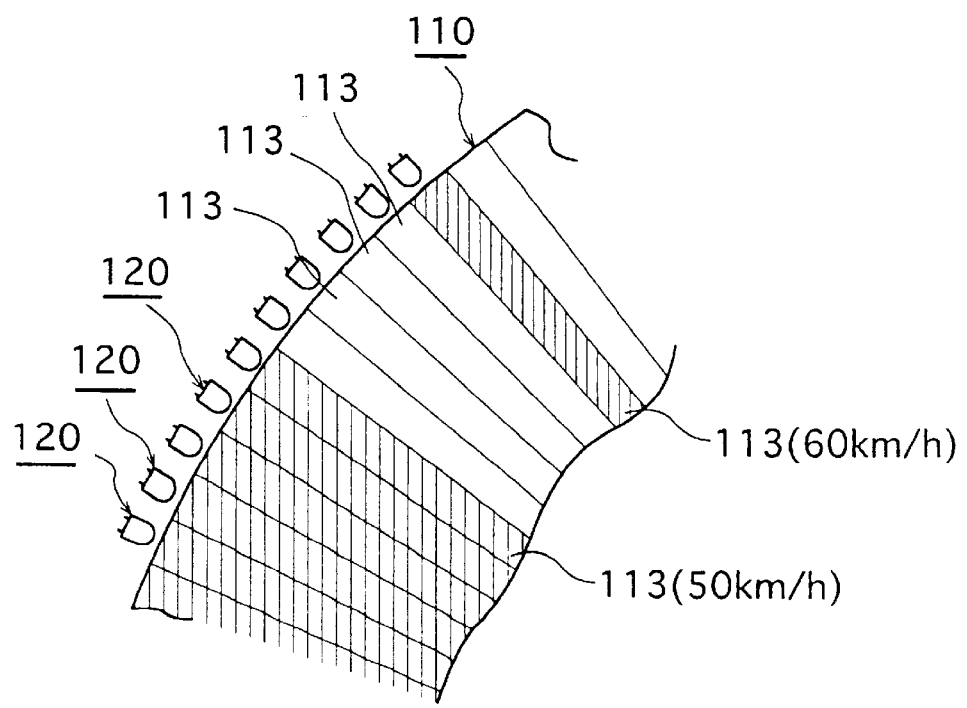
FIG. 27 is an enlarged plan view showing a speed meter as an LED display device in a twelfth embodiment of the invention.
Figure 28:
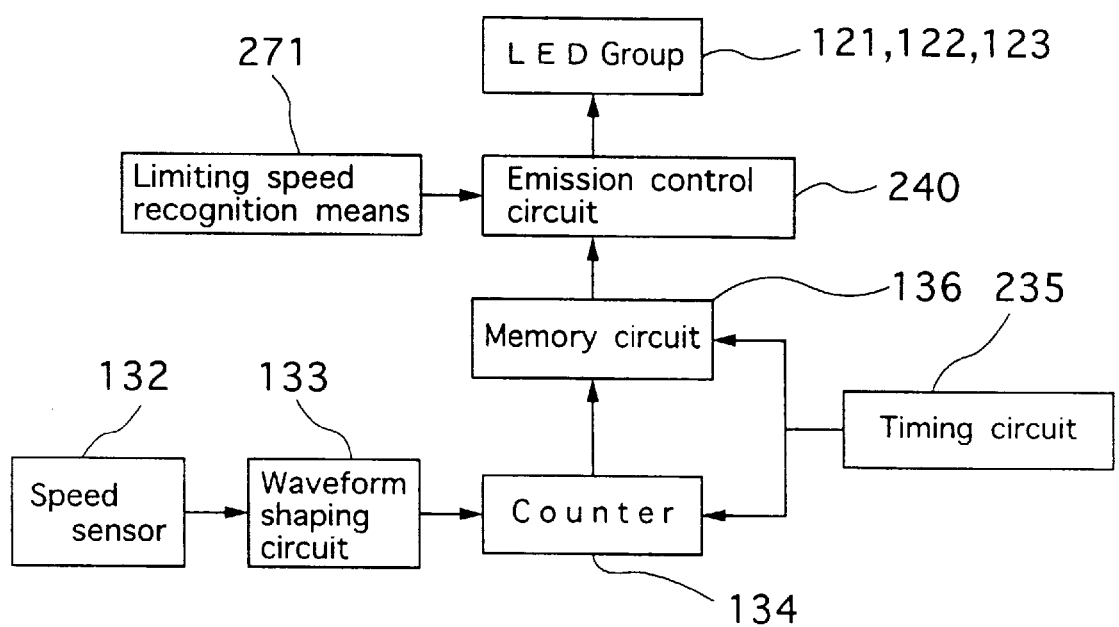
FIG. 28 is a block diagram showing a circuit of the whole speed meter in the twelfth embodiment of the invention.

FIGS. 27 and 28 show a vehicle meter as a twelfth embodiment of an LED display device of the invention.

As shown in FIGS. 27 and 28, the twelfth embodiment automatically recognizes limit speed information pertaining to a road on which the vehicle is currently traveling by the use of another communication means, thereby showing the information in the speedometer. Namely, the vehicle meter of the twelfth embodiment has the indicator 110 comprising many pointers 113 circularly arranged, and LED units respectively illuminating the pointers 113. An emission control means of the twelfth embodiment has a similar structure to the emission control means of the sixth embodiment shown in FIG. 19. However, it has a limiting speed recognition means 271 instead of the sensing circuit. The recognition means 271 is connected with the emission control circuit 240 and recognizes the limiting speed of the road on which the car is running.

The emission control circuit 240 of the twelfth embodiment drives the LED unit 120 at least at the position corresponding to the current running speed on the basis of the detection signals of the speed sensor 132. The speed sensor 132 comprises a sensing circuit for detecting the current running speed. The LED unit 120 is driven so as to illuminate the pointer 113 at the position corresponding to the sensed speed. The control circuit 240 operates the LED unit at the position corresponding to the limiting speed on the basis of the signals of the recognition means 271 so as to illuminate the pointer 113 at the position corresponding thereto. For example, the limiting speed recognition means 271 can be structured such that it receives an information signal relating to the limiting speed or the like from an information beacon installed on the road so as to recognize the limiting speed of the road traveled. The other structure is similar to the emission control means of the vehicle meter according to the sixth embodiment shown in FIG. 19.

Specifically in the twelfth embodiment, the speed sensor 132 measures the current running speed of the vehicle. On the other hand, the limiting speed recognition means 271 recognizes the limiting speed of the road being traveled, and inputs that information into the emission control circuit 240.

Then, the control circuit 240 drives the LED unit 120 at the angular position corresponding to the current running speed on the basis of the signals from the speed sensor 132, thereby illuminating the pointer 113 at the position corresponding thereto. For example, as shown in FIG. 27, when the current running speed is 50 km/h, the control circuit 240 lights the pointer 113 at the position corresponding to the scale of 50 km/h. Here, as illustrated, all the pointers 113 from 0 km/h to 50 km/h may be illuminated to improve the visibility of the driver. Only the pointer 113 corresponding to the running speed may be lit up. In this case, the speed change is shown by an angular position change of the illuminated pointer 113.

On the other hand, the control means 240 decides the limiting speed of the road traveled on the basis of the signals from the recognition means 271. Then, the control means 240 drives the LED unit 120 at the angular position corresponding to such limiting speed to radiate the light into the photoconductor piece 111, thereby illuminating the corresponding pointer 113. For example, as shown in FIG. 27, when the limiting speed is 60 km/h, the pointer 113 corresponding to the scale of 60 km/h is illuminated.

In the above embodiment, it is preferable to differentiate the illumination color between the pointer 113 showing the running speed and the pointer 113 showing the limiting speed, so that the driver may easily distinguish the running speed from the limiting speed. For example, the LED unit 120 is controlled to illuminate the pointer 113 showing the running speed in blue or green or the like, while illuminating the pointer 113 showing the limiting speed in red or amber or the like. In this case, when the running speed becomes not less than the limiting speed, the illumination color of the pointer 113 showing the running speed is mixed with the illumination color of the pointer 113 showing the limiting speed. Therefore, the mixed portion can be recognized for the limiting speed. The pointer 113 showing the limiting speed may be flashed so as to distinguish it from the continuously illuminated pointer 113 showing the running speed. In this case, when the running speed becomes not less than the limiting speed, the pointer 113 showing the limiting speed is flashed, so that it is possible to distinguish and recognize the limiting speed and the running speed, too.

The vehicle meter of the twelfth embodiment displays both the running speed and limiting speed on the indicator 110, so that the driver can drive the car while recognizing both of them and can effectively refrain from speeding.

FIGS. 29 to 40 show a vehicle meter as a thirteenth embodiment of an LED display device of the invention.

Figure 29:
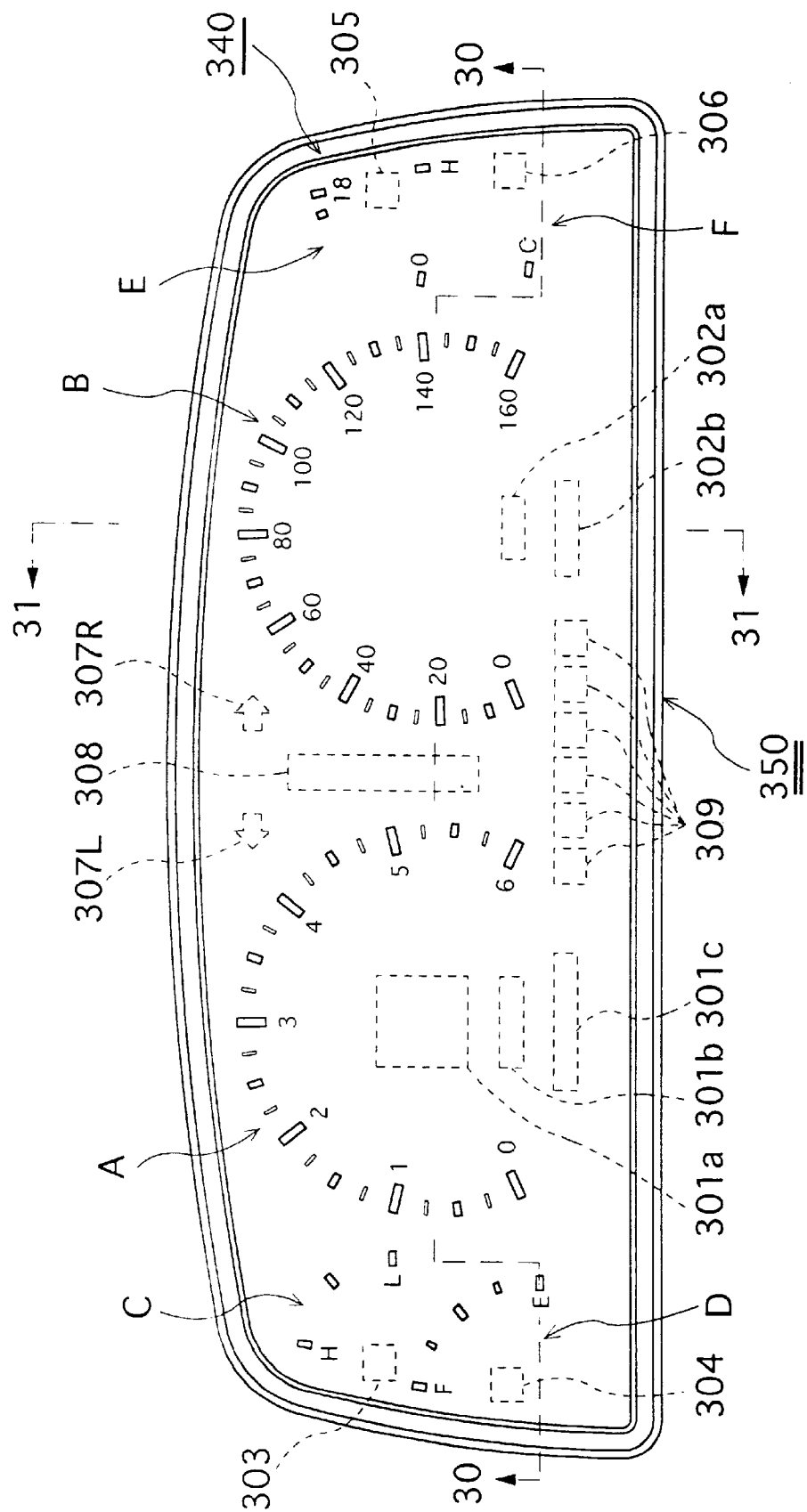
FIG. 29 is a front view of an LED display device in the thirteenth embodiment of the invention.
Figure 30:
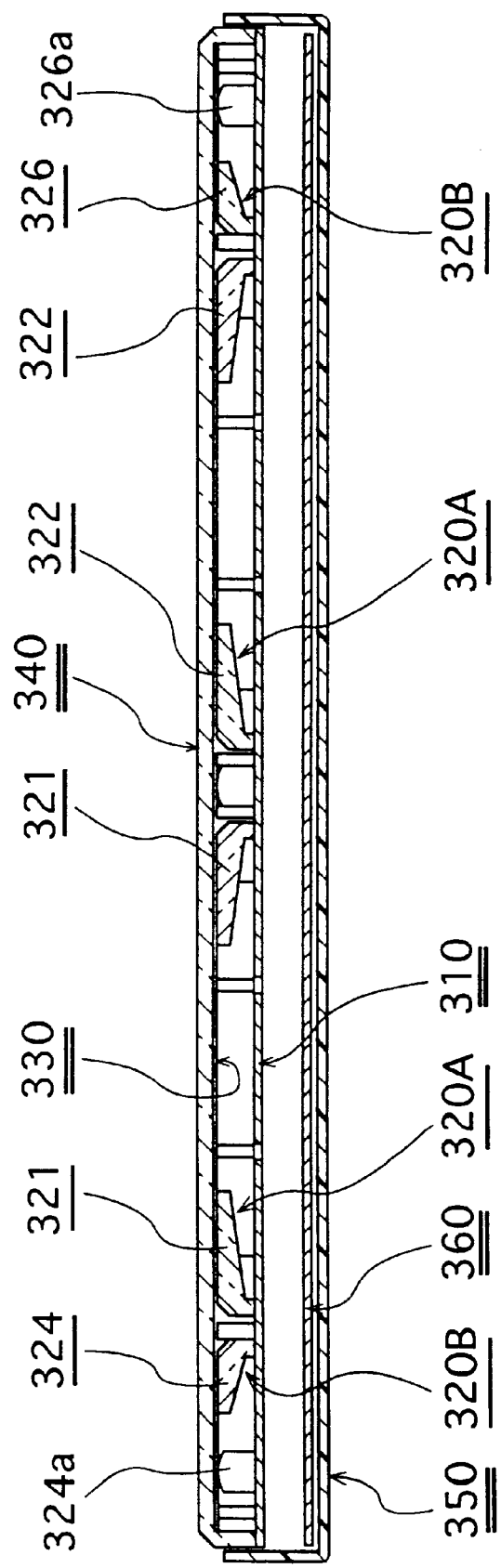
FIG. 30 is a sectional view taken along the line 30—30 in FIG. 29.
Figure 31:
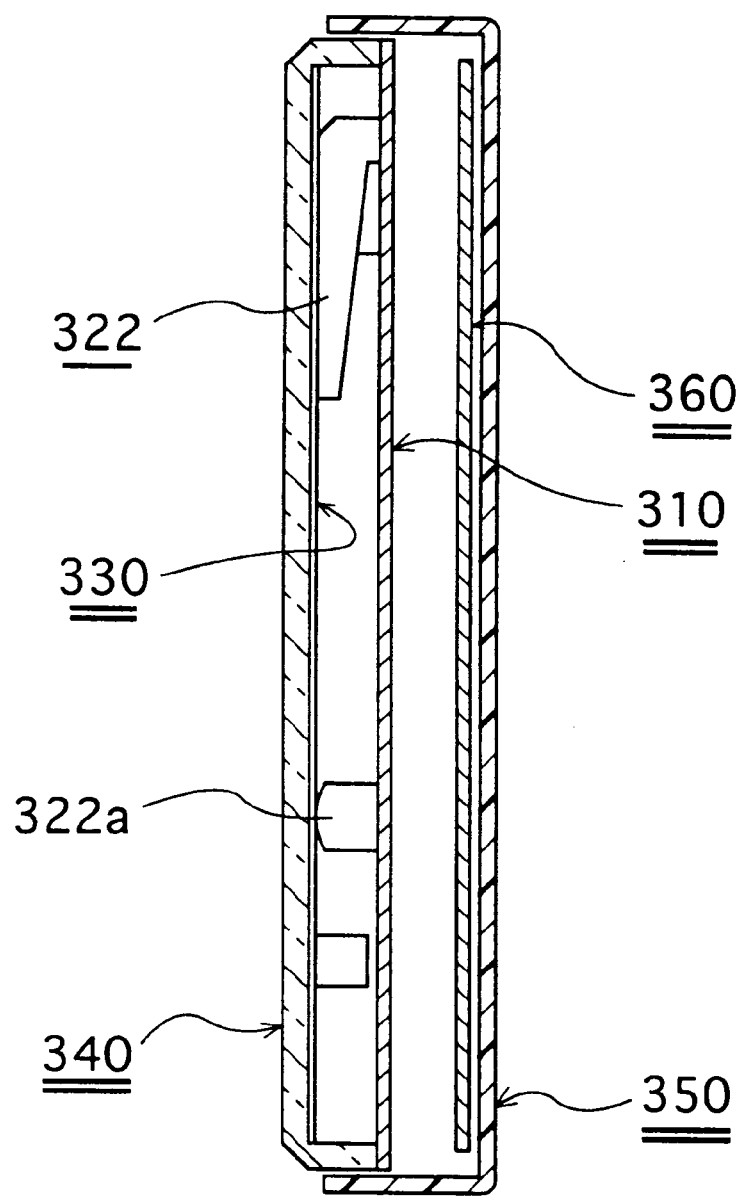
FIG. 31 is a sectional view taken along the line 31—31 in FIG. 29.

Referring to FIGS. 29 to 31, the thirteenth embodiment of an LED display device is provided in a vehicle meter panel. The meter panel contains a variety of indicators: tachometer A, speedometer B, oil pressure gauge C, fuel gauge D, voltmeter E and coolant temperature gauge F. Function display portions 301a, 301b, 302a, 303, 304, 305 and 306 are arranged, corresponding to the indicators A, B, C, D, E, for showing their functions, respectively. Display portions 301c and 302b are arranged, corresponding to the indicators A and B, for showing predetermined contents such as their display details or the like, respectively. The meter panel has turn indicator portions 307R and 307L, a function display portion 308 and a warning display portion 309 disposed at its center.

A housing 350 of the meter panel accommodates therein the indicators such as the tachometer A and speedometer B and so on, thereby defining a frame for them. If there is assembled only one indicator or meter, the housing 350 may be structured so as to be able to accommodate one meter. If there are assembled a plurality of indicators or meters, the housing 350 may be structured so as to be able to accommodate those meters. The LED display device of the thirteenth embodiment can be provided in devices which require a predetermined light emission display, other than the illustrated vehicle meter panel. In this case, the structure of the housing 350 may be varied accordingly.

A printed board 360 is disposed on a bottom of the housing 350. Though not shown, the printed board 360 is mounted with a drive circuit for operating a fixed number of LEDs of the thirteenth embodiment, an A–D conversion circuit for converting inputted analog signals into digital signals, a code conversion circuit for lighting the LEDs in a predetermined number, etc. The printed board 360 is mounted with circuits and electronic parts which themselves generate heat. Accordingly, it is constructed so as to release the radiated heat from those parts toward the bottom side (lower side in FIG. 30) of the housing 350. Therefore, the thirteenth embodiment prevents the heat from the printed board 360 from escaping to the front side (upper side in FIG. 30) of the meter panel. Thus, such heat never becomes a heating source for a printed board 310 which is mounted with LEDs 311–316 for measurements described later. Accordingly, it is possible to minimize the thermal influence on the printed board 310.

The printed board 310 is disposed above the printed board 360 inside the housing and maintained at a fixed minimum distance from the printed board 360. The printed board 310 is mounted with a plurality of LEDs corresponding to diffuse radiation lens, which are composed of diffuse radiation lens elements 320A or diffuse radiation lens elements 320B.

Figure 32:
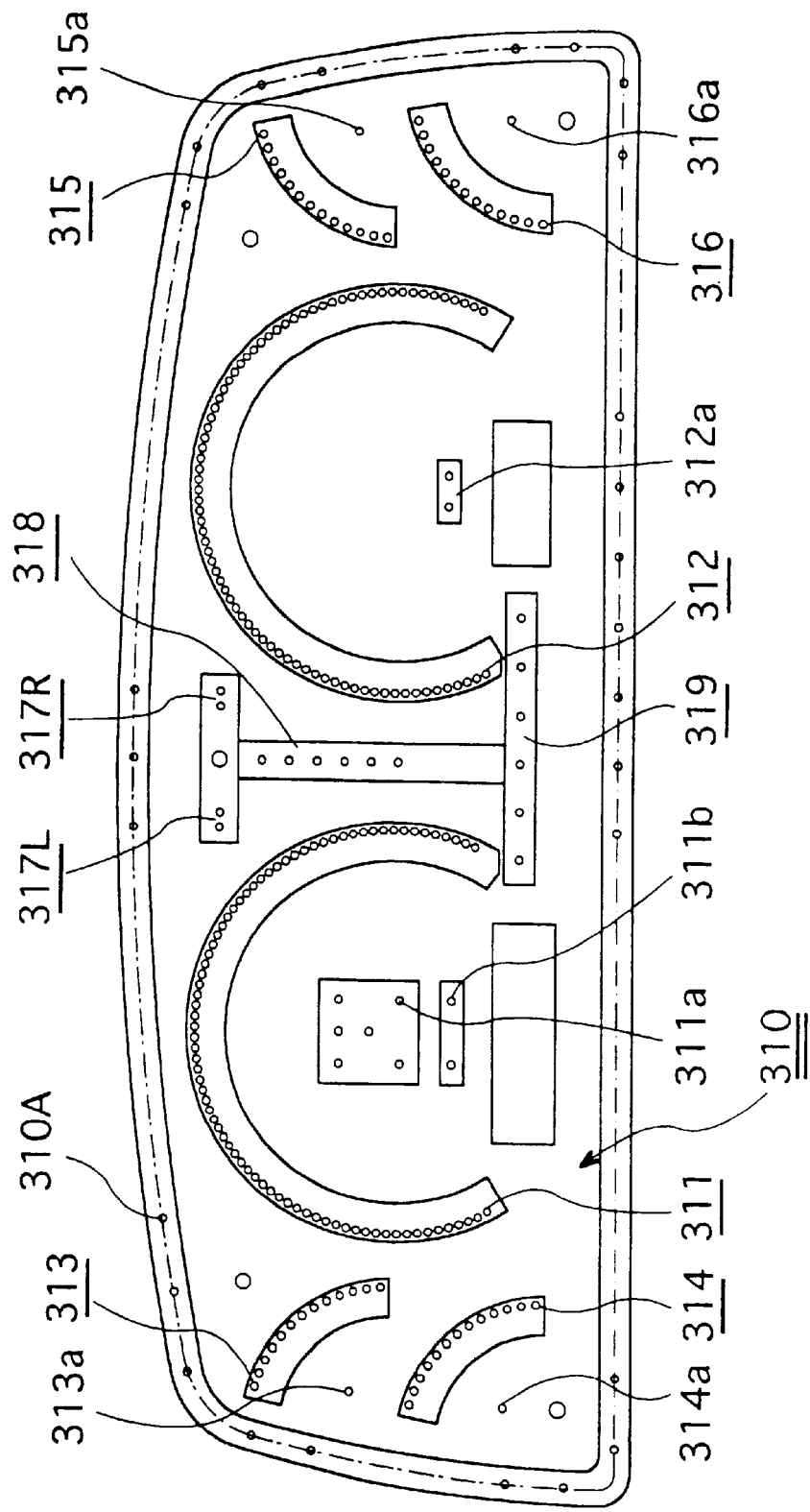
FIG. 32 is a front view showing disposition of an LED on a printed board in the LED display device in the thirteenth embodiment of the invention.

FIG. 32 shows a positional arrangement of the LEDs used in the thirteenth embodiment of LED display device.

As shown in FIG. 32, the LEDs are composed of LED arrays 311, 312, 313, 314, 315 and 316 for the indicators or meters, and LEDs 311a, 311b, 312a, 313a, 314a, 3115a and 316a for the function display portions. The LED array 311 is made of many LEDs, which are arranged in a sector shape of substantially 270 degrees, for the tachometer A. The LEDs 311a and 311b are provided for illuminating the function display portions 301a and 301b, respectively. The LED array 312 is made of many LEDs, which are arranged in a sector shape of substantially 270 degrees, for the speedometer B. The LEDs 312a are provided for illuminating the function display portion 302a. The LED array 313 is made of many LEDs, which are arranged in a sector shape of substantially 90 degrees, for the oil pressure gauge C. The LED 313a is provided for illuminating the function display portion 303. The LED array 314 is made of many LEDs, which are arranged in a sector shape of substantially 90 degrees, for the fuel gauge D. The LED 314a is provided for illuminating the function display portion 304. The LED array 315 is made of many LEDs, which are arranged in a sector shape of substantially 90 degrees, for the voltmeter E. The LED 315a is provided for illuminating the function display portion 305. The LED array 316 is made of many LEDs, which are arranged in a sector shape of substantially 90 degrees, for the temperature gauge F. The LED 316a is provided for illuminating the function display portion 306.

Each of the LEDs of the LED arrays is disposed for each display device, thereby defining a resolution of each indicator A–E. LED array 310A has a predetermined number of LEDs, for emitting light into a cover lens 340 to illuminate it, arranged around the LED arrays 311–316 for the indicators so as to provide a desired brightness along its whole circumference. The LED array 310A does not illuminate the cover lens 340 itself, but characters, marks or the like which are engraved on the cover lens 340. Therefore, the position and number of the LEDs of the lens array 310A are determined according to the characters, marks or the like to be illuminated.

LEDs 317R and 317L are disposed, at the upper part of the meter panel between the LED arrays 311 and 312, for illuminating the turn indicator portions 307R and 307L. LEDs 318 and 319 are disposed, at the central part and lower part of the meter panel between the LED arrays 311 and 312, for illuminating the warning portions 308 and 309.

The printed board 310 is a multilayer printed board. The LED arrays 311–316 and the LED array 310A are disposed so as not to protrude from an upper surface of the printed board. The upper surface of the printed board 310 is a mat black color so as not to reflect extraneous light.

Figure 33:
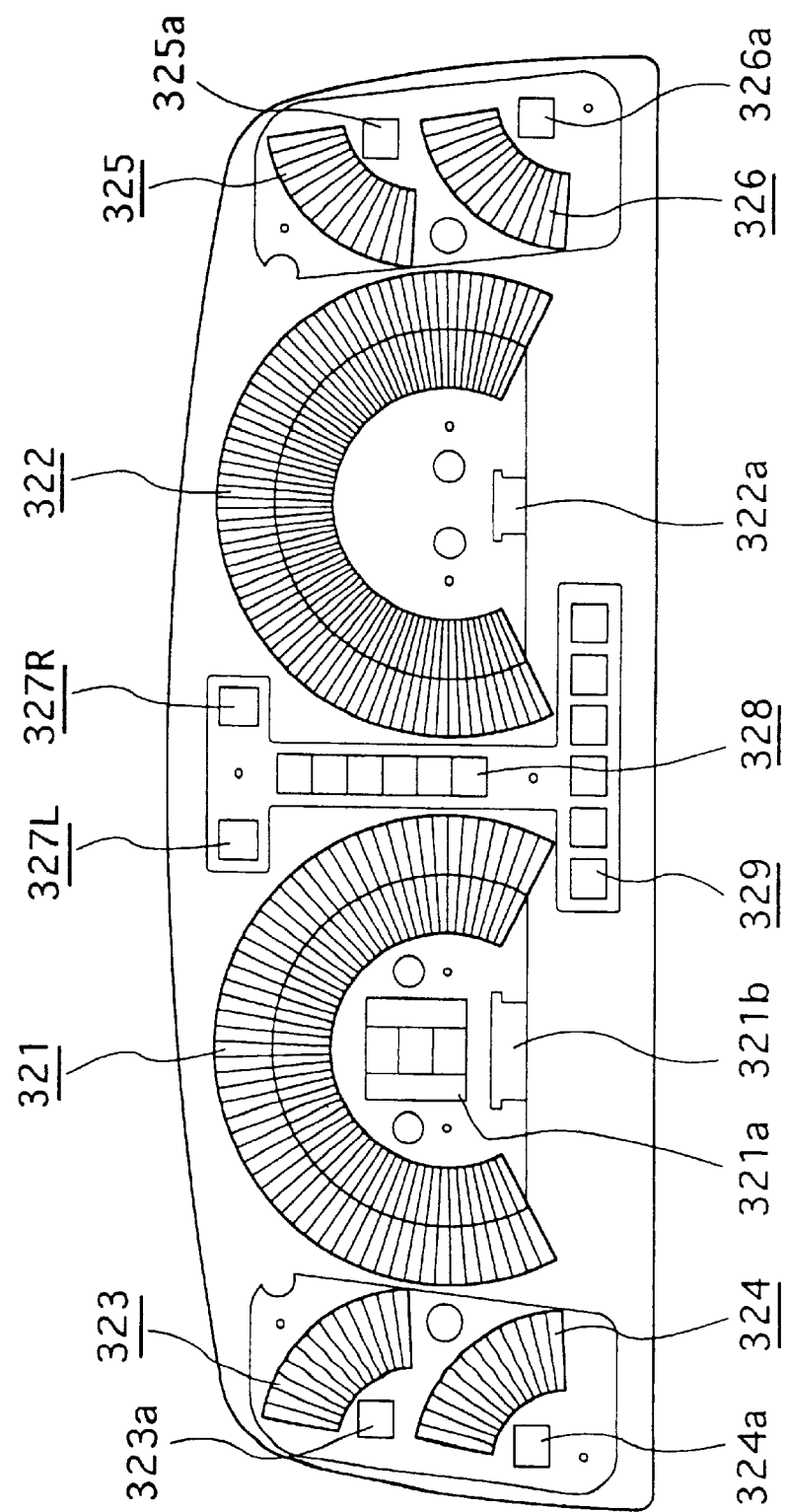
FIG. 33 is a front view showing the disposition of diffuse radiation lenses in the LED display device in the thirteenth embodiment of the invention.

FIG. 33 shows a positional arrangement of the lenses used in the thirteenth embodiment of LED display device.

Plural diffuse radiation lens elements 320A (see FIGS. 34a and 34b) and plural diffuse radiation lens elements 320B (see FIGS. 35a and 35b) are disposed corresponding to the LED arrays 311–316 and the LED array 310A. Namely, as shown in FIG. 33, a diffuse radiation lens array 321 is disposed corresponding to the LED array 311. A diffuse radiation lens array 322 is disposed corresponding to the LED array 312. A diffuse radiation lens array 323 is disposed corresponding to the LED array 313. A diffuse radiation lens array 324 is disposed corresponding to the LED array 314. A diffuse radiation lens array 325 is disposed corresponding to the LED array 315. A diffuse radiation lens array 326 is disposed corresponding to the LED array 316.

Each diffuse radiation lens array 321, 322 is formed of the diffuse radiation lens elements 320A. Each diffuse radiation lens array 323, 324, 325, 326 is formed of the diffuse radiation lens elements 320B, which is shorter than the lens element 320A. One lens element 320A, 320B is provided for each LED. Thus, each lens element 320A, 320B defines a resolution of each indicator A–F.

Figure 34A:
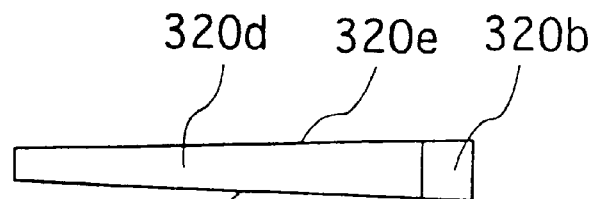
FIG. 34a is a plan view showing a first diffusion radiation lens element in the LED display device in the thirteenth embodiment of the invention.
Figure 34B:
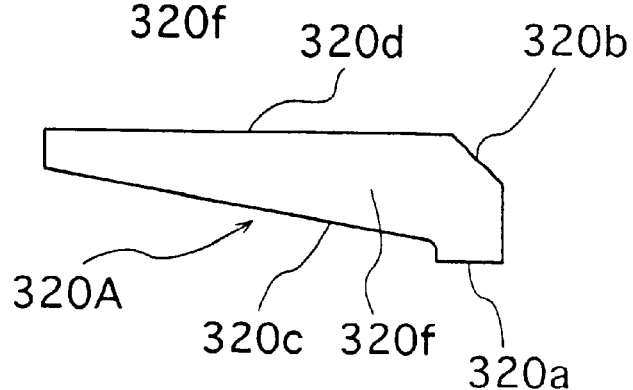
FIG. 34b is a front view showing the first diffusion radiation lens element in the LED display device in the thirteenth embodiment of the invention.

As shown in FIGS. 34a and 34b, the lens element 320A has an incident side 320a, a first reflection surface 320b, a second reflection surface 320c and an emitting side 320d. The incident side 320a is positioned opposite to the LED so that the first reflection surface 320b reflects the incident light from the LED which goes upward in FIG. 34b. The reflected light from the first reflection surface 320b is again reflected upward by the second reflection surface 320c. The light is also diffused by the first and second reflection surfaces 320b and 320c, and such diffused light is radiated outside (upward in FIG. 34b) from the emitting side 320d. The incident side 320a is made into a flat smooth surface. The first reflection surface 320b has a total reflection surface which reflects the incident light at an angle of substantially 45 degrees. The second reflection surface 320c has a total reflection surface which reflects the incident light at an angle of substantially 30–45 degrees. The second reflection surface 320c is made into a roughened surface. The emitting side 320d is made into a flat smooth surface.

Figure 35A:
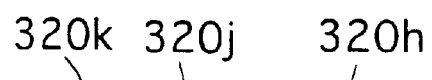
FIG. 35a is a plan view showing a second diffusion radiation lens element in the LED display device in the thirteenth embodiment of the invention.
Figure 35B:
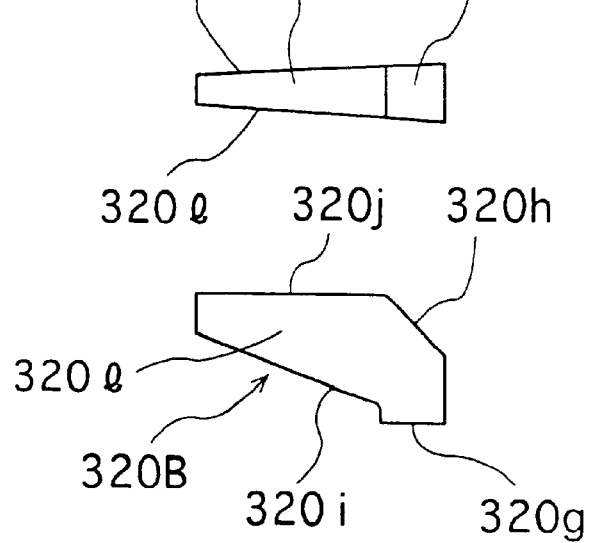
FIG. 35b is a front view showing the second diffusion radiation lens element in the LED display device in the thirteenth embodiment of the invention.

As shown in FIGS. 35a and 35b, the lens element 320B has an incident side 320g, a first reflection surface 320h, a second reflection surface 320i and an emitting side 320j. The incident side 320g is positioned opposite to the LED so that the first reflection surface 320h reflects the incident light from the LED which goes upward in FIG. 35b. The reflected light from the first reflection surface 320h is again reflected upward by the second reflection surface 320i. The light is also diffused by the first and second reflection surfaces 320h and 320i, and such diffused light is radiated outside (upward in FIG. 35b) from the emitting side 320j. The incident side 320g is made into a flat smooth surface. The first reflection surface 320h has a total reflection surface which reflects the incident light at an angle of substantially 45 degrees. The second reflection surface 320i has a total reflection surface which reflects the incident light at an angle of substantially 30–45 degrees. The second reflection surface 320i is made into a roughened surface. The emitting side 320j is made into a flat smooth surface.

The lens element 320A has a pair of side surfaces 320e and 320f which are continuous surfaces vertically extending from the incident side 320a to the emitting side 320d. The side surfaces 320e and 320f are formed so as to radially extend from a common center point of intersection. Accordingly, with the lens element 320A shown in FIG. 34a, the largest distance, corresponding to the incident side 320a, between the radially extending side surfaces 320e and 320f is larger than the largest distance, corresponding to the emitting side 320d, between the side surfaces 320e and 320f. Namely, the right end width at the incident side 320a is larger than the left end width of the emitting side 320d. Thus, it is understood that the common center point of intersection of the two surfaces 320e and 320f is positioned to the left of FIG. 34a.

The lens element 320B has a pair of side surfaces 320k and 320l which are continuous surfaces vertically extending from the incident side 320g to the emitting side 320j. The side surfaces 320k and 320l are formed so as to radially extend from the same center point of intersection. Accordingly, with the lens element 320B shown in FIG. 35a, the largest distance, corresponding to the incident side 320g, between the radially extending side surfaces 320k and 320l is larger than the largest distance, corresponding to the emitting side 320j, between the side surfaces 320k and 320l. Namely, the right end width at the incident side 320g is larger than the left end width at the emitting side 320j. Thus, it is understood that the center point of intersection of the two surfaces 320k and 320l is positioned to the left side of FIG. 35a.

That is, in the thirteenth embodiment, the lens elements 320A, 320B forming the lens arrays 321–326 each have two side surfaces 320e and 320f, 320k and 320l, which extend vertically from the incident side 320a, 320g to the emitting side 320d, 320j, and radially from the same center point of intersection. Moreover, the lens elements 320A, 320B each arrange the first reflection surface 320b, 320h at the upper part opposite to the incident side 320a, 320g. The lens elements 320A, 320B each arrange the second reflection surface 320c, 320i at the lower part opposite to the emitting side 320d, 320j. Furthermore, in the lens elements 320A, 320B, the largest distance between the two side surfaces 320e and 320f, 320k and 320l at the incident side 320a, 320g is made larger than the largest distance between the two side surfaces 320e and 320f, 320k and 320l at the emitting side 320d, 320j.

The lens elements 320A, 320B may have their surfaces, except the incident side 320a, 320g and the emitting side 320d, 320j, coated with a metal by sputtering or a white paint, thereby heightening the reflectance of the light and preventing leakage of the light. The emitting side 320d, 320j has a larger area than an area of the incident side 320a, 320g. When the lens elements 320A, 320B are arranged in a fixed sector plan shape to form the lens arrays 321–326, each of them is placed so as to position the incident side 320a, 320g at the outer circumference. Therefore, the emitting side 320d, 320j makes its one end (left end in FIGS. 34A and 35A), opposite to the incident side 320a, 320g, narrower than the other end (right end in FIGS. 34A and 35A), at the incident side 320a, 320g. Thus, it is possible to keep the clearances large between the LEDs of the LED arrays 311–316, which are disposed on the printed board 310, so that the LEDs may accordingly be easily mounted.

Particularly, the first reflection surfaces 320b, 320h and the second reflection surfaces 320c, 320i are grained before being coated with the sputtering metal or white paint. Thus, the first reflection surface 320b, 320h and the second reflection surface 320c, 320i reflects the light while scaterring, respectively, thereby diffusing the light. The grains of the first reflection surfaces 320b, 320h and the second reflection surfaces 320c, 320i function to efficiently diffuse the incident light from the incident side 320a, 320g. Particularly, in case of coating the white paint thereon, good light scattering can be expected. However, in case of metal sputtering, it is preferable to roughen beforehand the first reflection surfaces 320b, 320h and the second reflection surfaces 320c, 320i by graining, sandblasting or the like, and thereafter forming the sputtering film thereon.

Moreover, the side surfaces 320e, 320k and the side surfaces 320f, 320l are preferably made into a reflection surface for the purpose of directing the light toward the emitting side 320d, 320j. In this case, it is preferable to provide a metal sputtering on the side surfaces 320e, 320k and the side surfaces 320f, 320l so as to give them a high reflectance. However, an aluminum foil, an aluminum evaporating film or the like may be joined to the side surfaces 320e, 320k and the side surfaces 320f, 320l.

While the emitting sides 320d, 320j are made parallel to the incident sides 320a, 320g in the illustrated embodiment, they may be slanted to the right or to the left in FIG. 34b or 35b.

FIGS. 39a and 39b and FIGS. 40a and 40b show respectively two modifications of the diffuse radiation lens element in the thirteenth embodiment of the LED display device.

In the example shown in FIGS. 34a and 34b, the lens element 320A radiates the light from the LED arrays 311–316 disposed on the printed board 310. Therefore, the LEDs are disposed at positions separate from the incident side 320a. Namely, the LEDs do not protrude from the upper surface of the printed board 310 but are embedded inside. However, in consideration of the characteristic of the lens element 320A, the thirteenth embodiment may be modified as follows.

Figure 39A:
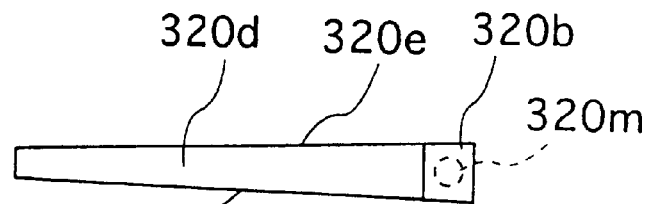
FIG. 39a is a plan view showing a modification of a first diffusion radiation lens element in the LED display device in the thirteenth embodiment of the invention.
Figure 39B:
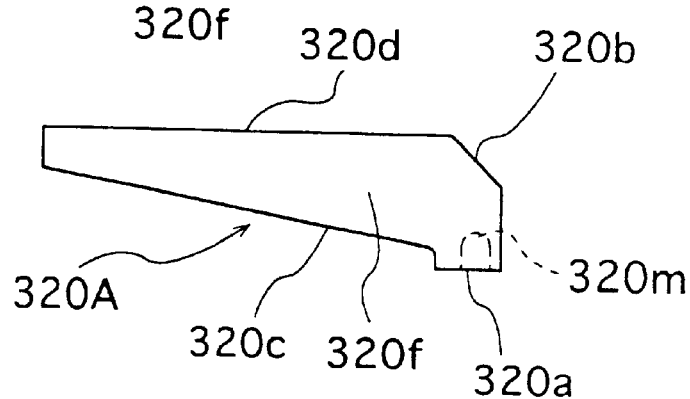
FIG. 39b is a front view showing a modification of the first diffusion radiation lens element in the LED display device in the thirteenth embodiment of the invention.

In accordance with the modification shown in FIGS. 39a and 39b, the LEDs of the LED arrays 311–316 are mounted on the printed board 310 while protruding from the upper surface thereof.

As shown in FIG. 39a, the lens element 320A has a fitting recess 320m formed in the incident side 320a. The fitting recess 320m has such a size as to be able to accommodate therein an LED constituting the LED array 311–316. Of course, the fitting recess 320m and the LED fitted therein may be joined integrally by epoxy resin or the like. In this embodiment, the lens elements 320A can be positioned by fitting each LED of the LED arrays 321–326, which protrudes from the printed board 310, into each recess 320m, thereby enabling light emission from the LED thereinto. Thus, the light from the whole peripheral surface of the LED can be radiated into the incident side 320a, so that the incident efficiency is good. Therefore, it is possible to increase the quantity of light radiated from the emitting side 320d. When integrally fixing the LED into the fitting recess 320m with epoxy resin or the like, it is possible to reduce a reflection caused by a difference of refractive index between the material of the lens element 320A and the lens material of the LED, thereby heightening the incident efficiency.

Figure 40A:
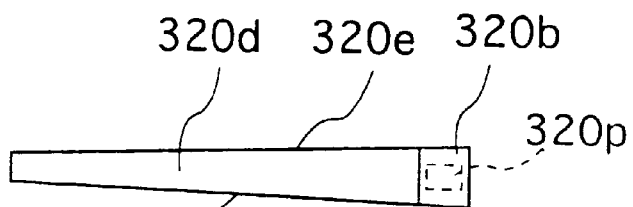
FIG. 40a is a plan view showing another modification of the first diffusion radiation lens element in the LED display device in the thirteenth embodiment of the invention.
Figure 40B:
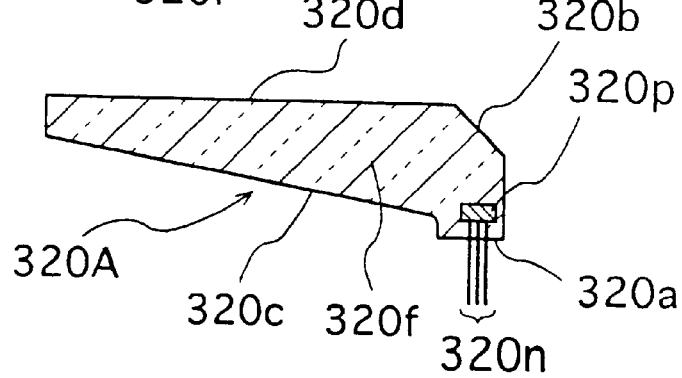
FIG. 40b is a front view showing another modification of the first diffusion radiation lens element in the LED display device in the thirteenth embodiment of the invention.

While, in the thirteenth embodiment, the LEDs of the LED arrays 311–316 are mounted on the printed board 310, the thirteenth embodiment may be modified such that an LED is embedded in the lens element 320A as one package in a manufacturing process of the LED. Namely, as shown in FIGS. 40a and 40b, the lens element 302A has one LED 320p, which constitutes the LED array 311–316, packed in the incident side 320a. In this case, the lens element 320A functions as a package of the LED 320p. The LED 320p is electrically connected to the printed board 310 through leads 320n. While, in the illustrated modification, the leads 320n are disposed vertically to the surface of the incident side 320a, they may be drawn out toward the inside or outside (left side or right side in FIG. 40b) of the lens array 311–316 so as to be parallel to the surface of the incident surface 320a.

In this modification, each LED of the LED array 311–316 protrudes from the upper surface of the printed board 310 while being packed inside the incident side 320a of each lens element 320A, so that the incident efficiency of the light from the LED is good, and the quantity of light radiated from the emitting side 320d can be enlarged. Moreover, the LED unit can be provided at a low price in view of the number of parts and easy of assembly. Particularly, in this modification, the side surfaces 320e and 320f are preferably made into a reflection surface.

Each modification of FIGS. 39a and 39b and FIGS. 40a and 40b is applicable to the short lens element 320B as well.

While, in the illustrated thirteenth embodiment, the lens array 321–326 is arranged in a sector shape, lens elements may be provided which have an elongate rectangular planar shape and which are arranged in the width direction to form a lens array having the shape of a bar graph. Moreover, the thirteenth embodiment can be applied to a case in which only one lens element is provided.

Again describing the details of the LED unit (referring to, e.g., FIGS. 32 and 33), a condenser lens 321a is disposed opposite to the LED 311a. A radiation lens 321b is disposed opposite to the LED 311b. A condenser lens 322a is disposed opposite to the LED 312a. A condenser lens 323a is disposed opposite to the LED 313a. A condenser lens 324a is disposed opposite to the LED 314a. A condenser lens 325a is disposed opposite to the LED 315a. A condenser lens 326a is disposed opposite to the LED 316a.

Condenser lenses 327R and 327L are disposed opposite to the LEDs 317R and 317L, respectively. Condenser lenses 328 and 329 are disposed opposite to the LEDs 318 and 319, respectively.

Each of the condenser lenses 321a, 322a, 323a, 324a, 325a, 326a, 327a, 327R, 327L, 328, and 329 is composed of a lens of a photoconductor material with a convex leading end (see FIGS. 30 and 31). Particularly, the condenser lenses 328 and 329 are continuously formed in one body while each is composed of a lens of a photoconductor material with a convex leading end corresponding to the function display portion 308 (see FIG. 29) and each warning item of the warning display portion 309 (see FIG. 29).

Figure 36:
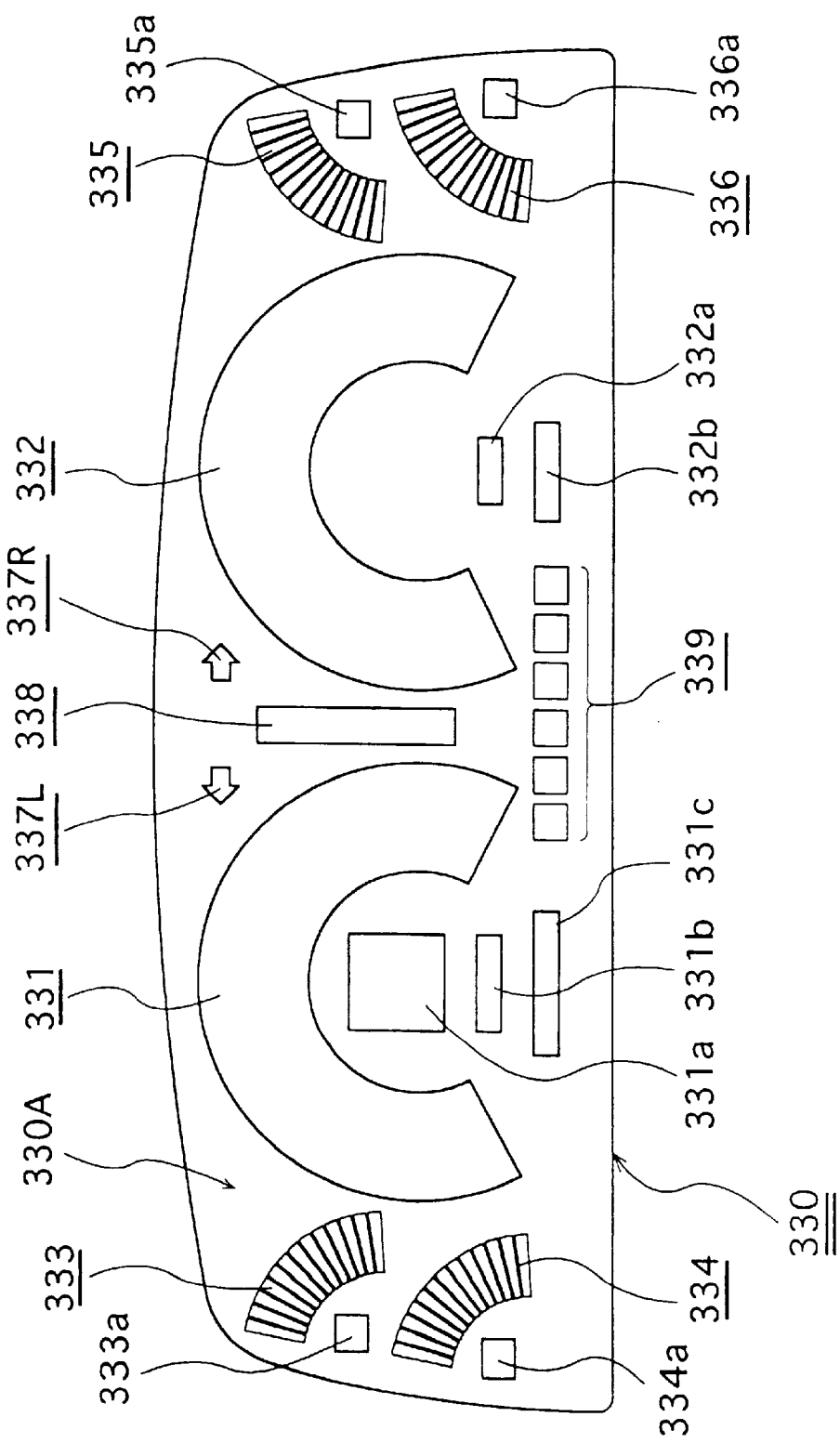
FIG. 36 is a front view of a sheet used in the LED display device in the thirteenth embodiment of the invention.

FIG. 36 shows an example of a sheet used in the thirteenth embodiment of the LED display device.

A sheet 330 is disposed over the upper side of the lens arrays 321–326 so as to regulate the radiation of a predetermined diffused light from the lens arrays 321–326 while partially transmitting the diffused light. The sheet 330 is made of a transparent material.

Specifically, the sheet 330 is made of a PC sheet 0.5 mm in thickness, on which a grain pattern is formed. The sheet 330 has a printed portion 330A which serves as a mask to limit the radiation of the diffused light from the lens arrays 321–326. The printed portion 330A is formed using a printing ink, eliminating the transparency of the transparent sheet 330. The front surface (upper surface in FIGS. 30 and 31) of the printed portion 330A is printed with characters, illustrations or the like which are used in an LED display device of a specific use. The opaque printed portion 330A masks the meter panel to hide the inside thereof which should not be seen. In the thirteenth embodiment, the portion 330A is provided with a print that is common in the vehicle meter panel.

The sheet 330 has a plurality of transparent portions which transmit the diffused light from the LED arrays 321–326. Namely, the transparent portion 331 is placed on the upper surface of the lens array 321. The transparent portions 331a and 331b are placed on the upper surfaces of the condenser lens 321a and the radiation lens 321b, respectively. The transparent portion 332 is placed on the upper surface of the lens array 322. The transparent portion 332a is placed on the upper surface of the condenser lens 322a. The transparent portion 333 is placed on the upper surface of the lens array 323. The transparent portion 333a is placed on the upper surface of the condenser lens 323a. The transparent portion 334 is placed on the upper surface of the lens array 324. The transparent portion 334a is placed on the upper surface of the condenser lens 324a. The transparent portion 335 is placed on the upper surface of the lens array 325. The transparent portion 335a is placed on the upper surface of the condenser lens 325a. The transparent portion 336 is placed on the upper surface of the lens array 326. The transparent portion 336a is placed on the upper surface of the condenser lens 326.

Moreover, the transparent portions 337R and 337L are positioned on the upper surfaces of the condenser lens 327R and 327L, respectively. The transparent portions 338 and 339 are placed on the upper surfaces of the condenser lens 328 and 329, respectively.

The transparent portions 331a, 331b, 332a, 333a, 334a, 335a and 336a are printed with information representing the functions of the corresponding function display portions 301a, 301b, 302a, 303, 304, 305 and 306, respectively. The transparent portion 338 is printed with information representing the function of the function display portion 308. The transparent portion 339 is printed so as to convey the warnings of the warning display portion 309. Then, when the LEDs 311a, 311b, 312a, 313a, 314a, 315a, 318 and 319 are lit, the printed information of the corresponding function display portions 301a, 301b, 302a, 303, 304, 305, 306 and 308 or warning display portion 309 are shown by illumination through the lens 321a, 321b, 322a, 323a, 324a, 325a, 326a, 328 and 329. When the LEDs 317R and 317L are flashed, the turn indicator portions 307 and 308 are displayed by flashing through the lenses 327R and 327L.

Particularly, in the sheet 330 of the thirteenth embodiment, each of the transparent portion 331 for the tachometer A and the transparent portion 332 for the speedometer B is made of a through hole of the same sector plan shape as the lens array 321, 322. Accordingly, a change of a variable is indicated by the change of the illuminated area of the lens array 321 and lens array 322. Of course, one of the lens elements 320A of the lens arrays 321 and 322 may be lit at an angular position corresponding to the present variable. In this case, it is possible to give a similar display feeling to that of a common meter that uses a pointer. Moreover, the portions of the sheet 330 other than the transparent portions 331–336, 337R, 337L, 338 and 339 have no transparency. Thus, such portions block the light that leaks around from the LED arrays 311–316, 310A and LEDs 317R, 317L, 318 and 319, lens arrays 321–326 and condenser lens 321a, 322a, 323a, 324a, 325a, 326a, 327R, 327L, 328, 329, etc. Therefore, contrast at the displaying part can be emphasized. Furthermore, if such light shielding portions are expanded, it is possible to eliminate blur of the display outline that is generated by intrusion of light as an external factor.

Figure 37:
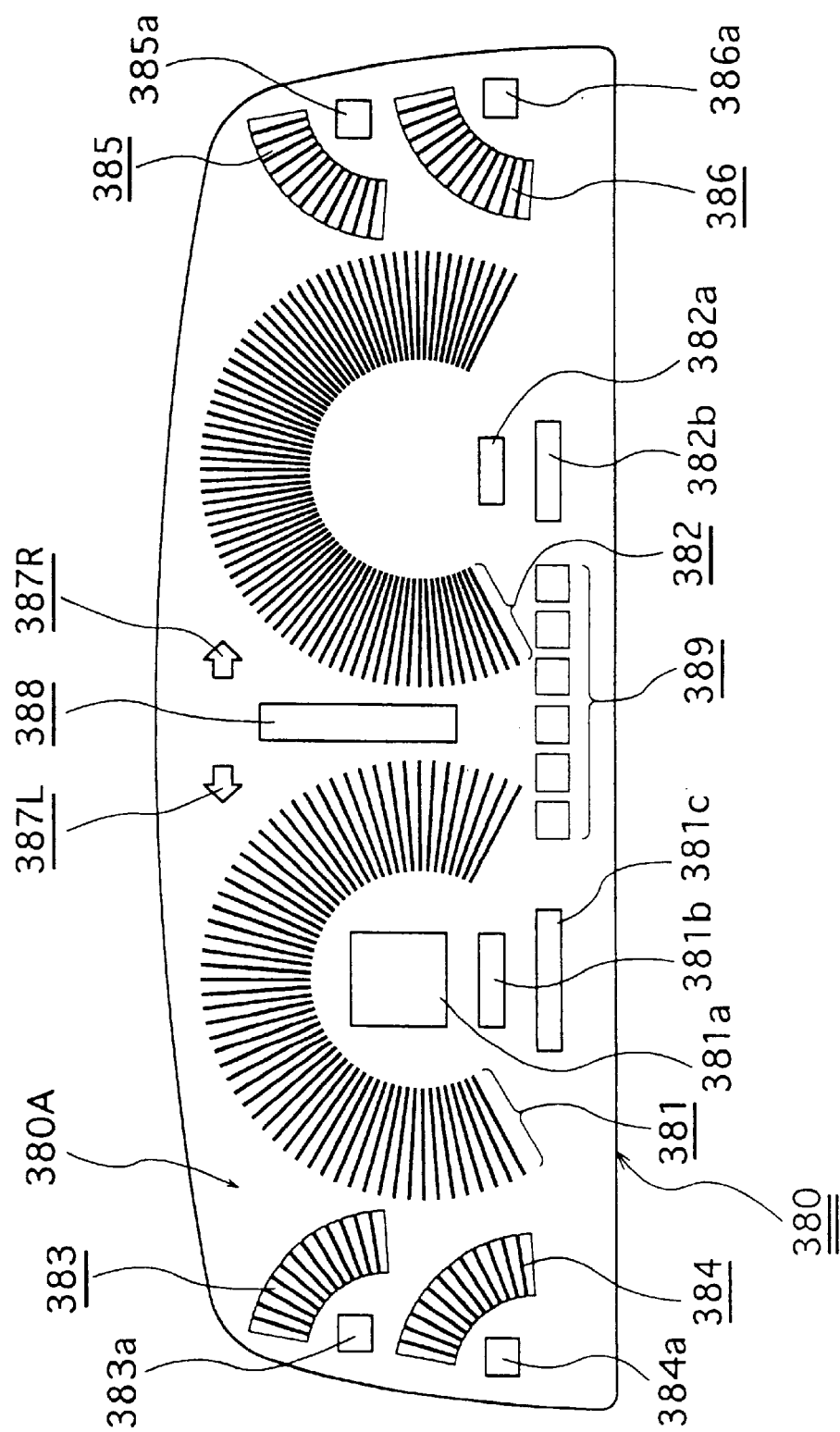
FIG. 37 is a front view showing another sheet which can be used in the LED display device in the thirteenth embodiment of the invention.

FIG. 37 shows a modified sheet 380 that is applicable to the thirteenth embodiment of the LED display device.

Referring to FIG. 37, the sheet 380 has a structure similar to the sheet 330 of FIG. 36 in that it uses the same material. On the other hand, the sheet 380 has a transparent portion 381 placed at the upper surface of the lens array 321 for the tachometer A and a transparent portion 382 placed at the upper surface of the lens array 322 for the speedometer B. These transparent portions 381 and 382 are formed as planar sector shapes of 270 degrees, respectively, by a plurality of slits. Each slit of the transparent portions 381 and 382 is formed corresponding to each lens element 320A of the lens arrays 321 and 322. Accordingly, the slits transmit the light that comes from the LEDs of the LED array 311, 312 through the lens elements 320A of the lens array 321, 322, respectively, so that a pointer display operation is possible for each slit. Therefore, in this modification, if one of the lens elements 320A of the lens array 321 and lens array 322 is lit at an angular position corresponding to a variable, it is possible to more clearly provide a display feeling similar to a common meter display which uses a pointer. Here, as in the case of FIG. 33, the variable may be displayed by changing a number or area of the illuminated slits according to a change of a lit area of the lens array 321, 322.

Particularly, the transparent portions 381 and 382 are respectively formed of the slits, and the width of each slit is made narrower than the width of each lens element 320A of the lens array 321, 322. Thus, this modification can more efficiently eliminate blur of the display part due to light effects from external factors as described in the case of FIG. 33.

FIG. 38 shows a cover lens 340 used in the thirteenth embodiment of LED display device.

The cover lens 340 is disposed on the upper surface of the sheet 330 or sheet 380. The cover lens 340 is formed of a transparent acrylic resin. Though not shown, the cover lens 340 has a protrusion engageable with a hole portion that is formed on a periphery of the housing 350. The cover lens 340 has engraved portions such as characters, marks or the like at its rear surface. Each engraved portion is roughened and coated with a predetermined paint.

Specifically, as shown in FIGS. 29 and 38, the engraved portions for the tachometer A are provided over the transparent portion 331 and composed of engraved portions of numbers "0, 1, 2, - - - , 6" as scales for the tachometer A. Large scale marks 341a correspond to these numbers. Medium scale marks 341b are provided between the large scale marks 341a, and small scale marks 341c are provided between the medium scale marks 341b. The engraved portions for the speedometer B are provided over the transparent portion 332, and are composed of engraved portions of numbers "0, 20, 40, - - - , 160" as scales for the speedometer B. Large scale marks 342a correspond to these numbers. Medium scale marks 342b are provided between the large scale marks 342a, and small scale marks 342c are provided between the medium scales 342b.

The engraved portions for the oil pressure gauge C are provided on the transparent portion 333 and composed of scale marks 343a, 343b and 343c, which are located at such angular positions as to divide the transparent portion 333 in three. Characters "H, L" are given to the opposite end scales 343a and 343c. The engraved portions for the fuel gauge D are provided on the transparent portion 334 and composed of large scale marks 344a, medium scale marks 344b between the large scale marks and characters "F, E" given to the opposite end large scale marks 344a.

Similarly, the engraved portions for the voltmeter E are provided on the transparent portion 335 and composed of large scale marks 345a and 345c, medium scale marks 345b and numbers "0, - - - , 18". The engraved portions for the temperature gauge F are provided on the transparent portion 336 and composed of scales 346a and 346b and characters "H, C".

The paint coated on the engraved portions may have different colors according to the kinds of the engraved portions. Or it may have the same color regardless of the different kinds of the engraved portions. Otherwise, it may change its brightness according to the different kinds. Moreover, the paint may differentiate its color or brightness depending on the variable of the meter.

As shown in FIG. 29, in such a cover lens 340, the paint of the engraved portion at the rear surface thereof is colored by the light introduced from the LEDs of the LED array 310A for illumination. The other portions are not colored since they are transparent, so that only the engraved portions can be given desired colors and can be recognized.

In the thirteenth embodiment of the LED display device, a desired ornamental design can be created by the lens arrays 321–326 and sheets 330, 380, which are illuminated by the LED arrays 311–316, so that the designs thereof can be diversified. The vehicle meter embodying the LED display device can clearly display a predetermined measured amount even if it is located distant from eyes of a driver, contrary to a vehicle meter which displays the measured amount by a well-known mechanical pointer. Thus, it is possible to increase the distance between the eyes of the driver and the vehicle meter. As a result, it is possible to decrease the extent to which the driver must move his or her line of sight, and if the driver is farsighted, he or she can easily see and recognize the measure amount.

In the cover lens 340 (FIG. 38), only the engraved portions are colored and seen by the light coming from the LED arrays 310A, while the other portions allow the indicators A–F, display portions. 301–309, and so on to be seen so that their contents can be recognized. Thus, the cover lens 340 can show the displayed elements overlapped.

The angles of the sector shape of the lens arrays 321–326 are not limited to the above-noted values, namely, substantially 90 degrees or 270 degrees. They may be, e.g., substantially 30 degrees or less or 270 degrees or more, depending on the variable to be displayed.

The LED arrays 311–316 can use LEDs that can emit red, green and blue colors. Namely, the LED arrays 311–316 may use these LEDs to show a desired color and improve the ornamentation. Moreover, the LED arrays 311–316 may be structured so as to change its light color when the variable exceeds a predetermined set value.

Particularly, the LED array 310A may use an LED that has LED chips, that are able to emit light in red, green and blue colors, respectively, packed in one element. Otherwise, the LED array 310A may be constructed by arranging a red LED, a green LED and a blue LED in turn. Furthermore, the LED array 310A may be composed of only one of red, green and blue LEDs. In addition, the LED array may be composed of ultraviolet LEDs, while the engraved portions are coated with a paint that is colored by the ultraviolet rays, e.g., fluorescent paint.

The LED arrays 311–316 are disposed opposite to the incident sides 320a, 320g of the lens elements 320A, 320B, so that they can be smaller, simplifying manufacture and reducing production costs, compared with the case in which the LEDs are arranged opposite to the outer circumferential surfaces of the lens elements. Moreover, the LED arrays 311–316 can be arranged at the outermost part of the lens elements 320A, 320B, so that the lens elements 320A, 320B can be provided more closely.

The lens elements 320A, 320B have reflection surfaces 320b and 320c, 320h and 320i at surfaces opposite to the incident sides 320a, 320g and emitting sides 320d, 320j, and the light from the LEDs is conducted from the incident sides 320a, 320g to the emitting sides 320d, 320k, which are located at the upper surface thereof. Thus, the lens elements 320A, 320B each have a good reflection ability of high efficiency, due to the reflection surfaces 320b and 320c, 320h and 320i. Therefore, manufacturing is simplified and the production costs can be reduced.

In addition, the lens element 320A, 320B may have both the reflection surfaces 320b and 320c, 320h and 320i roughened by graining or sandblasting. In this case, the reflection surfaces 320b and 320c, 320h and 320i diffuse the light and cause it to scatter, so that the incident light can be efficiently diffused.

Moreover, the lens elements 320A, 320B may be provided with a metal coating to define reflection surfaces on sides except the incident sides 320a, 320g and emitting sides 320d, 320j. These reflection surfaces have a good reflectance, are rigid, and can be thin. In addition, the lens elements 320A, 320B are prevented from being deformed due to age deterioration, so as not to influence the arrangement of the LED arrays 311–316.

Furthermore, the lens element 320A, 320B may be coated with a white paint to define reflection surfaces, except on the incident sides 320a, 320g and emitting sides 320d, 320j. The reflection surfaces provide a necessary scattering of light, so that, even if the incident sides 320a, 320g and emitting sides 320d, 320j are not roughened, they heighten the reflective efficiency of light to a similar degree, and prevent leakage of the light.

While the thirteenth embodiment of the LED display device is embodied in the vehicle meter panel for displaying measured information for the vehicle, it may be embodied into a specific meter such as a speedometer, tachometer or the like. The manner of displaying thereof is not limited to an analog display or a digital display.

FIGS. 41–48 show a fourteenth embodiment of a vehicle meter as an LED display device of the invention.

Figure 41:
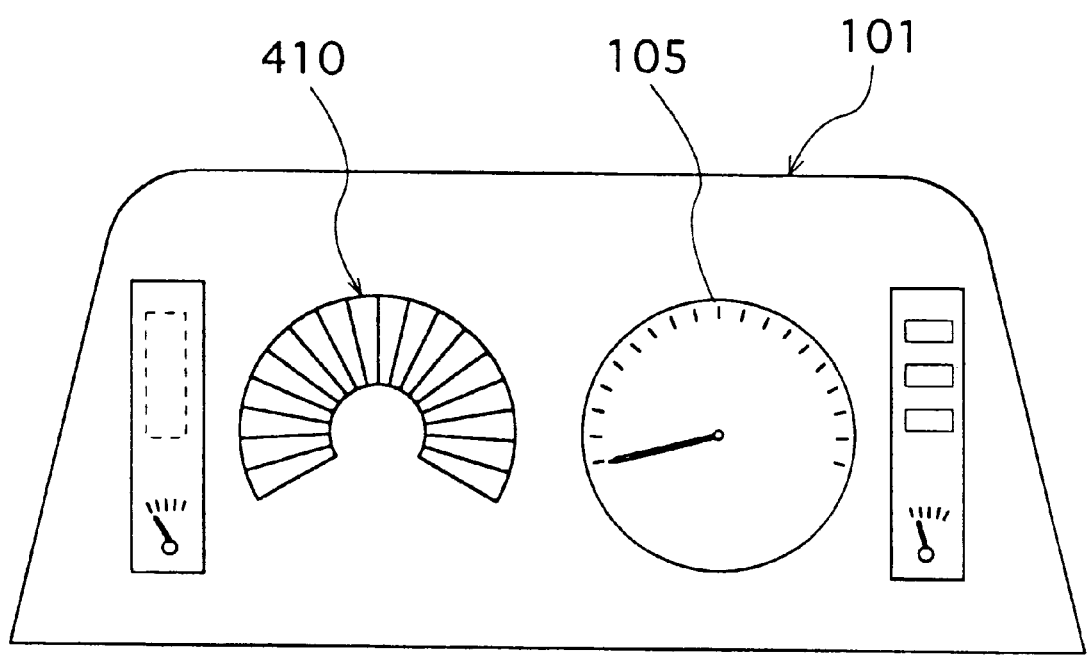
FIG. 41 is a front view showing the whole car meter to which an LED display device is applied in a fourteenth embodiment of the invention.
Figure 42:
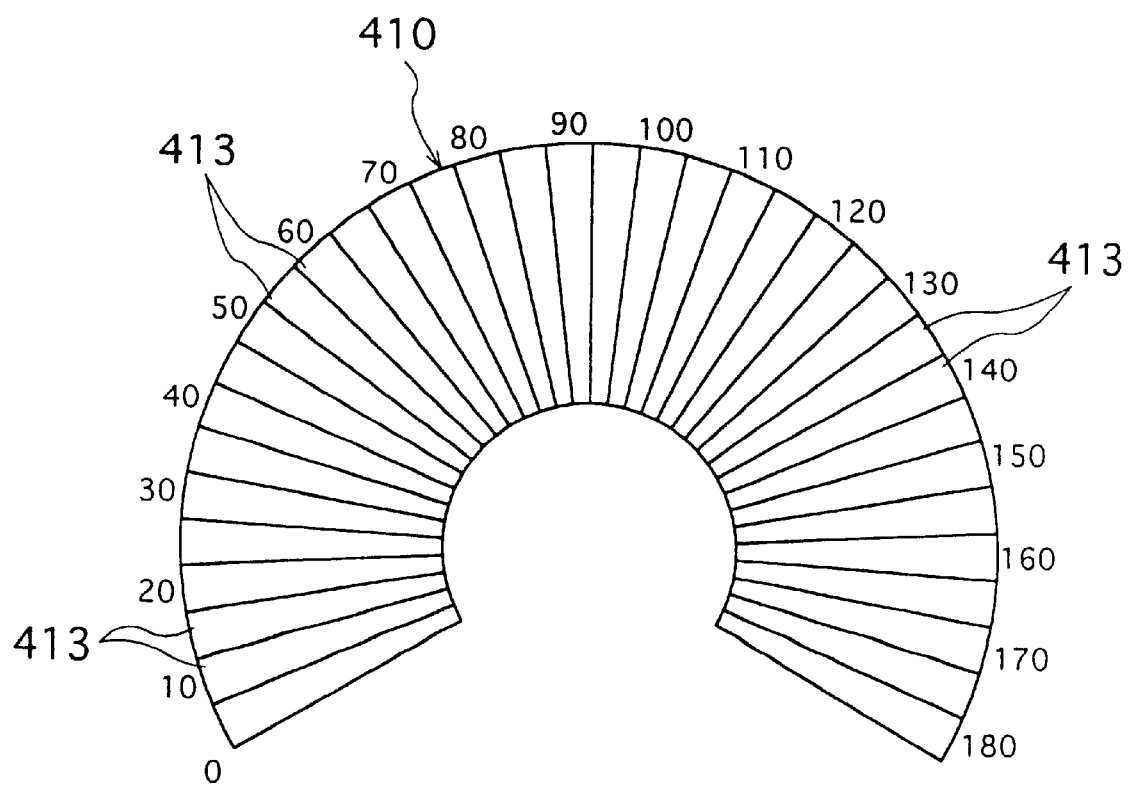
FIG. 42 is a plan view showing a speed meter as the LED display device in the fourteenth embodiment of the invention.

In FIGS. 41 and 42, the fourteenth embodiment of the vehicle meter is embodied in a meter panel 101 which arranges a speedometer, tachometer, fuel gauge, temperature gauge and the like at fixed positions. Specifically, it is embodied in an analogue speedometer. The speedometer has an indicator 410 of a predetermined sector shape, in plan view, at a fixed position of the meter panel 101. Numbers are disposed at constant intervals, by engraving or printing or the like, around an outer circumference of the indicator 410, serving as scales for indicating the velocity. Though not shown, LEDs of visible radiation are arranged inside the speed indicating scales of the meter panel 101 in order to backlight the scales. LEDs that radiate ultraviolet light like near ultraviolet rays may be used instead of the LEDs of visible radiation, thereby fluorescently coloring the scales by the ultraviolet rays.

Figure 43:
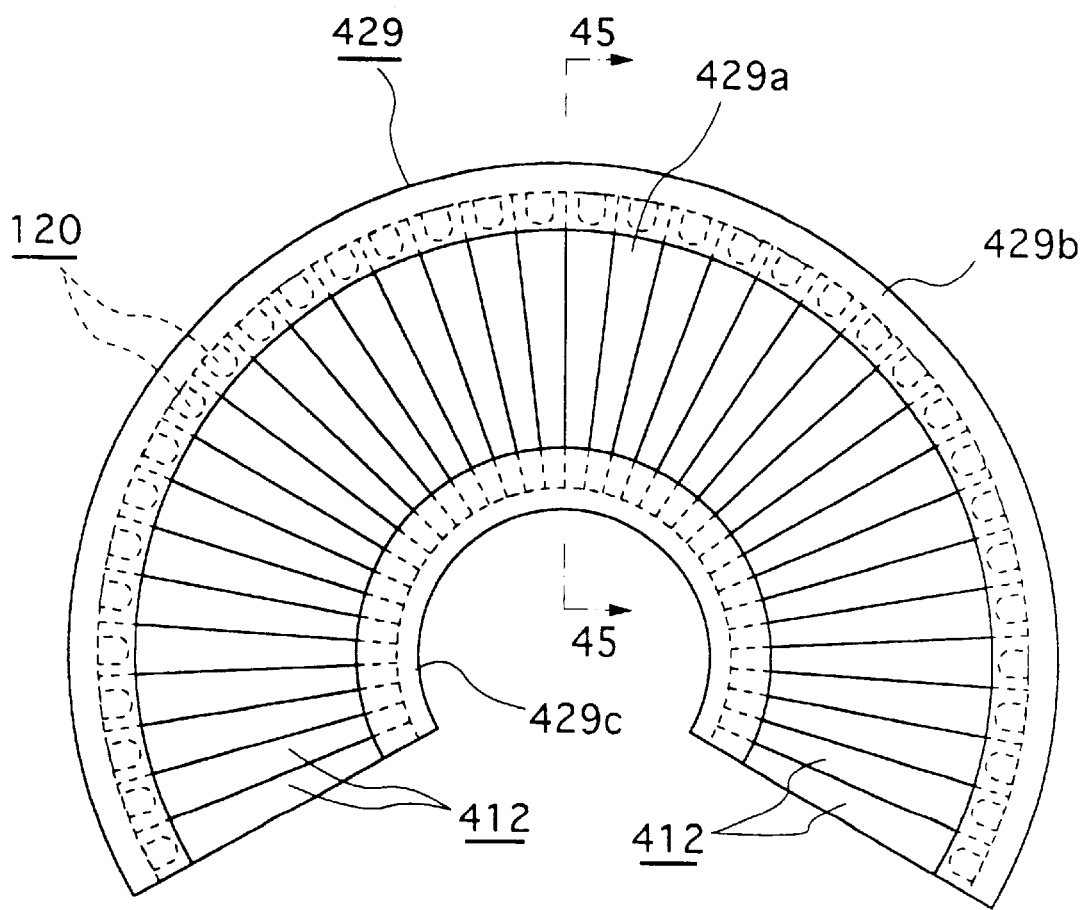
FIG. 43 is a plan view showing a main part of the speed meter in the fourteenth embodiment of the invention.
Figure 44:
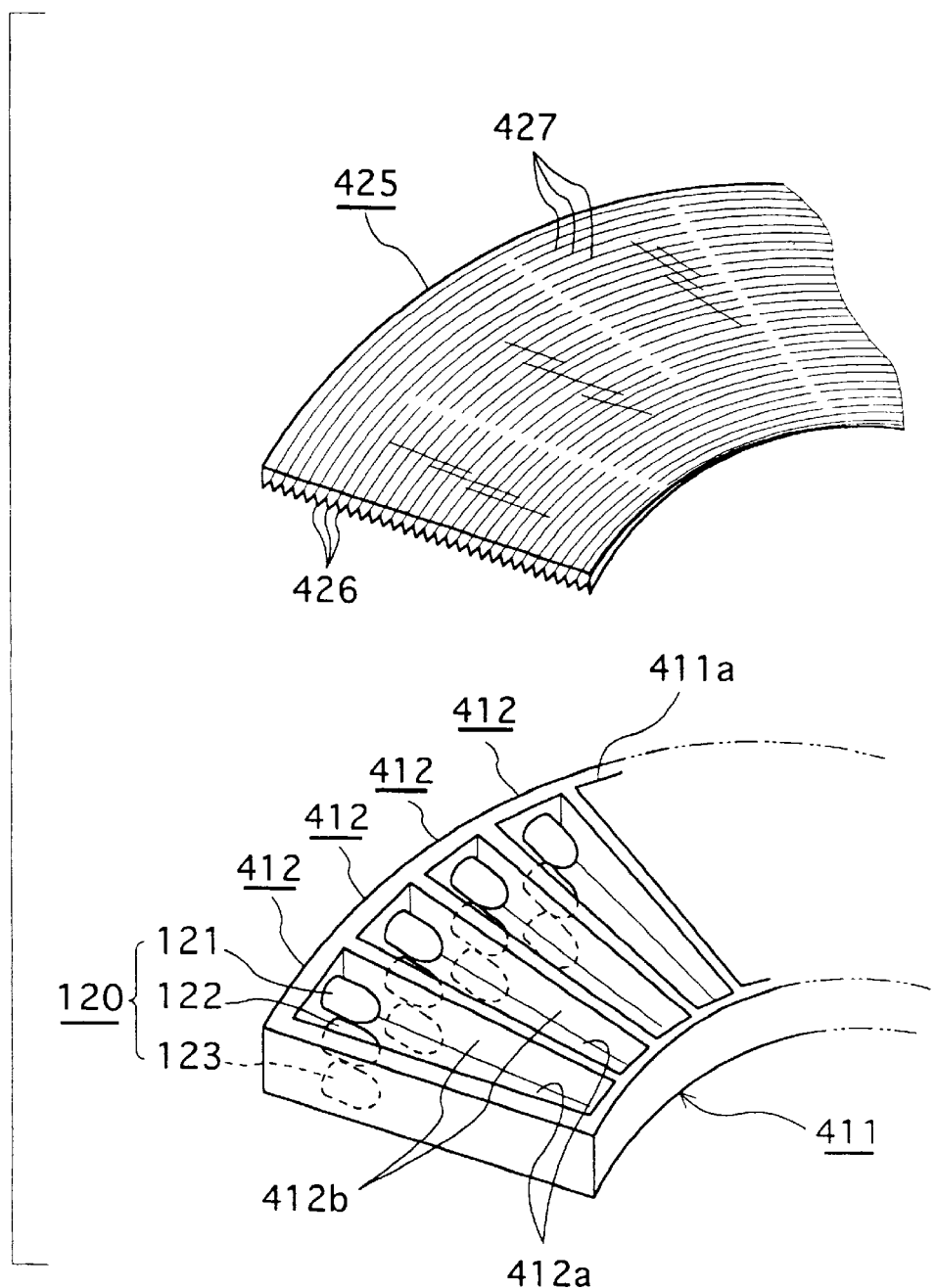
FIG. 44 is an exploded perspective view showing a main part of the speed meter in the fourteenth embodiment of the invention.

As shown in FIGS. 43 and 44, the indicator 410 is composed of a housing 411, an LED unit 120 and a light refraction plate 425. The housing 411 has incident portions 412. Each incident portion 412 is formed into substantially an elongate quadrilateral box shape which has one side (upper side in FIGS. 44 and 45) opened to define an opening 412a. The LED unit 120 is arranged inside each incident portion 412 of the housing 411. The light refraction plate 425 covers the upper opening 412a of the incident portions 412 of the housing 411. The housing 411 has many incident portions 412 formed successively and closely in their width direction into one body, thereby defining substantially a sector shape in plan view. Namely, each incident portion 412 has an elongated trapezoidal shape or an elongated sector shape, in plan view, that has one longitudinal end (outer circumferential end) made wider than the other longitudinal end (inner circumferential end).

The housing 411 integrally arranges many incident portions 412 in its circumferential direction while placing the one longitudinal ends outward and the other ends inward. The housing 411 may be made integrally of a metal like aluminum or a resin material like ABS. The whole inside surface of each incident portion 412 may be coated with a metal plating, by vacuum evaporation or the like, so as to define a reflection surface 412b. If the housing 411 is made of a material of high reflectance such as aluminum, the metal plating may not be provided inside the incident portion 412. In the fourteenth embodiment, the incident portions 412 are disposed at fixed intervals or equal angles in the circumferential direction so as to define pointers 413 of elongated trapezoidal or sector shape, respectively, at the front side of the indicator 410. Illustratively, the speed indicating scales are placed at every ten kilometers per hour, and each of them is divided into two by the pointers 413. So, each pointer 413 is used to indicate the speed for each five kilometer per hour.

The LED unit 120 is composed of a red LED 121, a green LED 122 and a blue LED 123, which are each secured to the inside of the outer circumferential end of each incident portion 412 in the thickness direction thereof. Each LED unit 120 is able to radiate the light into the inside space of each incident portion 412. In this embodiment, a bullet shaped LED lamp is used as the LEDs 121, 122, and 123, since it has high luminous efficiency and excellent cost performance.

The light refraction plate 425 is made by integrally forming a predetermined light transmitting resin into a plate shape of the same plan shape as the housing 411, namely, a substantially sector plate shape. As the light transmitting resin, any translucent or transparent resin may be used such as PC (polycarbonate), PMMA (polymethyl methacrylate), fluorine contained resin, or the like. The light refraction plate 425 is fixedly joined to the upper end of the housing 411, by an adhesive or the like, so as to entirely cover the opening 412a of each incident portion 412. As shown in FIG. 44, the rear surface of the light refractive plate 425 is made into a saw shape which has many teeth 426 of triangular cross section continuing radially or in the longitudinal direction of each incident portion 412. Many peak lines 427 are formed between the teeth 426 so as to extend in the circumferential direction. Specifically, the light refraction plate 425 is formed of a PC resin (refractive index of 1.586), as a transparent resin material, into a plate of about 1 mm thickness. A tooth angle $\alpha$, which is defined as an angle between the teeth 426, is about 70 degrees. A tooth pitch P, which is defined as a width between the peaks of the teeth 426, is about 0.26 mm. The tooth angle $\alpha$ and tooth pitch P may be other values, as long as the refractive plate 425 can radiate most of the incident light into the incident portion 412 from the LEDs 121, 122 and 123 outwardly therefrom at a predetermined angle and a luminance can be obtained which is equivalent to the above. The material of the refractive plate 425 may be selected from various materials, as long as its refractive index is about 1.4 to 1.6. For example, a transparent resin may be used, such as an acrylic resin (refractive index of 1.49), a fluorine contained resin (refractive index of 1.42) and so on, instead of the PC resin (refractive index of 1.586). The refraction plate 425 can perform an equal function to that noted above which is performed by the teeth 426, as long as the tooth angle $\alpha$ is set in the range between about 60 to 80 degrees. The tooth pitch P may be varied, as long as it is small enough so as not to generate flickering of light in consideration of the normal visual characteristics and perception ability of the human being.

Figure 45:
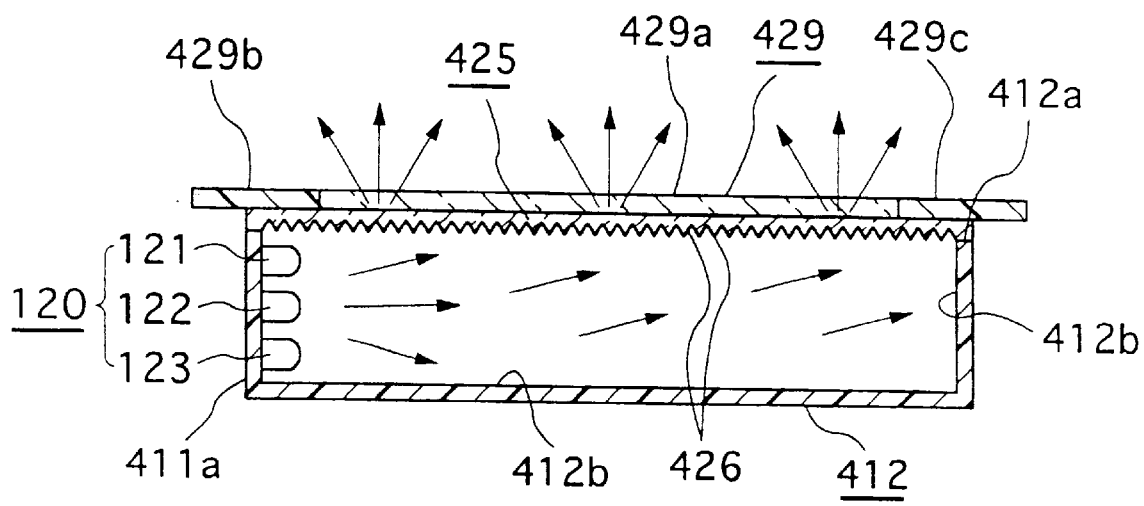
FIG. 45 is an end view taken along the line 45—45 in FIG. 43.
Figure 46:
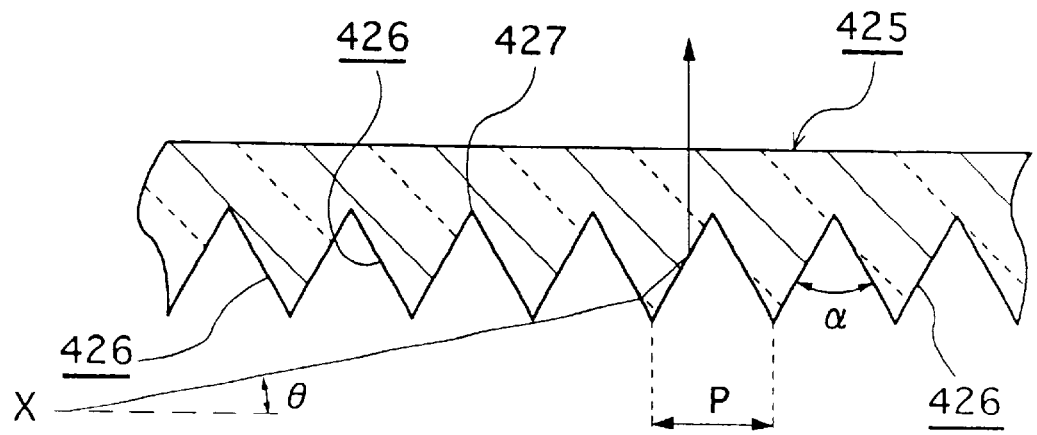
FIG. 46 is a partial sectional view showing a photoconductor disc of a speed meter in the fourteenth embodiment of the invention.

As shown in FIGS. 45 and 46, the refraction plate 425 refracts most of the incident light of a desired color radiated into the inside space of the incident portion 412 from the LEDs 121, 122 and 123, through each tooth 426, at a predetermined angle, thereby radiating it outwardly from the incident portion 412 at a predetermined angle. Thus, the outgoing light can be seen as the light of a specific color by a driver or the like. It is supposed that such a function is realized as follows. Namely, different directions of light rays are radiated from the LEDs 121, 122 and 123. With respect to the rays parallel to the radial direction, as a continuing direction of the teeth 426, of the refractive plate 425 and the rays inclined upward to such parallel rays within a predetermined angle $\theta$ (about 20 degrees), these rays going into the tooth 426 from one surface thereof are refracted at a predetermined refractive angle. These refracted rays are reflected by the other surface of the tooth 426 at a total reflection angle (not less than a critical angle) and radiated outside. Certain rays other than the above, i.e., rays inclined upward to the refractive plate 425 at an angle more than about 20 degrees, are small in amount. However, such rays are reflected by the reflection surface 412b inside the incident portion 412. Among such reflected rays, the rays parallel to the refractive plate 425, and the rays inclined upward thereto within an angle of about 20 degrees, are radiated outside at a predetermined angle through the refractive plate 425. The rays entering the refractive plate 425 inclined upward at an angle of more than about 20 degrees go through the plate 425 at a different angle than the above angle, and are radiated outside. That is, only the rays going parallel to the refractive plate 425 in the incident portion 412 are attenuated therein without going outside. However, such rays are of a small amount, and can be neglected.

Figure 47:
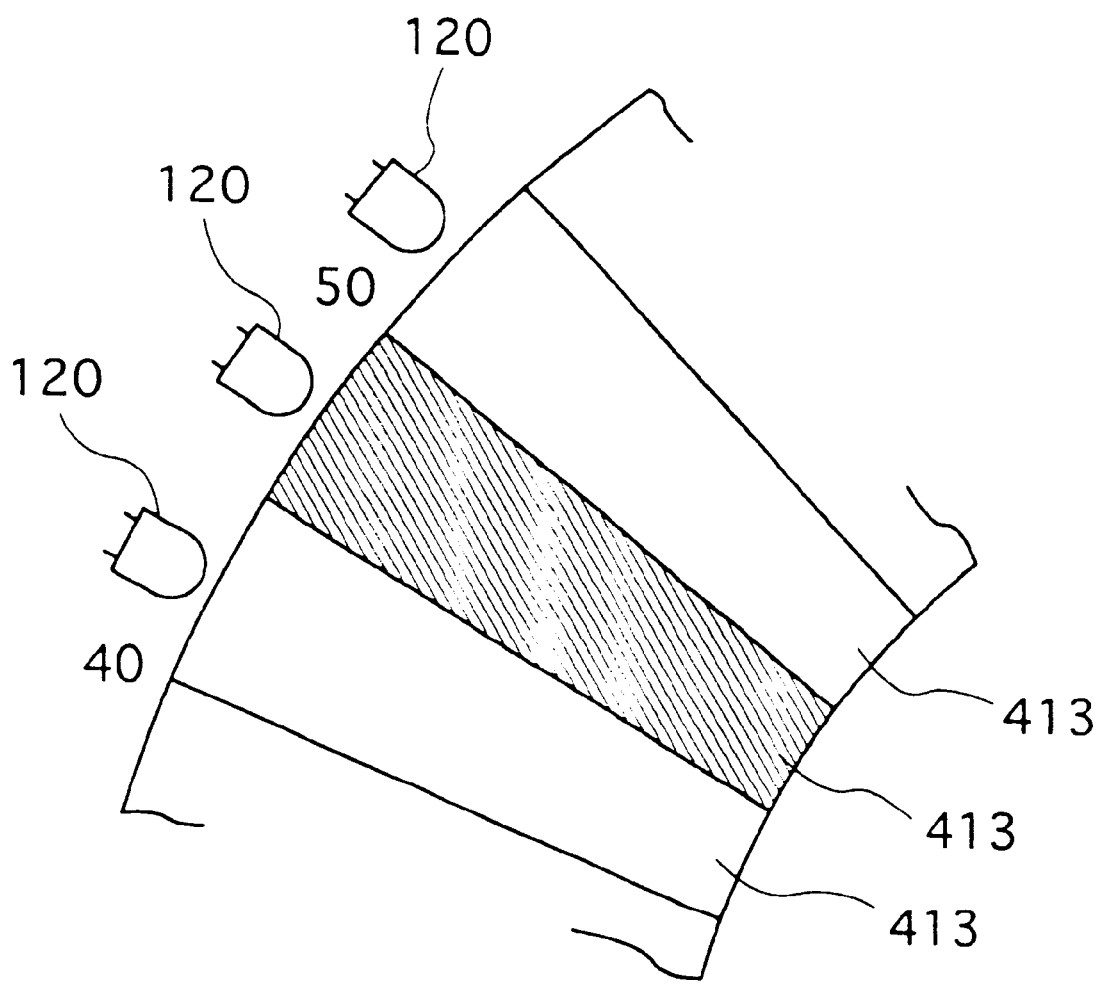
FIG. 47 is a partial plan view showing the used state of the speed meter in the fourteenth embodiment of the invention.

As shown in FIGS. 43, 44 and 47, the LED units 120 are accommodated in the incident portions 412 corresponding to the pointers 413, respectively. Thus, the same number of each color of the LEDs 121, 122, 123 are arranged in the incident portions 412 as the number of the pointers 413. Each color among LEDs 121, 122, 123 constitutes a red LED group, a green LED group and a blue LED group, respectively, as shown in FIG. 5. As described above, the LED units 120 are individually lighted so as to illuminate corresponding pointers 413 selectively, thereby indicating the velocity. In FIG. 47, the pointer 413 of 50 km/h is lit to indicate the vehicle running speed. The housing 411 has both of its longitudinal ends shut so as to prevent the light of the LED 121, 122, 123 from leaking at portions other than the refractive plate 425. Therefore, the housing 411 may be formed into such an integral unitary body when manufactured. Otherwise, only an outer wall 411a (refer to FIGS. 44 and 45) may be formed separately, and the housing 411 may be formed integrally into a shape which has the outer end opened without the outer wall. In this case, each unit of the LEDs 121, 122 and 123 is mounted on a position, facing each incident portion 412, of the outer wall 411a, and the outer wall 411a is joined to the outer circumferential end of the housing so as to close the opening.

Moreover, a light diffusion film 429 is overlaps and joints the front surface of the refraction plate 425. The diffusing film 429 is composed of a light diffusion portion 429a and a pair of mask portions 429a and 429b. The diffusion portion 429a is translucent and has a sector shape, in plan view, so as to be overlapped on the refraction plate 425 corresponding to the pointers 413. The mask portions 429b and 429c are integrally formed on the inner and outer circumferences of the diffusion portion 429a, respectively, so as to be continuous therefrom. The mask portions 429b and 429c have a metallic color so as to mask the inner and outer circumferential portions of the housing 411 or the portions thereof corresponding to the LEDs 121, 122 and 123. The diffusion film 429 uses a conventional resin film or a resin sheet which performs a light diffusing function and serves as the diffusion portion 429a. The film 429 gives a prescribed metallic color to the inner and outer circumferences of the diffusion portion 429a by metal painting or mixing pigments in the material beforehand, thereby forming the mask portions 429b and 429c. The diffusion portion 429a scatters and diffuses wholly and uniformly the light from the refraction plate 425 which has a directivity. The incident portion 412 is seen as the pointer 413 on the meter panel 101 at a portion other than the portions closed by the masks 429b and 429c, namely, the portion corresponding to the diffusion portion 429a. The masks 429b and 429c may have colors other than the metallic color, such as black, as long as the color has a masking effect blocking light to the inner and outer circumferences of the housing 411. Moreover, an actual meter panel 101 may have a conventional ornamental film (not shown) overlapped on the diffusion film 429, so as to prevent the masks 429b and 429c and the like from negatively impacting on the decorative effects thereof. Otherwise, the diffusion film 429 may be omitted, and the ornamental film may be directly overlapped on the refraction plate 425 so that the ornamental film masks the inner and outer circumferences of the housing 411.

Figure 48:
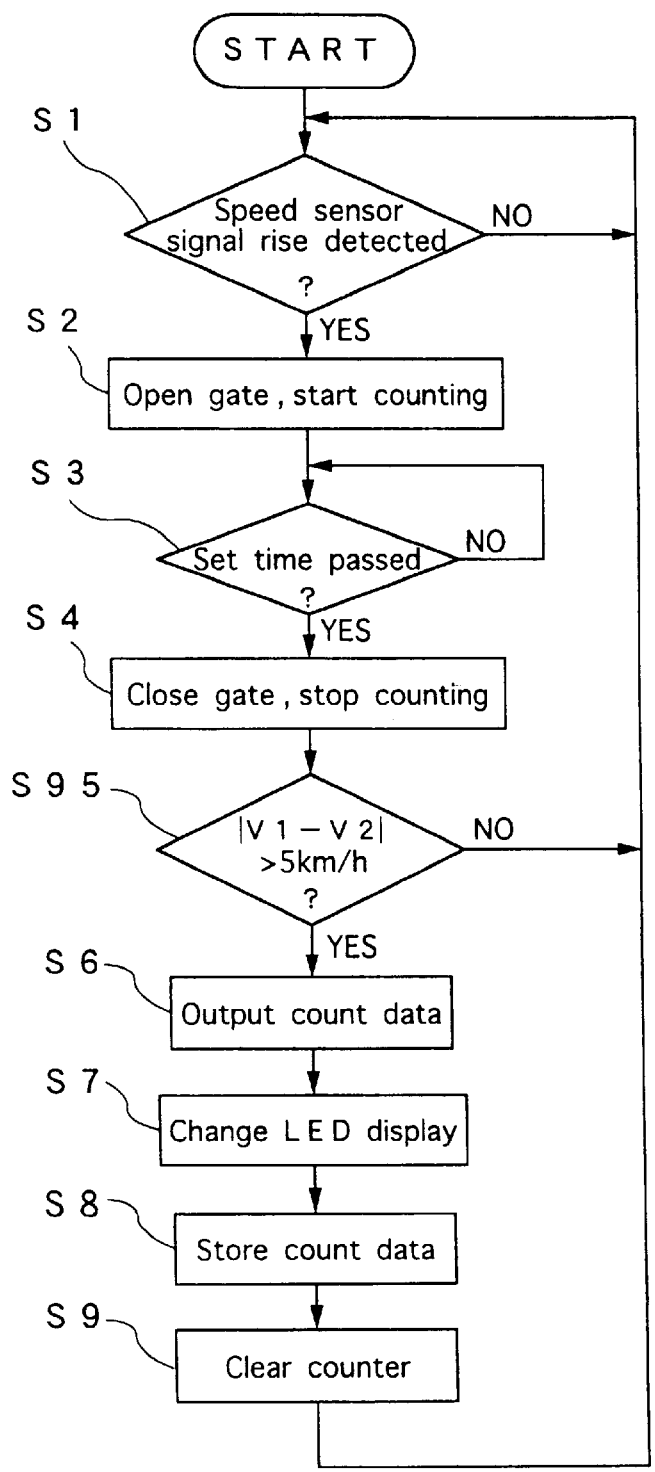
FIG. 48 is a flowchart showing the whole operation of the speed meter in the fourteenth embodiment of the invention.

Next, an electrical constitution and an operation of the fourteenth embodiment of the vehicle meter are described referring to FIG. 48.

A control part of a control means for controlling the light emission in the fourteenth embodiment may have the same structure as that of the first embodiment shown in FIG. 5, and be provided for execution of a main program as shown in FIG. 48. A controlling operation thereof may be the same as the first embodiment, except for a threshold value for changing the speed indication.

Namely, as shown in FIG. 48, after the steps S1 to S4 of the first embodiment, the fourteenth embodiment compares a count data V2 of the counter 34 with a stored count data V1, that is a present indicated speed data, in step S95. If the difference V1–V2 between them is greater than 5 km/h, the execution proceeds to the steps S6 to S9.

In case the fourteenth embodiment is provided with the pointers 413 of the indicator 410 such as a speedometer, the light radiated from the LED unit 120 into the incident portion 412 goes out to the front side of the indicator 410 at a predetermined angle through the refraction plate 425, so that such light can be seen from the outside. Here, most of the light in the incident portion 412 goes outside at a constant angle, so that such light can be seen by a user like the driver while having a prescribed directivity. As a result, the luminance of the pointer 413 corresponding to the incident portion 412 is highly improved. Particularly, if an inclination or position of the indicator 410 is appropriately set in consideration of the outgoing angle of the light, on the meter panel 101 at the time of assembling, the light quantity reaching the user can be enlarged to a great degree, and the visibility improves very much. According to an experimental value, the luminance of each pointer 413 may be improved by an order of not less than three figures. Moreover, since the incident portion 412 has a box shape, a sufficient space is formed therein. Therefore, the LEDs 121, 122, 123 can be easily mounted inside the incident portion 412, and a variety of shapes or dimensions of LEDs 121, 122, 123 can be used. As a result, any LED of low cost with high light emission characteristics can be utilized such as the bullet shaped LED mentioned above.

In the fourteenth embodiment, while a plurality of incident portions 412 are successively formed in one body to make the housing 411, the incident portions 412 may be formed separately. Moreover, the refraction plate 415 may be formed in divisions to individually cover the opening 412a of each incident portion 412.

The vehicle meter according to the fourteenth embodiment may have incident portions of substantially an elongated rectangle shape, while opening its one thickness end and making its inside surface a light reflection surface. In this case, many rectangular incident portions may be successively arranged in the width direction and formed into one body so as to make up a housing of rectangular shape in plan view. Thus, a bar graph indicator can be obtained. Here, the LEDs 121, 122 and 123 are disposed at one longitudinal end of each incident portion, and a light refraction plate wholly covers the openings of all the incident portions. The refraction plate has a similar structure to the refraction plate 415; however, it has a rectangular plate shape corresponding to the rectangular housing. The rear surface of the refraction plate is formed into a saw shape having teeth provided in the longitudinal direction of each incident portion. Moreover, peak lines between the teeth extend linearly in the width direction of each incident portion.

In this modification, the light radiated from the LED unit 120 enters the inside space of the corresponding incident portion as in the above illustrated embodiment. Then, the light parallel to the longitudinal direction of the incident portion and the light inclined upward to such direction reaches the refraction plate. This light is radiated outside toward the front surface side of the indicator through the teeth, thereby illuminating the corresponding pointer.

The fourteenth embodiment can be embodied in an indicator such as a speedometer, and can have similar functions, effects and advantages as those of the first embodiment.

If many incident portions 412 are formed integrally to make the housing 411, manufacturing is easier and costs can be reduced, in comparison with the case in which the incident portions are separately produced and joined in a subsequent separate step.

If the housing 411 is made of a metallic material of high heat conductivity such as aluminum, the inside temperature of the incident portion 412 can decrease due to its heat radiating function, thereby improving cooling effects. Thus, the luminances of the LEDs 121, 122, 123 which tend to be affected by heat can be maintained at a high value. Moreover, if the diffusion film 429 is provided to diffuse the light having directivity from the refraction plate 425, the light at the pointer is attenuated so as to be seen by the driver as a soft light of high visibility, though the light transmittance is lowered to a small degree.

Furthermore, if the indicator 410 is shaped into a sector in plan view, it can exhibit an ornamental effect as in the conventional analogue meter. Then, it enjoys an improved ornamentation without deteriorating the harmony of the meter. On the other hand, if the incident portions are arranged linearly to make the indicator of rectangular shape, such an indicator can be used as a bar graph indicator like a conventional digital meter.

If the refraction plate 425 is made of a transparent resin having a refractive index of about 1.5, and the tooth angle is set in to range approximately from 60 to 80 degrees, most of the light inside the incident portion 412 can go outside at a predetermined angle through the refraction plate 425. Such light is seen by the user as light having a specific directivity, so that the luminance of the pointer 413 increases more and the visibility highly improves.

Figure 49:
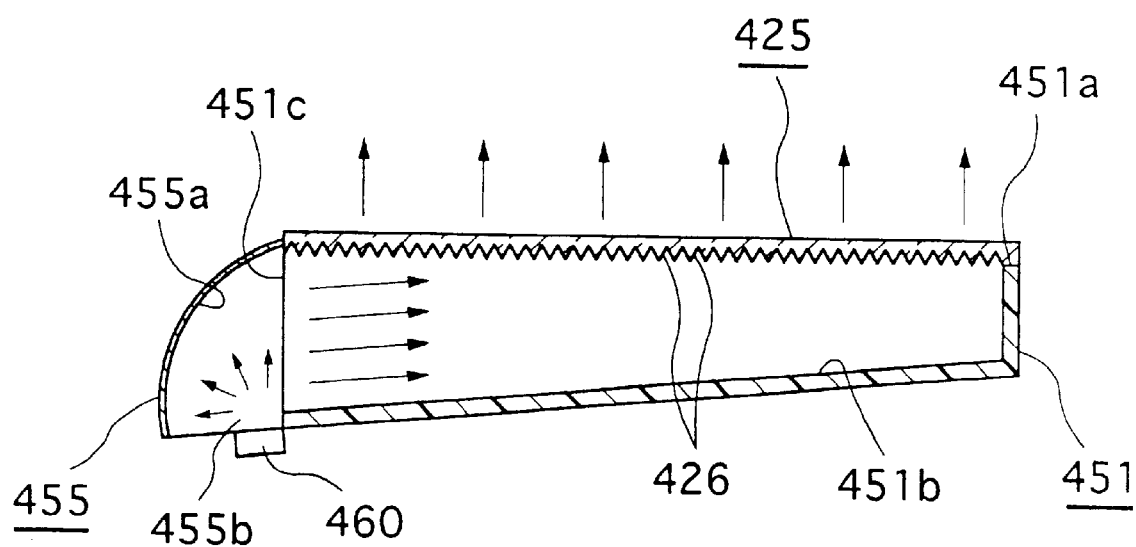
FIG. 49 is an end view showing a speed meter by cutting in the direction of a radius, as an LED display device in a fifteenth embodiment of the invention.

FIG. 49 shows a vehicle meter as a fifteenth embodiment of an LED display device of the invention.

Referring to FIG. 49, the fifteenth embodiment is different from the fourteenth embodiment in the shape of each incident portion 451, a position of an LED 460, and a structure for direct all the light emitted from the LED 460 into parallel rays for effectively radiating them into the incident portion 451. Namely, the incident portion 451 has substantially an elongate quadrilateral box shape which has an opening 451a at its upper end and a reflection surface 451b at its whole inside surface, as in the incident portion 412 of the fourteenth embodiment. Moreover, the plan view of the incident portion 451 is substantially an elongated trapezoidal or sector shape as in the fourteenth embodiment; however, the cross-sectional shape thereof is substantially trapezoidal which is thinner towards an inner circumferential end (right end in FIG. 49). Thus, its lower surface is inclined upward as it approaches the inner circumferential end. An opening 451c is provided on an outer circumferential end of each incident portion 451. A parabolic mirror 455 is fitted to the opening 451c. The parabolic mirror 455 has a reflection surface 455a obtained by dividing a two-dimensional parabolic surface into halves in its curved surface direction. The parabolic mirror 455 further has a substrate 455b made of a transparent body such as a transparent resin or the like which supports the reflection surface 455a. The substrate 455b is fixed in the opening 451c of the incident portion 451 so that the reflection surface 455a faces the opening 451c. The parabolic mirror 455 has a focal point at a corner of the substrate 455b, where the LED unit 460 is arranged by embedding or joining, while facing the parabolic mirror 455. The LED unit 460 emits light of a desired color to the reflection surface 455a of the parabolic mirror 455.

A light shielding means (not shown) such as a slit is provided between the parabolic mirrors 455 of the circumferentially successive incident portions 451. Thus, the rays from the parabolic mirror 455 at the present lighting position is prevented from leaking into the adjoining parabolic mirror 455, so that a pointer 413 at a different position is not lighted unintentionally. The reflection surface 455a of the parabolic mirror 455 may be made into a three-dimensional parabolic surface so that it changes the rays emitted from the LED unit 460 into parallel rays in not only the width direction (vertical direction in FIG. 49) but also in the thickness direction (paper thickness direction in FIG. 49) of the incident portion 451. Thus, the parallel rays from the parabolic mirror 455 go just into the correct incident portion 451 while focused within the range of the cross sectional area of the opening 451a. In this case, the above mentioned light shielding means can be omitted.

With the above structure, the scattering light emitted from the LED unit 460, which can be deemed substantially to be a point light source, can be totally changed into parallel rays by the reflection surface 455a after entering the substrate 455b. Thus, only parallel rays are emitted into the incident portion 451.

In the illustrative embodiment, the reflecting direction of the reflection surface 455a is such that it directs the rays at a small slant upward in the longitudinal direction of the incident portion 451 (right and left direction in FIG. 49). Namely, the direction of reflection is set such that the parallel rays from the parabolic mirror 455 enter the incident portion 451 at an inclined incident angle within the range of 20 degrees in relation to the rear surface of the refraction plate 425. Here, the inclination of the bottom surface of the incident portion 451 is preferably set to an angle smaller than the incident angle of the parallel rays to the refraction plate 425. Thus, the incident light from the parabolic mirror 455 entering the incident portion 451 is prevented from being directly reflected by the bottom surface of the incident portion 451, so that such reflected light does not enter the rear surface of the refraction plate 425 at an angle over 20 degrees. Structures other than the above are the same as in the fourteenth embodiment. Here, the LED unit 460 may use an LED lamp instead of the LED chip. The LED lamp or the LED chip may be one which can emit a single color or two or more colors. Moreover, the housing of the LED may be provided with a lens of a resin mold which performs the same function as the substrate 455b, so that the LED unit 460 and the parabolic mirror 455 can be integrally formed.

In the fifteenth embodiment, in addition to the functions and advantageous effects of the fourteenth embodiment, all the scattering light rays emitted from the LED unit 460 can be changed into parallel rays by the reflection surface 455a, so that substantially all of incident light entering the incident portion 451 reach refraction plate 425. Thus, the quantity of the light exiting the refraction plate 425 increases. As a result, the luminance of the pointer 413 can be heightened and the visibility of the indicator 410 can be improved. A small portion of the incident light entering the incident portion 451 may be directly reflected by the inside surface at the inner circumferential end thereof (right inside surface in FIG. 49). However, since such inside surface is at right angles to the refraction plate 425, the light at that surface enters the refraction plate 425 at the same slant angle (an angle within 20 degrees relative to the refraction plate 425) as the angle of the light reflected from the parabolic mirror 455, but in an opposite direction. Thus, such light exits at the above-mentioned predetermined angle into the light having a specific directivity.

Figure 50:
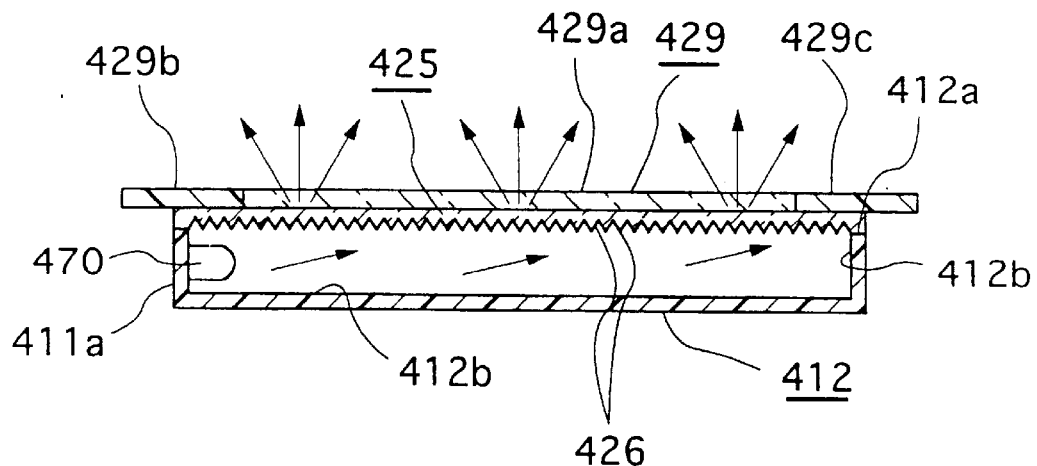
FIG. 50 is a sectional view showing a speed meter by cutting in the direction of a radius, as an LED display device in a sixteenth embodiment of the invention.

FIG. 50 shows a vehicle meter as a sixteenth embodiment of an LED display device of the invention.

Referring to FIG. 50, the vehicle meter of this embodiment adopts a similar structure to the fourteenth embodiment, but is different from the fourteenth embodiment in that an LED 470 accommodated in each incident portion 412 can emit light of any colors by itself. Namely, in the fourteenth embodiment, each incident portion 412 accommodates therein an LED unit 120 which includes red, green and blue LEDs 121–123. In the sixteenth embodiment, each incident portion 412 accommodates therein only one LED 470. Each LED 470 is electrically connected to a printed board (not shown). The LED 470 itself may be a conventional one, e.g., one which has an LED chip supported on a lead frame, composed of one main-lead and three sub-leads, while packing a molding resin a round them. Red, green and blue LED chips are mounted on the main-lead so that one electrode of each LED chip is electrically connected thereto. The other electrode of each LED chip is electrically connected to each sub-lead by a lead wire. Moreover, the three colors of the LED chips may be selectively lit under control by the driver 131 of the first embodiment shown in FIG. 5, so that the LED 470 is able to emit all colors of light therefrom. The incident portion 412 of the sixteenth embodiment can be thinner than that of the fourteenth embodiment since only one LED 470 is disposed therein.

As shown in FIG. 50, in the vehicle meter of the sixteenth embodiment, most of the incident light of a desired color, which is emitted from each LED 470 into each incident portion 412, is refracted at a predetermined angle through the teeth 426 of the refraction plate 425 and exits the incident portion 412. Thus, such outgoing light can be seen by a driver or the like as a specific color of light.

Moreover, the LEDs 470 are arranged in the incident portions 412 corresponding to every pointer 413. Thus, the LEDs 470, each of which has red, green and blue LED chips, are provided in the incident portions 412, in the same number as the pointers 413 in total, thereby constituting a red LED group, a green LED group and a blue LED group as a whole. The LEDs 470 are individually lighted as in the fourteenth embodiment, thereby selectively illuminating the corresponding pointers 413 for indicating a velocity.

The electrical structure and operation of the sixteenth embodiment of the vehicle meter is the same as those of the fourteenth embodiment, and the control means of FIG. 5 may be provided to execute a control operation for the speed indication of the pointers 413 according to the main program of FIG. 48. On the other hand, while the control means in the fourteenth embodiment controls the light emission of three LEDs 121–123, respectively, in each incident portion 412, the control means in the sixteenth embodiment separately controls each LED chip of the LED 470, which is singularly provided, thereby obtaining a desired color of light emission.

The sixteenth embodiment of the vehicle meter substitutes the single LED 470 for the LED unit 120 of the fourteenth embodiment of the vehicle meter. Therefore, in addition to the functions and advantageous effects of the fourteenth embodiment, the total number of the LEDs 470 used in the LED display device can be reduced. Moreover, the incident portion 412 or the housing 411 can be thinner, so that the unit itself can be thinner, too. Here, the LED 470 of the sixteenth embodiment may be an LED chip which has two or more than three different colors, instead of one which has three different colors.

Figure 51:
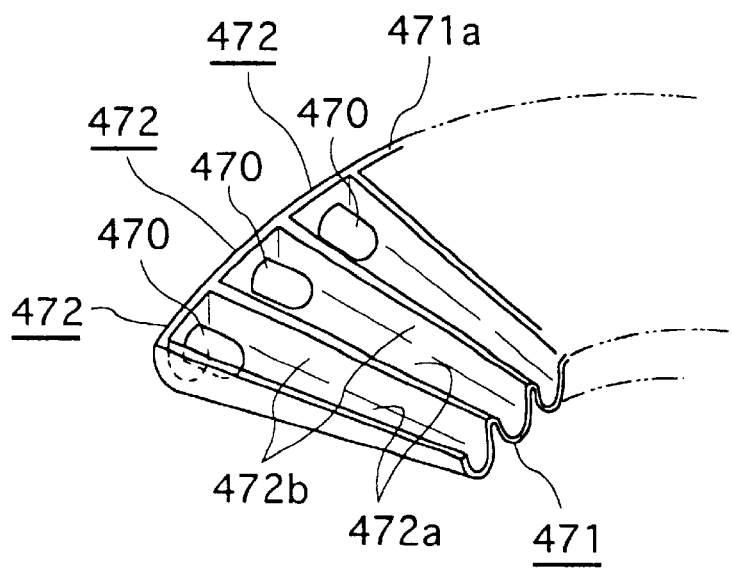
FIG. 51 is a perspective view showing a main part of a housing of a speed meter as an LED display device in a seventeenth embodiment of the invention.

FIG. 51 shows a vehicle meter as a seventeenth embodiment of an LED display device of the invention.

Referring to FIG. 51, the vehicle meter of the seventeenth embodiment has a similar structure to the fourteenth embodiment. However, it is different therefrom in that each incident portion 472 of a housing 471 has an elongated box shape with a substantially semicircular or elliptical cross section. The sixteenth embodiment is further different in that the LED 470 of the sixteenth embodiment is accommodated in each incident portion 472. Namely, the indicator 410 of the seventeenth embodiment is composed of the housing 471, LEDs 470 and refraction plate 425. The housing 471 is made of many incident portions 472 into substantially a sector shape in a plan view. Each incident portion 472 has an opening 472a at its one side end (upper end in FIG. 51). The refraction plate 425 covers the opening 472a at the upper end of the incident portions 472 or the housing 471. The housing 471 is formed into the sector shape of a predetermined angle by successively and closely joining the incident portions 472 in the width direction to form one body, as in the housing 411 of the fourteenth embodiment. Each incident portion 472 has an elongated trapezoidal or sector shape with one longitudinal end wider than the other longitudinal end, in a plan view. The incident portion 472 is formed with a substantially semicylidrical shape as a whole with its both longitudinal ends closed. Moreover, each incident portion 472 reduces its thickness as goes from the outer circumferential end towards the inner circumferential end, as in the incident portion 452 of the fifteenth embodiment. The incident portions 472 are joined in the circumferential direction of the housing 471 while placing the one longitudinal end at the outer circumferential end of the housing 471 and the other longitudinal end at the inner circumferential end, as the incident portions 452 of the fifteenth embodiment.

The housing 471 is made of a metal or resin material forming a unitary body, as is the housing 411 of the fourteenth embodiment. The whole inside surface of each incident portion 472 is coated with a reflection surface 472b, e.g., of a metal plating. If the housing 471 is made of a material of high reflectance such as aluminum, the metal plating of the inside surface of the incident portion 472 may be omitted. Moreover, the incident portions 472 are placed at a constant interval or angle as in the fourteenth embodiment, so as to divide the indicator 410 into many pointers 413 of an elongated trapezoidal or sector shape.

The vehicle meter of the seventeenth embodiment operates substantially in the same way as the fourteenth embodiment. Namely, light of a desired color is emitted from the LED 470 into each incident portion 472. Most of the incident light is refracted at a predetermined angle through the teeth 426 of the refraction plate 425, and leaves the incident portion 472 at a predetermined angle. Thus, the outgoing light is seen by a driver or the like as the light of a specific color.

That is, the LED 470 is secured to the inside of the outer circumferential end of each incident portion 472 so as to emit light therein. The incident portion 472 may be composed of three LEDs 121–123 like the fourteenth embodiment. In this case, the thickness of the incident portion 472 should be enlarged accordingly. The LEDs 470 are disposed in the incident portions 472 corresponding to every pointer 413. Thus, the LEDs 470 are arranged in the incident portions 472 in the same number as the number of the pointers 413.

Though the inner circumference of the housing 471 is illustrated as being opened in FIG. 51, for easy understanding of the cross-sectional shape of the incident portion 472, the actual housing 471 has both longitudinal ends of the incident portions 472 closed so that the light from the LED 470 does not leak from portions other than the refraction plate 425. Therefore, the housing 471 may be unitarily formed integrally in such a shape. Otherwise, an outer wall 471a for fitting the LED 470 may be separately formed, while the housing 471 is made into one body which does not have such an outer wall with the outer circumferential end opened. Then, after the LEDs 470 are mounted on the outer wall 471a at positions opposite to each incident portion 472, this outer wall 471a is joined to the outer circumferential end of the housing so as to shut off the opening.

Moreover, in the seventeenth embodiment, the light diffusion film 429 may be overlapped on the light refraction plate 425 as in the fourteenth embodiment. Furthermore, a conventional ornamental film (not shown) may be overlapped on the diffusion film 429 so as to prevent deterioration of the appearance of the meter panel 101 or the like due to the masks 429b, 429c, etc. Otherwise, the diffusion film 429 may be omitted, and the ornamental film is directly overlaid on the refraction plate 425 so as to mask the outer and inner circumferential ends of the housing 411.

The vehicle meter of the seventeenth embodiment substitutes the housing 471 for the housing 411 of the fourteenth embodiment, and the LED 470 for the LED unit 120. Thus, this embodiment has the same functions and advantageous effects of the fourteenth embodiment. Moreover, since the incident portion 472 has a substantially semicylindrical shape, if the housing is formed by injection molding, a releasing operation of a molded housing is made easier, so that its manufacture is facilitated. Furthermore, the production costs therefor can be reduced, and the productivity accordingly improved. The seventeenth embodiment may adopt an LED which has two colors or more than three colors of LED chips, instead of the LED 470 having three colors of LED chips. Moreover, as in the fifteenth embodiment, it is possible to substitute the combination of the parabolic mirror 455 and the LED unit 460 for the LED 470 so that only parallel rays are radiated into the incident portion 472. Furthermore, the incident portion 472 may accommodate therein one or more of the red, green and blue LED lamps.

The fourteenth to seventeenth embodiments may be embodied into another meter, such as a tachometer, instead of the speedometer, as in the first embodiment. Moreover, the electrical structure and its control program is not limited to the above. In addition, while the pointer 413 indicates the speed for every five kilometers per hour, it may indicate the speed for every one to four kilometers per hour or every six or more kilometers per hour. The incident portion 412 of the fourteenth to sixteenth embodiments may have a substantially trapezoidal cross section and be thinner as it goes towards the inner circumferential end (right end in FIG. 45), as does the incident portion 451 of the fifteenth embodiment. The incident portion 472 of the seventeenth embodiment may have an elongated box shape extending along the length with the equal thickness, as does the incident portion 412 of the fourteenth embodiment. Moreover, in the fourteenth to seventeenth embodiments, exterior information which shows a warning or a malfunction may be indicated by the pointer 413 in addition to the speed indication, as in the first embodiment.

FIGS. 52 to 56 show a vehicle meter as an eighteenth embodiment of an LED display device of the invention.

Figure 52:
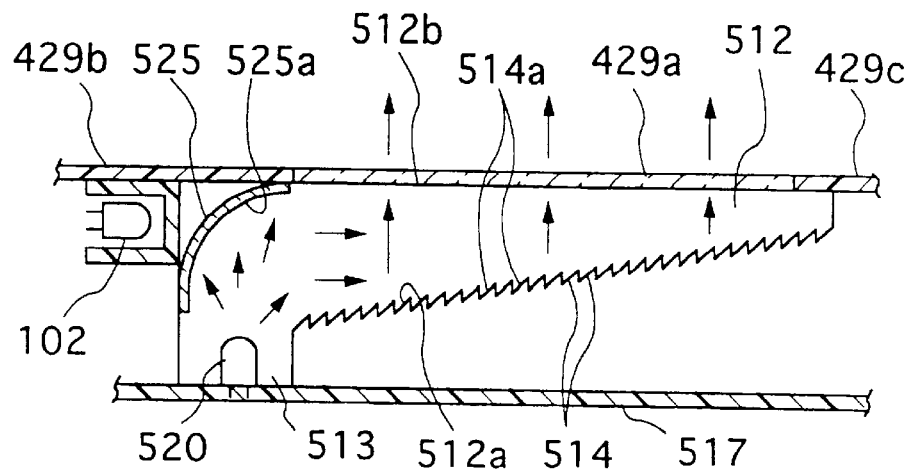
FIG. 52 is an end view showing a speed meter by cutting in the direction of a radius, as an LED display device in an eighteenth embodiment of the invention.
Figure 54:
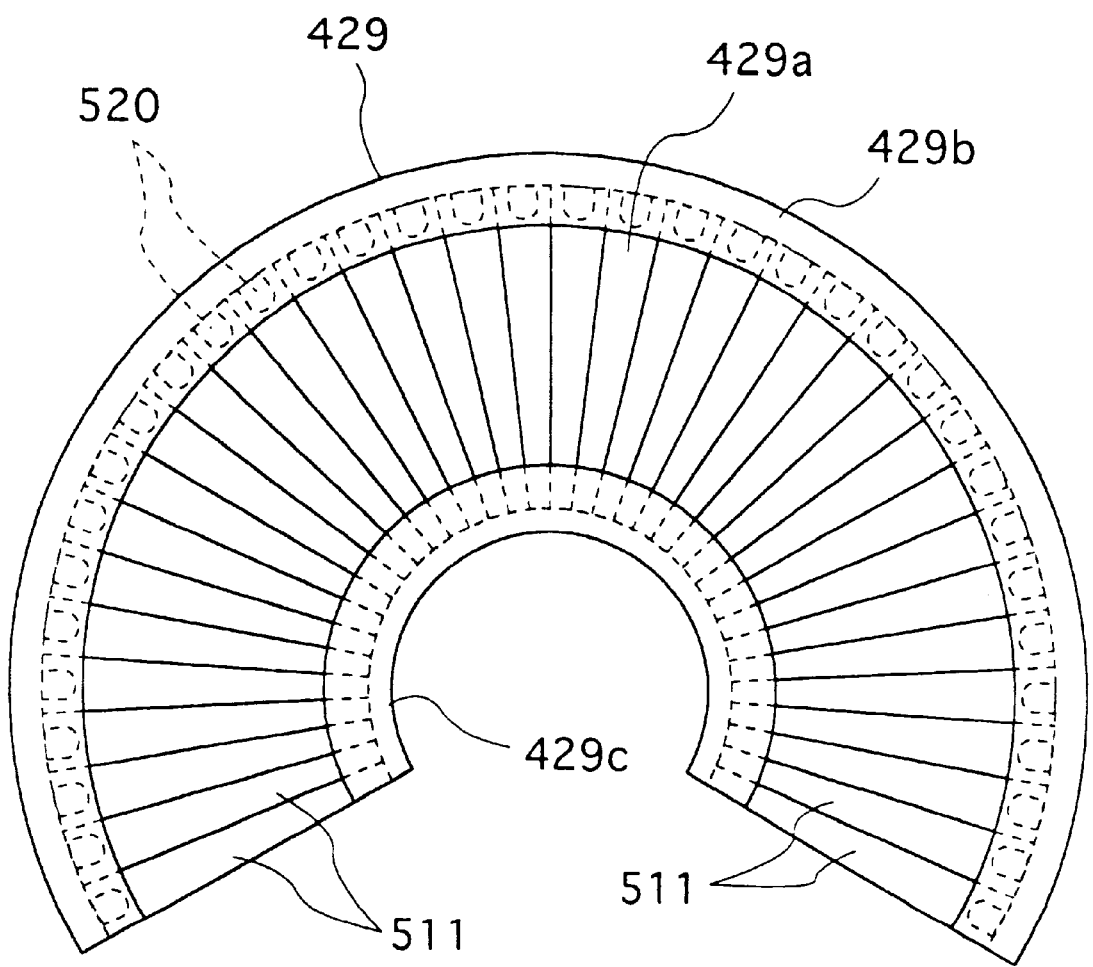
FIG. 54 is a plan view showing a main part of the speed meter in the eighteenth embodiment of the invention.

The vehicle meter of the eighteenth embodiment is embodied in the meter panel 101 shown in FIGS. 41 and 42, as in the fourteenth embodiment. As shown in FIGS. 52 and 54, the indicator 410 comprises many photoconductor pieces 511, LED units 520 and parabolic mirrors 525. The photoconductor pieces 511 are arranged closely to each other to form a substantially sector shape in a plan view. The LED units 520 are accommodated in the photoconductor pieces 511, respectively. The parabolic mirrors 525 are also accommodated in the photoconductor pieces 51 as light deflection means. Each photoconductor piece 511 is made integral with a photoconductor material of a predetermined transparent resin in the form of a substantially L-shaped bar. It is composed of a main portion 512 and a supporting portion 513. The main portion 512 has a substantially elongated trapezoidal shape, in longitudinal section, and an elongate trapezoidal shape, in a plan view. The supporting portion 513 is formed downward at right angles from one longitudinal end (left end in FIG. 52) of the main portion 512.

The photoconductor piece 511 has one longitudinal end wider than the other longitudinal end, so that, when many pieces 511 are joined to each other while placing the one outer end next to the other outer end, they form the sector shaped indicator 410. The photoconductor piece 511 has one thickness side surface (lower surface in FIG. 52) of the main portion 512 made into a reflection surface 512a, and the other thickness side surface serves as emitting surface 512b. Many grooves 514 of a triangular cross section are successively formed along the length of the reflection surface 512a so as to define a saw shape. Each groove 514 linearly extends in the width direction of the main portion 512. The main portion 512 becomes thinner as it goes towards the inner circumferential end (right end in FIG. 52), so that the reflection surface 512a is slanted upward and approaches nearer to the emitting surface as goes rightwards.

Figure 53:
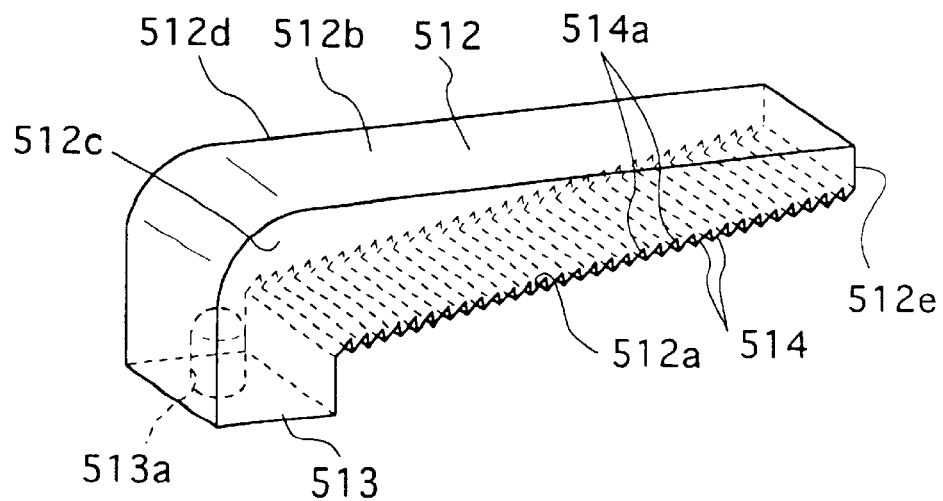
FIG. 53 is a perspective view showing a photoconductor piece of the speed meter in the eighteenth embodiment of the invention.

The LED unit 520 comprises red, green and blue LEDs, though each color of LED is not shown herein. The LED unit 520 is fixedly embedded into the lower end portion of the supporting portion 513 at the one end of the main portion 512. Illustratively, as shown in FIG. 53, an accommodation hole 513a is formed substantially at the center of the lower end of the supporting portion 513 for fitting the LED unit 520 therein. The LED unit 520 is inserted therein after molding the photoconductor piece 511.

FIG. 53 shows only one accommodation hole 513a for fitting one bullet-shaped LED, for facilitating the description. Therefore, if the LED unit 520 is composed of red, green and blue LEDs of bullet shape, three holes 513a may be formed on the supporting portion 513 for accommodating the three different color LEDs, respectively. Moreover, one accommodation hole 513a may be made thereon for accommodating the three LEDs together. Furthermore, other types of LEDs may be used other than the bullet-shaped LED. Here, each LED of the LED unit 520 is electrically connected to a printed board 517. Then, it is controlled by the driver 131 of FIG. 5 so that a fixed color of the LED is selected to be lit as in the first embodiment.

The parabolic mirror 525 is provided integrally on a corner portion between the main portion 512 and the supporting portion 513. The parabolic mirror 525 has a reflection surface 525a which is made, for example, by cutting a two-dimensional parabolic surface in two halves in its curved surface direction. The corner portion of the photoconductor piece 511 is formed into a curved shape corresponding to the reflection surface 525a. The parabolic mirror 525 has its reflection surface 525a closely joined to the corner portion of the photoconductor piece 511. Thus, the reflection surface 525a deflects rays from the LED unit 520 into substantially parallel rays. The parallel rays are radiated into the main portion 512 from its one longitudinal end in a predetermined direction, that is, the longitudinal direction (right direction in FIG. 52) of the main portion 512. The positional relationship between the LED unit 520 and the parabolic mirror 525 is such that the LED unit 520 as a point light source is located at a focal point of the parabolic mirror 525. Moreover, the LED unit 520 is preferably disposed in the supporting portion 513 such that its optical axis goes towards the center of the reflection surface 525a of the parabolic mirror 525. With such a structure, light of high intensity around the optical axis of the LED unit 520 can be wholly changed into parallel rays and radiated into the main portion 512. As a result, the incident light quantity entering the main portion 512 can be enlarged.

Figure 55:
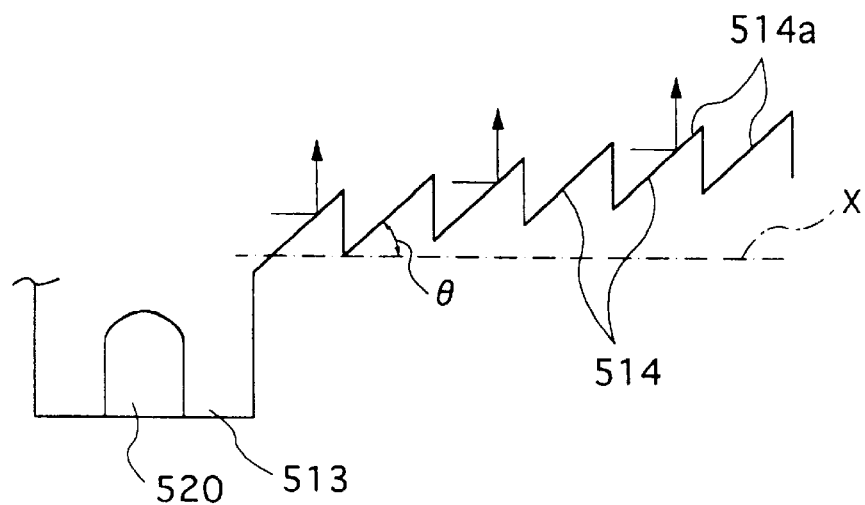
FIG. 55 is a partial sectional view showing a reflection surface of the photoconductor piece of the speed meter in the eighteenth embodiment of the invention.

Moreover, a surface at the one longitudinal end side of each groove 514 is made into a total reflection surface 514a which is inclined at an angle such that light coming from a predetermined direction from the one longitudinal end is totally reflected. Namely, as shown in FIG. 55, the total reflection surface 514a is placed at the left of the groove 514 and slanted upward at a predetermined inclination θ in the right direction, in relation to the parallel rays that run rightwards in the main portion 512 along its length or in a direction parallel to an axis X shown by one dot chain line in FIG. 55. The inclination θ is set in view of a critical angle for the total reflection depending on the kind of the transparent resin material forming the photoconductor piece 511. Namely, it is set such that an incident angle of the parallel rays into the total reflection surface 514a is not smaller than the critical angle in relation to the normal of the total reflection surface 514a. For example, if an acrylic resin (PMMA) is used as a material of the photoconductor piece 511, the critical angle is 42–43 degrees, and the inclination is not less than 47–48 degrees. An epoxy resin has a similar critical angle, and the inclination θ of the total reflection surface 514a for the epoxy resin can be set as in the acrylic resin. Such grooves 514 may be provided integrally on the rear surface of the main portion when forming the photoconductor piece 511. For example, if the photoconductor piece 511 is made of epoxy resin, the grooves 514 are formed on the main portion 512 when integrally making the photoconductor piece 511 in a potting step of the epoxy resin. Thus, the parallel rays entering the main portion 512 along its length are totally reflected by the total reflection surfaces 514a in a direction perpendicular thereto (upward in FIG. 52). Then, such light is directed from the reflection surface 512a to the emitting surface 512b, thereby exiting the emitting surface 512b.

The rays reflected from the reflection surface 525a are parallel in the thickness direction of the main portion 512. However, they remain scattered in the width direction of the main portion 512. Therefore, white coatings are provided, by painting or the like, to define reflection surfaces 512c and 512d on both lateral side surfaces of the main portions 512. Thus, the scattering rays in the width direction from the LED unit 520 are reflected by the reflections surfaces 512c and 512d. Such reflected rays are totally reflected upward by the total reflection surfaces 514a at last, thereby exiting the emitting surface 512b. With this structure, the light from the parabolic mirror 525 is prevented from leaking outside from the lateral side surfaces of the main portion 512. Moreover, a white coating is provided on the other longitudinal end surface (right end surface in FIG. 52) of the main portion 512, by painting or the like, to define a reflection surface 512e. When the light from the parabolic mirror 525 reaches the other end surface of the main body 512, such light is reflected by the reflection surface 512e and prevented from leaking outside. The reflection surface 525a of the parabolic mirror 525 may be a three-dimensional parabolic surface. In this case, the scatering rays emitted from the LED unit 520 are changed into parallel rays in not only the thickness direction but also in the width direction of the main portion 512, thereby entering it within the cross-sectional area thereof. Thus, the white coatings at both lateral sides of the main portion 512 may be omitted.

In the eighteenth embodiment, the photoconductor pieces 511 are arranged at constant spatial intervals or angles in the circumferential directions to define divisions or pointers 515 of an elongate sector shape of the indicator 410. Illustratively, the pointers 515 divide in halves the scales given at ten kilometers per hour, thereby each indicating an increment of five kilometers per hour.

Figure 56:
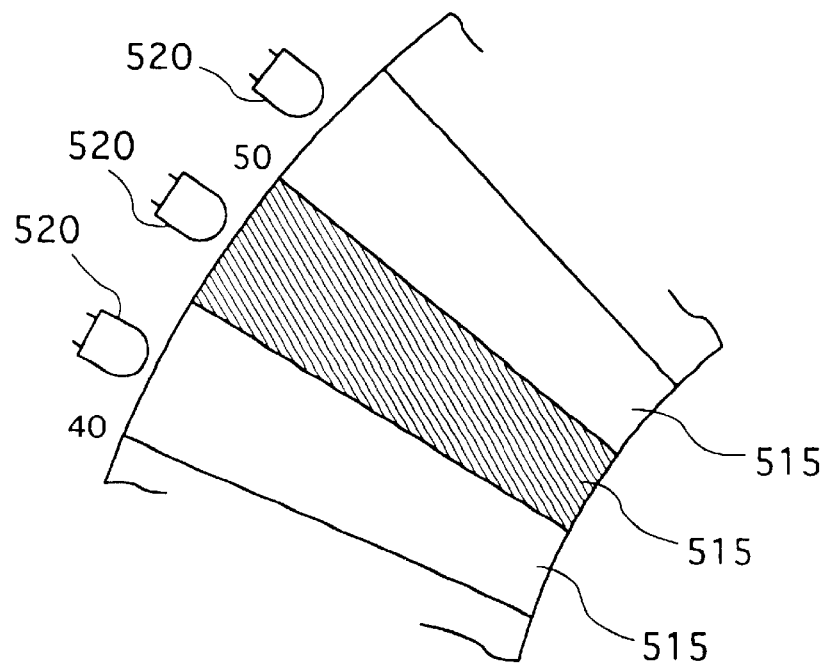
FIG. 56 is a partial plan view showing the used state of the speed meter in the eighteenth embodiment of the invention.

As shown in FIG. 54, the LED units 520 are disposed in the photoconductor pieces 511, respectively, corresponding to all the pointers 515. Then, the LED units 520 are arranged at the outer circumference of the indicator 410 in the same number as the number of the pointers 515. Thus, the red, green and blue LEDs of the LED unit 520 constitute a red LED group, a green LED group and a blue LED group. As described above, when the LED units 520 are individually lighted, the pointers 515 are selectively illuminated, thereby indicating the running speed. In FIG. 56, the pointer 515 of 50 km/h is lit.

Moreover, in the eighteenth embodiment, the light diffusion film 429 is joined over the front surface of the photoconductor pieces 511, as in the fourteenth embodiment. The diffusion film 429 is overlapped on the portions, corresponding to the pointers 515, of the photoconductor pieces so that the mask portions 429b and 429c mask the outer circumferential end, which faces the LED units 520, and the inner circumferential end of the indicator 410, respectively. The photoconductor pieces 511 are seen as the pointers 515 on the meter panel 101, except for the portions masked by the mask portions 429a and 429b, namely at the portions corresponding to the diffusion portion 429a.

The electrical structure and operation of the eighteenth embodiment of the vehicle meter is similar to the fourteenth embodiment. Namely, the control means of FIG. 5 may provide control for indicating the speed by the pointers 515 according to the main program of FIG. 48.

When the eighteenth embodiment is embodied in an indicator 410 such as a speedometer, the LED unit 520 emits light into the main portion 512 of the photoconductor piece 511 via the parabolic mirror 525. Such light is totally reflected by the total reflection surfaces 514a and exits the emitting surface 512b at a predetermined angle, thereby being seen from the outside. At this time, most of the light inside the main portion 512 exits at a constant angle, so that it is seen by a use like a driver, with a specific directivity. As a result, the luminance of the pointer 515 corresponding to the main portion 512 is enhanced to a great degree. Specially, if the vehicle meter is assembled while appropriately setting its inclination or position on the meter panel 101 in consideration of the outgoing angle of the light, the quantity of light reaching the user can be greatly increased, so that the visibility thereof is improved.

Moreover, in the eighteenth embodiment, the indicator 410 is composed of many photoconductor pieces 511 which are used as the pointers 515, so that the light from the LED unit 520 is reflected by the parabolic mirror 525 of the corresponding pointer 515. Then, the reflected light enters the main portion 512 as parallel rays, which are totally reflected by the total reflection surfaces 514a, thereby exiting the emitting surface 512b. Thus, the outgoing light illuminates the corresponding pointer 515 on the indicator 410.

Particularly, the main portion 512 has a rear surface provided with the total reflection surfaces 514a, to which the parabolic mirror 525 emits the parallel rays after deflecting the light from the LED unit 520. Therefore, it is unnecessary to form a reflection surface such as a white coating on the rear surface of the main portion 512. Still, the total reflection surfaces 514a totally reflect the light from the LED unit 520 at high efficiency, thereby radiating the light from the emitting surface 512b. Then, no light leaks from the rear surface of the main portion 512. Moreover, as compared with the case that the rear surface of the main portion 512 is made into a flat surface of a total reflection angle, the main portion 512 can be thinner, and the vehicle meter itself made thinner as well.

While the illustrative embodiment constitutes the indicator 410 in a sector shape made of many photoconductor pieces 511, the photoconductor piece 511 may be used by itself. For example, a single photoconductor piece 511 may be embodied as a pointer which emits light therefrom. Such a light emitting pointer is known in the conventional art. However, the conventional one needs many LEDs arranged therein along its length. The pointer composed of the photoconductor piece 511 requires only one LED or LED unit and can be illuminated with sufficient luminance.

Moreover, while the eighteenth embodiment provides the LED unit 520 composed of red, green and blue LEDs for each photoconductor piece 511, the LED unit 520 may have a single color LED, two color LEDs or four or more color LEDs.

Here, the photoconductor piece 511 provides excellent results in terms of luminance and visibility compared with the case that the rear surface of the main portion 512 is simply made flat and a white coating is formed on the flat surface as a reflection surface. Moreover, its reflectance is higher. Namely, in case of providing the reflection surface on the rear surface of the main portion by the white coating, the white surface causes diffusing reflection, thereby scattering the light. On the other hand, it is possible to make the reflection surface 512a itself inclined at an angle larger than a critical angle as a total reflection angle in relation to the axis of the light from the parabolic mirror 525. However, in this case, the photoconductor piece 511 should have an excessively large thickness, and needs considerable space in the depth direction of the meter panel 101. Thus, the eighteenth embodiment is more suitable for reducing the thickness of the display device.

While the indicator 410 in the eighteenth embodiment is formed into a sector shape of a predetermined angle (e.g. 240 degrees), it may be modified into a linearly arranged shape such as a rectangular shape, a bar graph shape and so on, e.g., as in the fourteenth embodiment. In this case, each photoconductor piece 511 may be shaped into a substantially rectangle shape in a plan view with a plurality of such pieces disposed and joined closely in their width direction.

Figure 57:
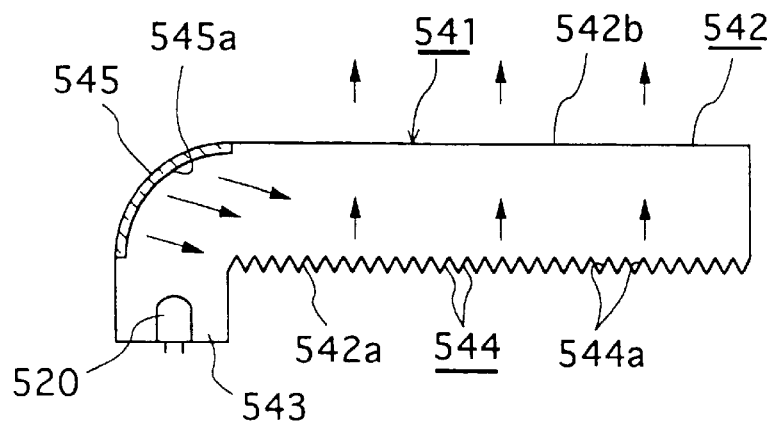
FIG. 57 is an end view showing a speed meter by cutting in the direction of a radius, as an LED display device in a nineteenth embodiment of the invention.

FIG. 57 shows a vehicle meter as a nineteenth embodiment of an LED display device of the invention.

In this embodiment, the indicator is composed of many photoconductor pieces 541. A main portion 542 of each photoconductor piece 541 has a substantially rectangular shape in its longitudinal cross-section, and has a reflection surface 542a substantially parallel to an emitting surface 542b. The main portion 542 has an elongated trapezoidal or sector shape, in a plan view, as does the main portion 512 of the eighteenth embodiment. Many photoconductor pieces 541 are joined to each other to form a sector shaped indicator 410. The photoconductor piece 541 has a supporting portion 543, a lower end of which accomodates an LED unit 520. A parabolic mirror 545 is disposed at a corner portion of the photoconductor piece 511. The LED unit 520 is positioned at a focal point of the parabolic mirror 545. The parabolic mirror 545 has a reflection surface 545a which is adjusted to reflect the light from the LED unit 520 into the main portion 542 in a direction inclined downward at a predetermined angle in relation to the longitudinal direction. Grooves 544 having total reflection surfaces 544a are formed on the reflection surface in the longitudinal direction thereof, as in the eighteenth embodiment. Each groove 544 extends linearly in the width direction of the reflection surface 542a. The total reflection surface 544a has its inclination adjusted so that the light reflected from the parabolic mirror 545 runs at an angle equal to or greater than the critical angle so as to be totally reflected by the total reflection surface 544a. Namely, the total reflection surface 544a is slanted to the running direction of the light reflected from the parabolic mirror 545 at an inclination θ, as in the eighteenth embodiment. Reflection surfaces formed of white coatings are formed on both lateral side surfaces and the other longitudinal end surface of the main portion 542, as in the eighteenth embodiment. Other structures are similar to the eighteenth embodiment.

The nineteenth embodiment of the vehicle meter has the same functions and advantageous effects as the eighteenth embodiment. In addition, since the reflection surface 542a is nearly parallel to the emitting surface 542b, the main portion 542 has an even smaller thickness, so that the display device itself can be thinner accordingly.

In the eighteenth and nineteenth embodiments, external information like a warning or malfunction may be indicated in addition to the speed indication, as in the first embodiment.

Figure 58:
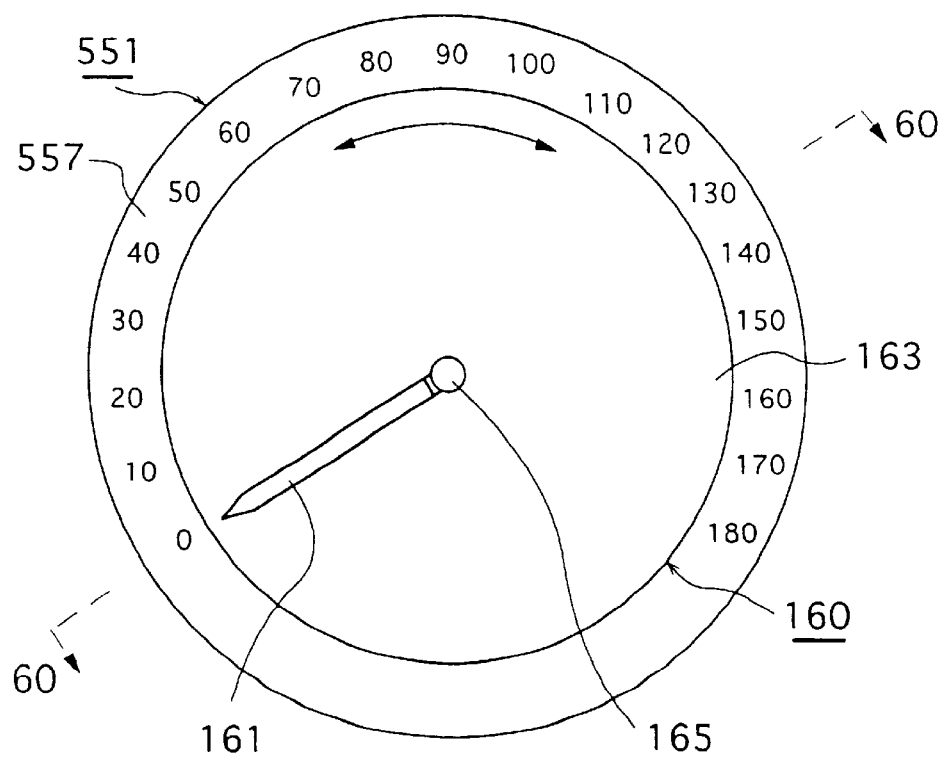
FIG. 58 is a plan view showing a speed meter as an LED display device in a twentieth embodiment of the invention.
Figure 59:
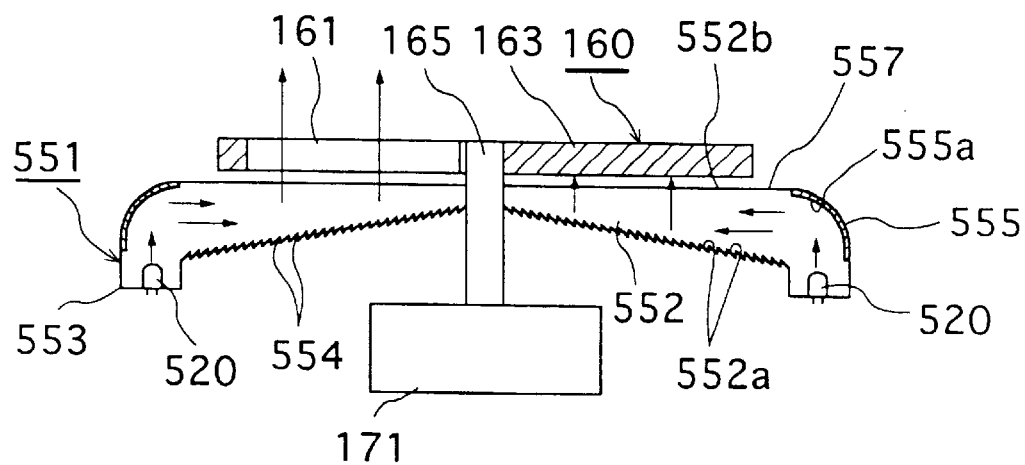
FIG. 59 is a sectional view taken along the line 59—59 in FIG. 58.

FIGS. 58 and 59 show a vehicle meter as a twentieth embodiment of an LED display device of the invention.

Referring to FIGS. 58 and 59, a speedometer as the vehicle meter according to the twentieth embodiment substitutes a photoconductor disc 551 and the LED unit 520 for the photoconductor disc 120 and the LED unit 120 of the second embodiment. The other structures are similar to the second embodiment. Namely, the photoconductor disc 551 is integrally formed of a main portion 552 and a supporting portion 553. The main portion 552 is made of a transparent resin material, e.g., as described in the eighteenth embodiment, formed into a disc shape of a predetermined radius. The supporting portion 553 extends downward at right angles from the outer circumference of the main portion 552. The main portion 552 becomes thinner towards its center so as to provide a reflection surface 552a at one thickness side surface (lower surface in FIG. 59) and an emitting surface 552b at the other thickness side surface. The reflection surface 552a has many grooves of a triangular cross-section successively arranged in the radial direction thereof so as to define a saw-shaped cross-section as a whole.

Since the main portion 520 is thinner at the center, the reflection surface 552a is inclined upward or becomes closer to the emitting surface 552b as it approaches the center. Moreover, the grooves 554 extend in a circle, according to the shape of the photoconductor disc 551, along the circumferential direction of the photoconductor piece 551. Thus, many circular grooves 554 are concentrically arranged on the rear surface of the main portion 552.

A plurality of LED units 520 as described in the eighteenth embodiment are embedded and fixed in the lower end of the supporting portion 553 at fixed angular positions in the circumferential direction. The LED unit 520 is electrically connected to a printed board not shown. A parabolic mirror 555 of similar structure to the parabolic mirror 525 of the nineteenth embodiment is fixedly joined to a corner portion between the main portion 552 and the supporting portion 553, at least at a position facing the LED unit 520. Namely, the parabolic mirror 555 of the twentieth embodiment has a reflection surface 555a of a shape dividing in halves a two-dimensional parabolic surface in its curved surface direction, as in the eighteenth embodiment. The corner portion of the main portion 552 is formed into a curved shape corresponding to the reflection surface 555a. The parabolic mirror 555 is closely connected to the corner portion at the reflection surface side. Thus, the reflection surface 555a deflects the light from the LED units 520 into substantially parallel rays. The parallel rays enter the main portion 552 from its outer circumferential side in a predetermined direction or its radial direction. The positional relation between the LED unit 520 and the parabolic mirror 555 is such that the LED unit 520, serving as a point light source, is located at a focal point of the parabolic mirror 555. Moreover, the LED unit 520 is positioned in the supporting portion 553 such that its optical axis goes towards the center of the reflection surface 555a. With such a structure, the light of high intensity around the optical axis of the LED unit 520 can be wholly changed into parallel rays by the reflection surface 555a, and enter the main portion 552. Thus, the quantity of the incident light into the main portion 552 further increases.

Each groove has a total reflection surface, which is located at the outer circumferential side of the photoconductor piece 551 (parabolic mirror side), and which is inclined at such an angle as to totally reflect the light of a predetermined direction from the outer circumference thereof. The total reflection surface of the groove 554 is slanted upward at a predetermined inclination in relation to the parallel rays running along the radial direction toward the center inside the main portion 552, as in the eighteenth embodiment. The inclination is set in view of a critical angle for the total reflection depending on a kind of the transparent resin material used to form the photoconductor piece 551. Namely, it is set such that the incident angle of the parallel rays in relation to the total reflection surface is not less than the critical angle in relation to the normal of the total reflection surface. Thus, when the parallel rays are radiated from the LED unit 520 in the radial direction of the main portion 552 via the parabolic mirror 555, the parallel rays are totally reflected by the total reflection surface to a direction perpendicular thereto (upward in FIG. 59). The upward light runs from the reflection surface 552a to the emitting surface 552b, thereby exiting the emitting surface 552b.

A scale portion 557 is provided on the outer circumference of the front surface of the photoconductor piece 551. As a matter of course, the twentieth embodiment of the vehicle meter needs no other scales for speed indication. The photoconductor piece 551 is secured to the meter panel 101 so as not to rotate relatively thereto.

The color of the LED unit 520 or the number of LED units 520 may be chosen as desired, as long as the whole photoconductor piece 551 is clearly illuminated so as to light up brightly the scale portion 557 and the light from the photoconductor piece 551 goes through the pointer 161 of the indicator 160 in sufficient quantity so as to enable the speed indication by the pointer 161. The LED unit 520 may be constituted by a single color LED. However, different colors of LEDs may be accommodated in the supporting portion 553 so that the photoconductor piece 551 can change its illumination colors variously. With this structure, the ornamentation of the vehicle meter can be diversified, and the decorative flexibility further improved. In this case, a control means (not shown) controls the selective lighting of a prescribed color of the LED to obtaining a desired illumination color.

Moreover, in the twentieth embodiment, a film like the light diffusion film 429 of the eighteenth embodiment may be overlapped on the front surface of the photoconductor piece 551. Thus, the light of a specific directivity from the reflection surface 552a is scattered and diffused as a whole. In addition, the film masks the outer circumference of the photoconductor piece 551 at a portion corresponding to the parabolic mirror 555 and the LED units 520. Furthermore, the photoconductor piece 551 may be shaped into a sector plate of a predetermined angle, and reflection surfaces like white coatings may be provided on the circumferential end surfaces, as long as it is within the angle of the scale portion 557.

The electrical structure and operation of the twentieth embodiment is similar to the second embodiment. The pointers 161 indicate a speed under the control of the control means of FIG. 9 according to the flowchart of FIG. 10.

In the twentieth embodiment, when the LED unit 520 is operated, the light therefrom is reflected by the parabolic mirror 555 at the outer circumferential side of the photoconductor piece 551. Such reflected light enters the main portion 552 as parallel rays and is totally reflected by the total reflection surfaces of the grooves 554 at the rear surface or the reflection surface 552a. The light then exits the emitting surface 552b at the front side. At this time, the light from the emitting surface 552b is blocked by the pointer disc 160, except for at the scale portion 557 and the pointer 161. Thus, the driver sees only the scale portion 557 and the pointer 161. Namely, the pointer 161 can be indicated while illuminated by use of the LED unit 520, so that unique ornamental effects are obtained with the illuminating pointer 161 as well as the scale portion which is also lit up at the outer circumference of the photoconductor piece 551.

Moreover, since the LED units are to be disposed at the outer circumference of the photoconductor piece 551, the number can be increased, so that the photoconductor piece 551 can be illuminated more brightly as a whole.

Particularly, in the twentieth embodiment, the grooves 554 having the total reflection surfaces are provided on the whole rear surface of the main portion 552 and the light from the LED unit 520 is radiated to the total reflection surfaces after being changed into the parallel rays by the parabolic mirror 555. Therefore, the light can be totally reflected by the total reflection surfaces at high efficiency so as to radiate from the emitting surface 552b. Thus, the light never leaks from the rear surface of the main portion 552 without any other reflecting means like the white coating. Moreover, compared with the case that the rear surface of the main portion 552 is simply inclined at a total reflection angle, the main portion 552 can be thinner, so that the display device itself is thinner as well.

While the LED unit 520 is disposed on the supporting portion 553 located at the outer circumference of the photoconductor piece 551 in the illustrative embodiment, it is possible to provide a hole at the center of the photoconductor piece 551 for arranging the LED units 520 along the perimeter of the hole. Namely, they may be located at the inner circumference of the photoconductor piece 551 as in the second embodiment. In this case, though not shown, the thickness of the photoconductor piece 551 is contrary to the one illustrated in FIG. 59.

With this structure, the light from the LED units are reflected by the parabolic mirror at the inner circumference of the photoconductor piece. Then, the light enters the main portion therefrom as parallel rays, and is totally reflected by the total reflection surfaces which is located at the inner circumferential side of the grooves. The light finally exits from the emitting surface. Thus, the same functions and advantageous effects can be attained.

While the pointer disc 160 is connected to the drive unit 171 so as to be rotatable in relation to the photoconductor piece 551 in the illustrative embodiment, the photoconductor piece 551 may be connected to the drive unit 171 so as to be rotatable in relation the pointer disc 160, as described in the second embodiment. Moreover, the twentieth embodiment can be embodied into other meters, such as a tachometer, instead of the speedometer. Furthermore, the electrical structure and its control program are not limited to the above embodiment.

In the eighteenth to twentieth embodiments, the grooves 514, 544, 554 having the total reflection surfaces 514a are formed as the reflection surface 512a, 542a, 552a, on the rear surface of the photoconductor piece 511, 541 or the photoconductor disc 551. However, such grooves having total reflection surfaces of the same inclination as those of the above embodiments may be provided on a rear surface of a film or sheet of the same material (same refractive index) as the photoconductor piece 511, 541 or the photoconductor disc 551. The film or sheet is joined to the rear surface of the main portion 512, 542, 552 so as to define a reflection surface. Moreover, the light deflection means may be modified as long as it can radiate parallel rays into the main portion 512, 542, 552. For example, it may be composed of a collimator lens through which the light from the LED is changed into parallel rays and radiated into the main portion 512, 542, 552.

Next, a variety of embodiments are described in which the present invention of an LED display device may be embodied in a liquid crystal display (LCD) unit. Each embodiment of the LCD unit has a monochrome LCD element and a backlight means as a fundamental structure. The LCD element has conventional liquid crystal (LC) shutters. The backlight means is composed of different colors of LEDs arranged at a rear side of the LCD element.

Figure 60:
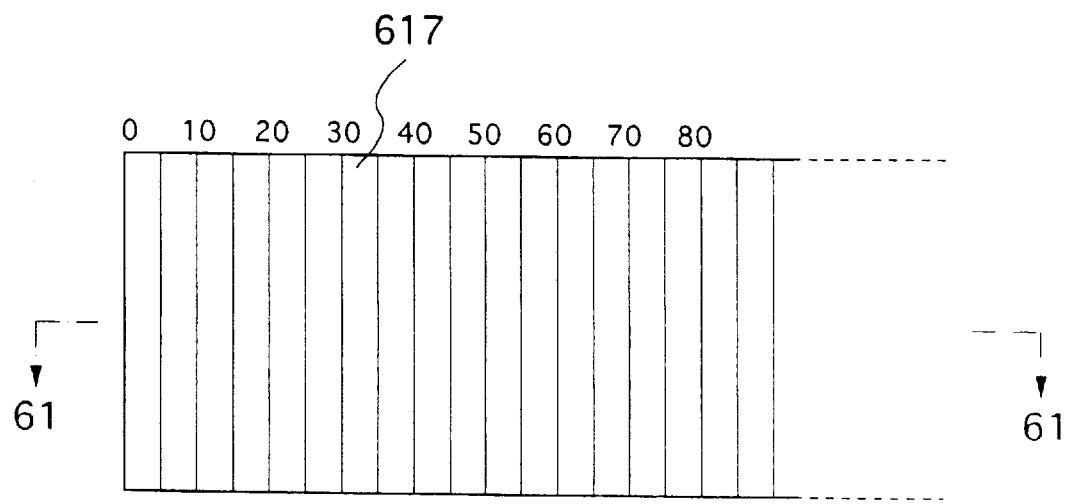
FIG. 60 is a plan view showing a speed meter as an LED display device in a twenty-first embodiment of the invention.
Figure 61:
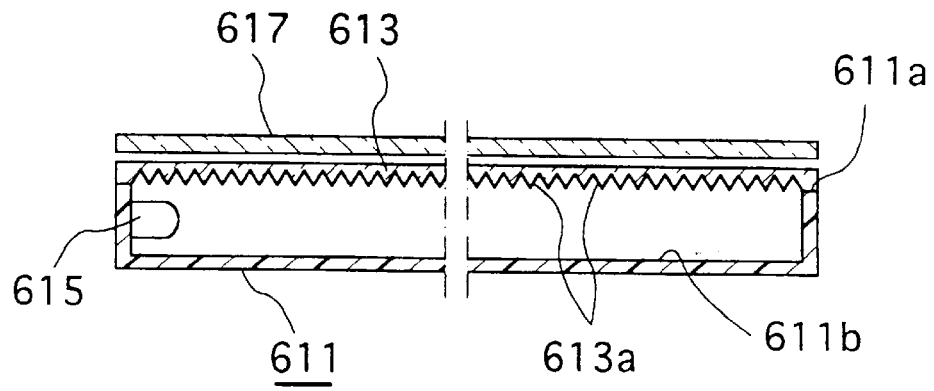
FIG. 61 is a sectional view taken along the line 60—60 in FIG. 60.

FIGS. 60 and 61 show a speedometer as a twenty-first embodiment of an LCD unit of the invention.

Referring to FIGS. 60 and 61, this embodiment of an LCD unit is embodied into the speedometer of a bar graph shape. It is composed of a housing 611, a light refraction plate 613 and an LED 615. The housing 611 has a rectangular box shape which has an opening 611a at its upper end. The refraction plate 613 is attached to the upper end of the housing 611 by an adhesive or the like so as to close the opening 611a. The LED 615 is mounted on an inner side surface at one longitudinal end (left end in FIGS. 60 and 61) of the housing 611, thereby emitting light in the longitudinal direction of the inside space thereof. The housing 611 is integrally made of a metal material like aluminum or a resin material like ABS. It has the whole inside surface coated with a metal plating by vacuum evaporation or the like so as to define a reflection surface 611b. A monochrome LCD element 617 is disposed over the refraction plate 613. The LCD element 617 is provided with LC shutters in a bar graph arrangement. A backlight means is composed of the LED 615 and is disposed at the rear side of the LCD element 617. The LED in the illustrative embodiment is a bullet-shaped LED which has three primary colors (red, green and blue) of LED chips packed in a molding resin so as to be able to emit any colors of light by itself. However, any LED may be used for the backlight means, as long as it can emit different colors of light. For example, three LEDs of three primary colors may be arranged side by side in the housing 611. Preferably, a plurality of LEDs 615 are arranged in the width direction (vertical direction of FIG. 60) of the housing 611 so as to assure a sufficient quantity of light.

The refraction plate 613 is integrally formed of a light transmitting resin of a refractive index of about 1.41–1.6, such as PC, PMMA and fluorine contained resin. It is made into a flat plate of the same shape as the housing in plan view. The rear surface of the refraction plate 613 has many teeth 613a of substantially triangular cross section arranged successively in the longitudinal direction thereof, thereby exhibiting a saw-shaped cross section as a whole. Each tooth 613a extends in the width direction of the refraction plate 613. For example, the refraction plate 613 has a structure such that the thickness is about 1 mm. A tooth angle between the teeth 613a is about 60–80 degrees, and the tooth pitch is about 0.26 mm. Thus, it can refract and direct most of the light parallel to the refraction plate 613 from the LED 615 into the thickness direction of the refraction plate 613, namely, in the upward direction of FIG. 61 to radiate it outside.

An operation of the twenty-first embodiment of the LCD unit is described hereafter.

In this embodiment of the LCD unit, the LC shutters of the LCD element 617 are controlled to be on or off by a control means (not shown) so that their open or closed area is changed according to a velocity. The LED 615 is also controlled to emit all colors of light so as to backlight the LCD element 617. Thus, a selected color of light is emitted from the portion where the LC shutters are opened, thereby indicating the velocity by the bar graph.

Accordingly, a desired bar graph indication is possible by opening or closing the LC shutters and lighting the LED 615. In this embodiment, the monochrome LCD element used as LCD element is inexpensive, so that the production costs for the LCD unit can be reduced. Moreover, the emitting light colors of the LED 615 are composed of three primary colors, so that the backlight can be any desired color and the ornamentation of the bar graph indication can be diversified. Furthermore, the LED 615 is used as the backlight means, so that the quantity of light is large and the indication by LCD can be performed in a sufficient brightness. In addition, the number of LEDs 615 to be used in the unit is greatly decreased as compared with the conventional LED display device of matrix indication, so that the present embodiment of an LCD unit is advantageous in terms of cost.

The twenty-first embodiment of an LCD unit may be embodied in other bar graph indicators, such as a tachometer or the like, instead of the speedometer.

Figure 62A:
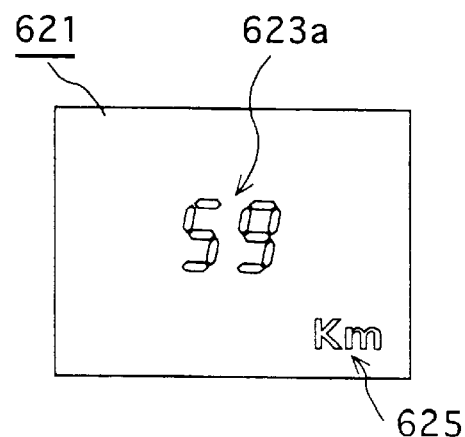
FIG. 62a is a plan view showing a speed indication of a speed meter in a normal mode as an LED display device in a twenty-second embodiment of the invention.
Figure 62B:
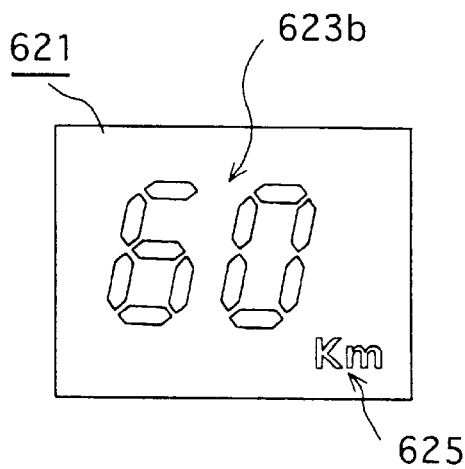
FIG. 62b is a plan view showing the speed indication of the speed meter in a warning mode in the twenty-second embodiment of the invention.

FIGS. 62a and 62b show a speedometer as a twenty-second embodiment of an LCD unit of the invention.

Referring to FIGS. 62a and 62b, the twenty-second embodiment of an LCD unit is embodied into a digital speedometer, while the twenty-first embodiment of an LCD unit is embodied into the bar graph speedometer. They are different from each other in the structures of monochrome LCD elements 617 and 621. Namely, the monochrome LCD element 621 of this embodiment has a number display portion 623a, 623b of a plurality of figures. The number display portion 623a, 623b is composed of LC shutters which are arranged in segments and capable of changing each figure in a plurality of sizes. Specifically, the LCD element 621 has a first number display portion 623a and a second number display portion 623b. The first portion 623a is composed of seven segments of LC shutters of a fixed size. The second portion 623b is also composed of seven segments of LC shutters, however, the size of each segment is larger than that of the first portion 623a. A unit display portion 625 is arranged at a right lower position of the number display portion 623a, 623b so as to indicate a unit of speed "km/h". The unit display portion 625 may be composed of LC shutters. However, it is not necessarily made of the LC shutters, but may have such a structure as to always transmit the light from the LED 615. Though not shown, the LCD element 621 is disposed on the housing 611 and the refraction plate 613, as in the twenty-first embodiment. Thus, the LCD element 621 is backlit by the LED 615 in the housing 611 through the refraction plate 613.

An operation of the twenty-second embodiment of an LCD unit is described hereunder.

In the present embodiment of the LCD unit, a control means (not shown) made of, e.g., a CPU, a ROM, a RAM and so on, stores beforehand a set speed at which the first and second number display portions 623a and 623b are switched into a first or second display mode. When the car speed exceeds the set speed, e.g. 60 km/h, the size of the figures for indicating the speed is changed into a preset one, that is, between the size of the first display portion 623a or the size of the second display portion 623b. In the illustrative embodiment, when the car speed is not more than the set speed, the LCD unit is operated into the first mode, in which the first number display portion 623a is controlled to indicate the car speed by selectively opening the segments of LC shutters according to the car speed, as shown in FIG. 62a. FIG. 62a shows that the present car speed is "59 km/h". When the car speed is more than the set speed, the LCD unit is operated in the second mode, in which the second number display portion 623b is controlled to indicate the car speed by selectively opening the segments of LC shutters according to the car speed, as shown in FIG. 62b. FIG. 62b shows that the present car speed is "60 km/h". At the same time, the LED 615 is controlled by the control means to selectively emit any desired colors of light to backlight the LCD element 621. Thus, a fixed color of light is radiated from the segments of LC shutters opened, so that the car speed is digitally indicated.

In the twenty-second embodiment, a desired digital indication is possible by opening or closing the LC shutters of the number display portions 623a, 623b and lighting the LED 615. Here, the monochrome LCD element used as the LCD element is inexpensive, so that the production costs for the LCD unit can be reduced. Moreover, the emitting light colors of the LED 615 are composed of three primary colors, so that the backlight can be any desired color and the ornamentation of the digital indication can be diversified. Furthermore, the LED 615 is used as the backlight means, so that the quantity of light is large and the indication by LCD can be performed in a sufficient brightness. In addition, the number of LEDs 615 to be used in the unit is greatly decreased as compared with the conventional LED display device of matrix indication, so that the present embodiment of the LCD unit is advantageous in terms of cost. Moreover, the set speed can be selected in any suitable value by the control means, and the size of the figures displayed by the LCD can be varied between the predetermined sizes of the first and second display portions 623a and 623b, when the car speed reaches the set value. As a result, a user like a driver can be effectively and clearly informed of a prescribed warning such as an overspeed. While the number display portion 623a, 623b of the LCD element 621 change between two different sizes, it may be structured so as to change between three or more sizes. Moreover, while the display portions 623a, 623b indicate the figures with segments, it may be constructed to display the figures by a dot matrix. With this structure, the figures displayed on the LCD element 621 can be changed to a desired one of plural sizes.

FIGS. 63a and 63b show a speedometer as a twenty-third embodiment of an LCD unit of the invention.

Referring to FIGS. 63a and 63b, the twenty-third embodiment of the LCD unit is embodied into a digital speedometer as in the twenty-second embodiment. They are different from each other in the structure of the monochrome LCD elements 621 and 631. Namely, the monochrome LCD element 631 of this embodiment has a number display portion 633 of a plurality of figures, each of which is composed of LC shutters arranged into seven segments of a fixed size. A unit display portion 635 is arranged at a right lower position of the number display portion 633 for indicating a unit of speed "km/h". The unit display portion 635 is composed of LC shutters or the like as is the unit display portion 625 of the twenty-second embodiment. Though not shown, the LCD element 631 is disposed on the housing 611 and the refraction plate 613 as in the twenty-first embodiment. Thus, the LCD element 631 is backlit by the LED 615 in the housing 611 through the refraction plate 613.

An operation of the twenty-third embodiment of the LCD unit is described hereunder.

In the present embodiment of the LCD unit, a control means (not shown) made of, e.g., a CPU, a ROM, a RAM and so on, stores beforehand a set speed at which a backlight color for the number display portion 633 is switched between a normal mode as a first mode and a warning mode as a second mode. When the car speed exceeds the set speed, e.g. 100 km/h, the illuminated color of the figures for indicating the speed is changed from one preset color to another preset color. In the illustrative embodiment, when the car speed is not more than the set speed, the LCD unit is operated in the first mode. In this mode, the display portion 633 is controlled to indicate the car speed by selectively opening the segments of LC shutters according to the car speed as shown in FIG. 63a. FIG. 63a shows that the present car speed is "99 km/h". Moreover, the LED 615 is controlled to emit a first color, e.g. green, therefrom as a backlight color. On the other hand, when the car speed is more than the set speed, the LCD unit is operated in the second mode. In this mode, the display portion 633 is also controlled to indicate the car speed by selectively opening the segments of LC shutters according to the car speed as shown in FIG. 63b. FIG. 63b shows that the present car speed is "100 km/h". Moreover, the LED 615 is controlled to emit a second color different from the first color, e.g. red, as a backlight color. Thus, the LCD element 631 is backlit by the first color in the first mode or by the second color in the second mode. Then, different colors of light are radiated from the segments of LC shutters opened, so that the car speed is digitally indicated.

In the twenty-third embodiment, a desired digital indication is possible by opening or closing the LC shutters of the number display portion 633 and lighting the LED 615. Here, the monochrome LCD element is used as an LCD element, and the LED 615 is used as the backlight means, so that the same advantageous effects can be obtained as the twenty-second embodiment. In addition, the set speed can be selected in any suitable value by the control means, and the backlight color for the figures displayed by the LCD can be varied between the predetermined colors of the first and second modes, when the car speed reaches the set speed. As a result, a user like a driver can be effectively and clearly informed of a prescribed warning such as an overspeed. While the number display portion 633 of the LCD element 631 changes the backlight colors for the figures between two colors, it may be structured so as to change the colors between three or more. With this structure, the figures displayed on the LCD element 631 can be changed to a desired one of plural colors.

Here, the LCD unit of the twenty-second and twenty-third embodiments can be embodied into any device which needs to draw attention of the user by a warning or the like, depending on a fixed variable. For example, it may be embodied into a tachometer, thereby changing the display from the first mode to the second mode when an engine speed exceeds the limit. Moreover, in the twenty-third embodiment, the illuminating color in the first and second modes may be selected from colors other than the above.

FIG. 64 shows a twenty-fourth embodiment of an LCD unit of the invention.

Referring to FIG. 64, the LCD unit is embodied into a speedometer which has a housing 641 of a quadrilateral box shape with an opening 641*a* at its upper end. The opening 641*a* of the housing 641 is covered with the refraction plate 613 as in the twenty-first embodiment. The housing 641 has an inside surface of one longitudinal end (left end in FIG. 64) mounted with the first LED 615 which emits light in the longitudinal direction of the housing 641. The housing 641 has a similar structure to the housing 611 of the twenty-first embodiment and its inside surface is made a reflection surface 641*b*. The present embodiment of a monochrome LCD element 645 is disposed on an upper side of the refraction plate 613. The second LED 615 is mounted on the housing 641 opposite to the rear surface of the LCD element 645. The first LED 615 is used to illuminate the whole LCD element 645 as a first backlight means.

The LCD element 645 has a number display portion 647 and a warning display portion 649. The number display portion 647 serves an information display portion and is able to display prescribed information through LC shutters. The warning display portion 649 can display prescribed warning information through LC shutters. While the number display portion 647 has the same structure as the number display portion 633 of the twenty-third embodiment, it may be modified into another information display means, e.g. a bar graph display as in the twenty-first embodiment. On the other hand, the warning display portion 649 of the illustrated embodiment shows a word "WARNING", which means information indicating vehicle trouble, by controlling the on-and-off of the LC shutters. The second LED 615 constitutes a second backlight means, which is located at a position facing the warning display portion 649 at the rear side of the LCD element 645, so that it can emit light intensively to the warning display portion 649. The second LED 615 may be one which is capable of emitting all colors of light as the first LED 615, or a single color LED may be used instead.

An operation of the twenty-fourth embodiment of LCD unit is described hereunder.

In the present embodiment of the LCD unit, a control means (not shown) made of, e.g., a CPU, a ROM, a RAM and so on, controls the LC shutters of the information display portion 647 according to the car speed, then showing the car speed thereon as in the number display portion 633 of the twenty-third embodiment. Moreover, the control means controls the first LED 615 to emit a desired color among plural colors so that it backlights the LCD element 645 as a whole. At the same time, the first LED 615 radiates that color of light through the opened LC shutters, thereby displaying the car speed on the, information display portion 647. On the other hand, at the time of a prescribed caution, the control means controls the LC shutters of the warning display portion 649 to display the information or a word conveying such information on the LCD element 645. At the same time, the second LED 615 backlights and intensively illuminates the warning display portion 649.

In the twenty-fourth embodiment, desired information can be displayed by opening or closing the LC shutters of the information display portion 647 and lighting the first LED 615 of the first backlight means. Here, the monochrome LCD element is used as an LCD element, and the LED 615 is used as the backlight means, so that the same advantageous effects can be obtained as the twenty-second or twenty-third embodiment. In addition, at the time of a prescribed warning, the warning display portion 649 is displayed and the second LED 615 of the second backlight means concentrates the light thereon. Thus, the brightness at the warning display portion 649 becomes higher than that of other parts, thereby improving the visibility thereof. Moreover, it can attract a lot of attention to the user and transmit the information without failure.

The twenty-fourth embodiment of the LCD unit may be embodied into other bar graph indicators than the speedometer, such as in a tachometer or the like.

Figure 65A:
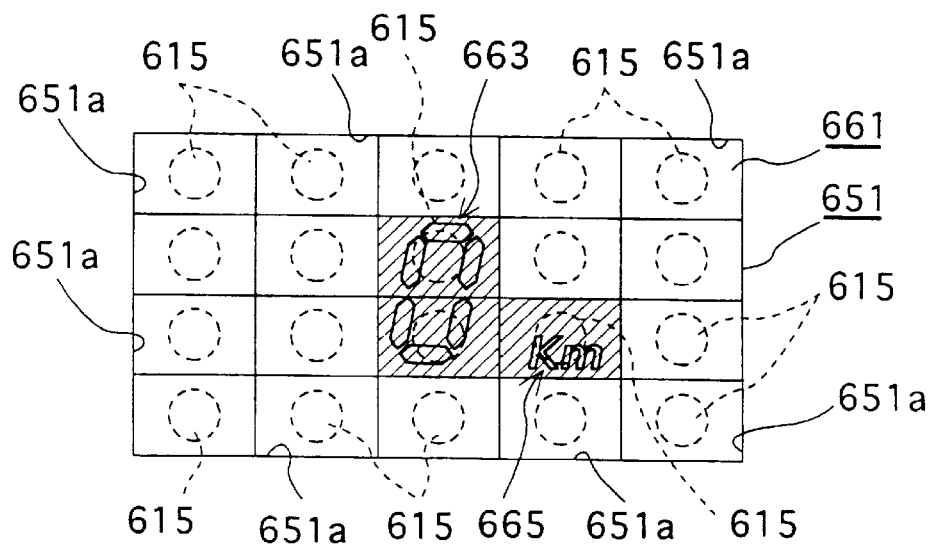
FIG. 65a is a plan view showing a first indication mode of a speed meter as an LED display device in a twenty-fifth embodiment of the invention.
Figure 65B:
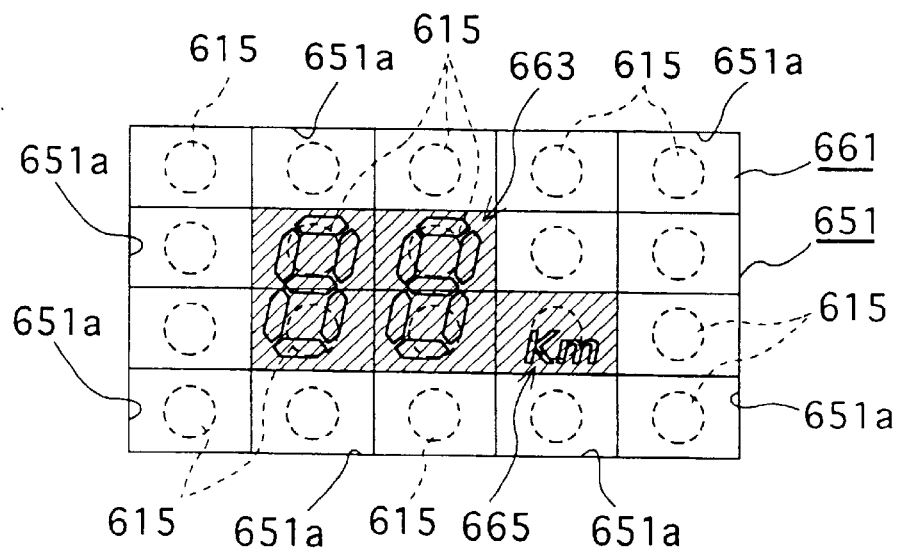
FIG. 65b is a plan view showing a second indication mode of the speed meter in the twenty-fifth embodiment of the invention.
Figure 66:
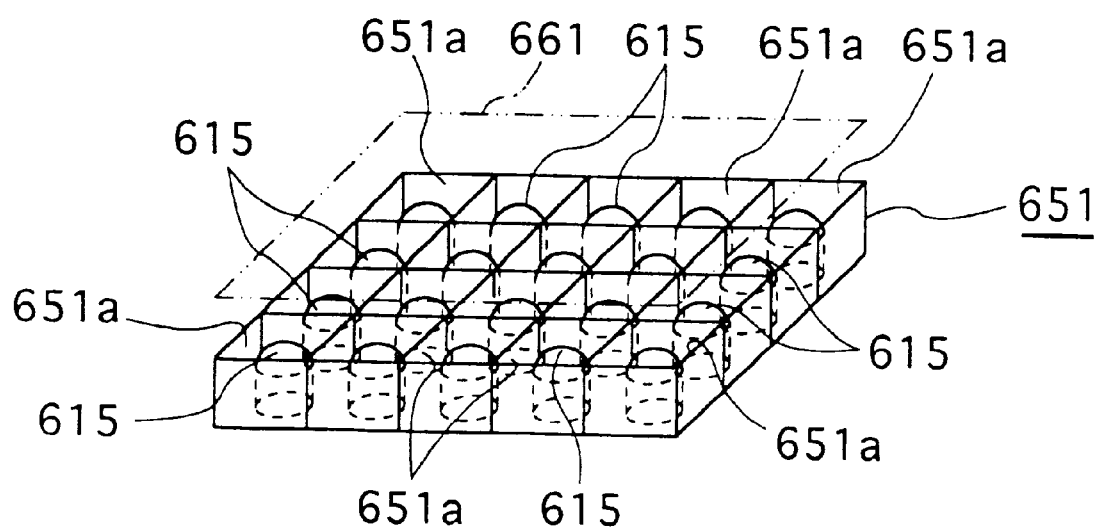
FIG. 66 is a perspective view showing the speed meter in the twenty-fifth embodiment of the invention.

FIGS. 65*a*, 65*b* and 66 show a twenty-fifth embodiment of an LCD unit of the invention.

Referring to FIGS. 65*a*, 65*b* and 66, the present embodiment of LCD unit is embodied in a speedometer which has a housing 651 of a quadrilateral box shape with its upper end open. The housing 651 has an inside space divided into a matrix of cells 651*a* of five columns and four rows. Each cell 651*a* has a cubic shape and accommodates therein the LED 615 as a backlight means so as to emit light upward (towards the opening). The housing 651 has the same structure as the housing 611 of the twenty-first embodiment, and has an inside surface of each cell 651*a* made as a reflection surface. A monochrome LCD element 661 of the twenty-fifth embodiment is attached to the upper end of the housing 651 so as to close the openings of the cells 651*a*, respectively. The LCD element 661 has an information display portion 663 which is capable of varying a display area through LC shutters. Specifically, the LCD element 661 provides a number display portion, which is capable of indicating a plurality of figures by LC shutters, for the information display portion 663. An area for the information of the information display portion 663 is an entire area of the LCD element 661 at the largest, while defining a part of the LCD element 661, facing each cell 651*a*, as one unit. The LED 615 is arranged at the rear side of the part, facing the cell 651*a*, of the LCD element 661, so that the LEDs 615 correspond to the display area thereof.

An operation of the twenty-fifth embodiment of LCD unit is described hereunder.

In the present embodiment of the LCD unit, a control means (not shown) made of, e.g., a CPU, a ROM, a RAM and so on, controls the LC shutters of the information display portion 663 according to the car speed, then showing the car speed thereon as in the number display portion 633 of the twenty-third embodiment. Moreover, the LEDs 615 are controlled by the control means so as to switch on only the LED 615 or LEDs 615 corresponding to the currently indicated information display portion 613, namely, the part of the LCD element 661 currently displaying the information, thereby backlighting only such information displaying an area with a desired color. Thus, a color of light is allowed through the opened LC shutters, thereby displaying the car speed with that color on the information display portion 663. For example, in a first display mode as shown in FIG. 65a, the information display portion 663 shows a car speed of 0 km/h. In this case, the displayed area is part of the LCD element 661 corresponding to three cells 651a or the figure "0" and the unit "km". Therefore, the LEDs 615 of those three cells 651a are lit. In a second display mode shown in FIG. 65b, the information display portion 663 shows a car speed of 88 km/h. In this case, the displayed area is part of the LCD element 661 corresponding to five cells 651a or the figure "8" of the second digit, the figure "8" of the first digit and the unit "km". Therefore, the LEDs 615 of those five cells 651a are lit.

In the twenty-fourth embodiment, desired information can be displayed by opening or closing the LC shutters of the information display portion 663 and lighting the LED 615 of the backlight means. Here, the monochrome LCD element is used as LCD element, and the LED 615 is used as the backlight means, so that the same advantageous effects can be obtained as were obtained in the twenty-second to twenty-fourth embodiments. In addition, only the displayed area of the information display portion 663 are backlighted by the LED 615, so that power consumption for the unit is reduced, and the lifetime of the LED 615 is prolonged. Moreover, the displayed area contrasts with the other area, thereby improving the visibility.

While the twenty-fifth embodiment of the LCD unit is embodied into the speedometer, it may be embodied into another prescribed bar graph indicator such as a tachometer. Moreover, it may be embodied into any type of LCD unit that displays information. Furthermore, the LED 615 may be disposed in an arrangement other than the above matrix, in accordance with a displaying mode of the information display portion.

FIGS. 67a, 67b, 67c and 68 show a twenty-sixth embodiment of an LCD unit of the invention.

Referring to FIGS. 67a, 67b, 67c and 68, the twenty-sixth embodiment of the LCD unit has a similar structure to the twenty-third embodiment, and is embodied in a digital speedometer. A monochrome LCD element 671 of this embodiment has the same structure as the LCD element 631 of the twenty-third embodiment. Namely, the LCD element 671 has a number display portion 673 of the same construction as the number display portion 633 and a unit display portion 675 of the same construction as the unit display portion 635, thereby performing the same information display function by the number display portion 675.

An operation of the twenty-sixth embodiment of LCD unit is described hereunder.

Figure 67A:
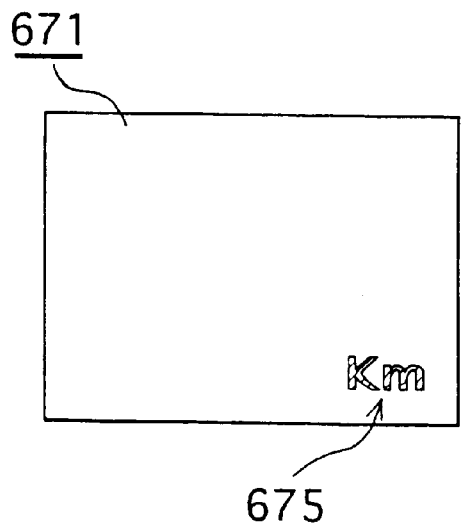
FIG. 67a is a plan view showing a first emission mode of a speed meter as an LED display device in a twenty-sixth embodiment of the invention.
Figure 67B:
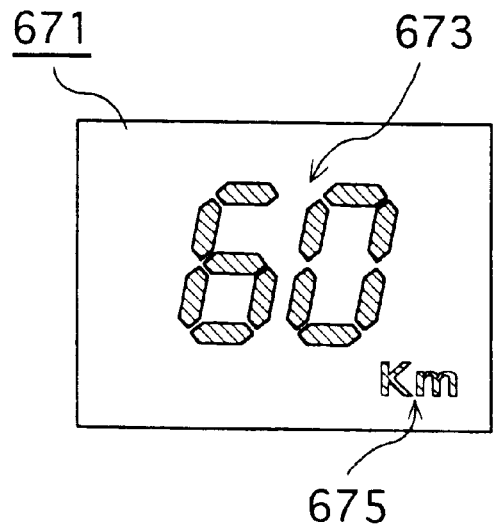
FIG. 67b is a plan view showing a second emission mode of the speed meter in the twenty-sixth embodiment of the invention.
Figure 67C:
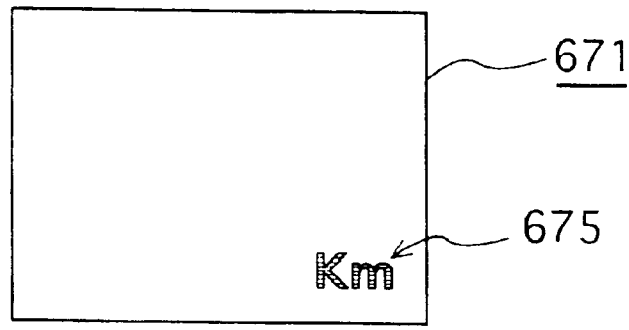
FIG. 67c is a plan view showing a third emission mode of the speed meter in the twenty-sixth embodiment of the invention.
Figure 68:
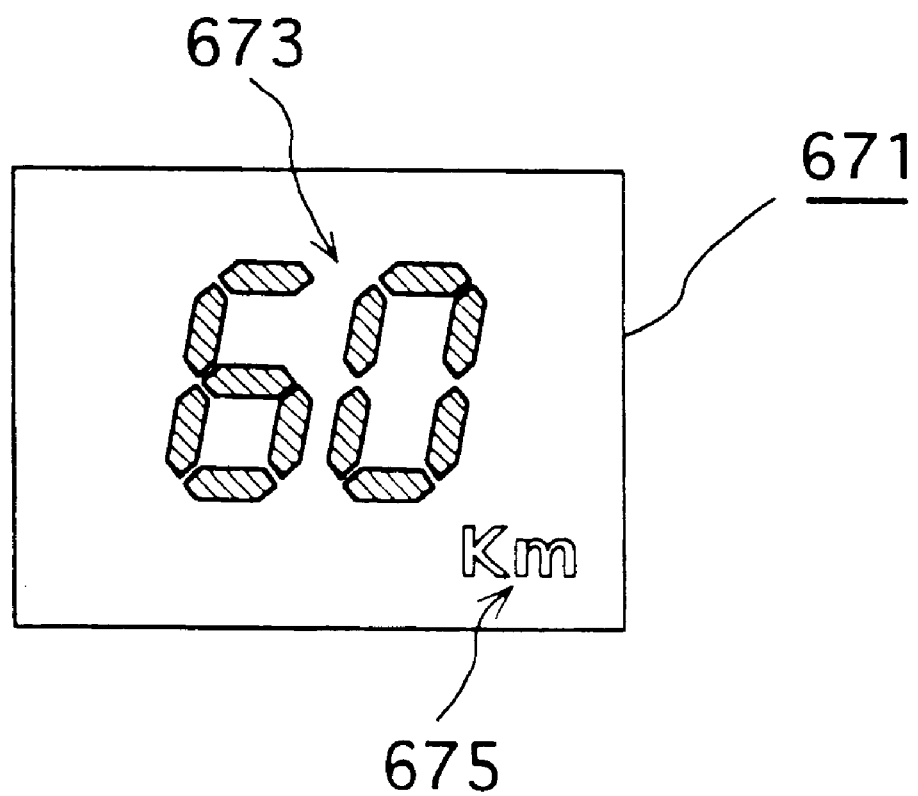
FIG. 68 is a plan view showing the indicating state of the speed meter in the twenty-sixth embodiment of the invention.

In the present embodiment of the LCD unit, a control means (not shown) made of, e.g., a CPU, a ROM, a RAM and so on, controls the LED 615 as the backlight means to switch its emitted light colors at high speed among the red, green and blue colors in turn. Accordingly, the backlight colors for the LCD element 671 are changed at a high speed, among red as a first lighting mode as shown in FIG. 67a, green as a second lighting mode as shown in FIG. 67b and blue as a third lighting mode as shown in FIG. 67c, in turn. Synchronous with this operation, the number display portion 673 has the LC shutters opened to be able to indicate a number when the backlight color is made green by the LED 615, as shown in FIG. 67b. Here, the unit "km" is always displayed on the element 671 at the unit display portion 675. Thus, as shown in FIG. 68, the display color of the unit display portion 675 becomes white as a mixture of three primary colors of red, green and blue by the afterimage effect, since it is always displayed and passes the backlight at all times. Moreover, the display color of the number display portion 673 becomes green as the color in the second lighting mode.

In the twenty-sixth embodiment, the display color can be changed in part by switching the light color of the LED 615 among the red, green and blue at a high speed while synchronizing the display operation of the number display portion 673. For example, the color of transmitting light through the LC shutters becomes different by changing the timing for opening the LC shutter of the number display portion 673 and the unit display portion 675. Then, the display color of these two portions 673 and 675 becomes different, accordingly. Here, the monochrome LCD element is used as LCD element, and the LED 615 is used as the backlight means, so that the same advantageous effects can be obtained as the twenty-second to twenty-fifth embodiments. In addition, the display color can be changed by use of the afterimage effect, so that the ornamentation of the LCD unit can be diversified.

While the illustrated twenty-sixth embodiment uses the LED 615 of three primary colors, it is enough that the LED is capable of emitting two two or more colors. In this case, the display color can be changed, too, by switching the backlight color at a high speed among them.

Moreover, in the twenty-sixth embodiment, desired plural colors of light can be obtained by controlling the different colors of LEDs to emit a single color from each single LED, and a variety of mixed colors of a desired combination of the different colors of LEDs. That is, the twenty-sixth embodiment may be modified into other structures than the illustrated embodiment, as long as the light colors from the LED are switched successively at high speeds and the LC shutters of the meter panel are controlled to open to display a number on the number display portion 673 when the emitted light is a predetermined color, while displaying the unit display portion 675 in a color other than that of the number display portion 673. With such structure, the display color can be partially changed as in the above by switching the backlight colors at a high speed among the above colors and by synchronizing the display operation of the number display portion 673 and the unit display portion 675 with the color switching.

The above embodiment is specifically applicable to the case in which the different colors of LEDs are controlled to emit their own single color and any mixed colors thereof, and in which the LC shutters of the number display portion 673 are opened at the time of one of the light colors while the LC shutters of the unit display portion 675 are opened at the time of the other light color.

Figure 69A:
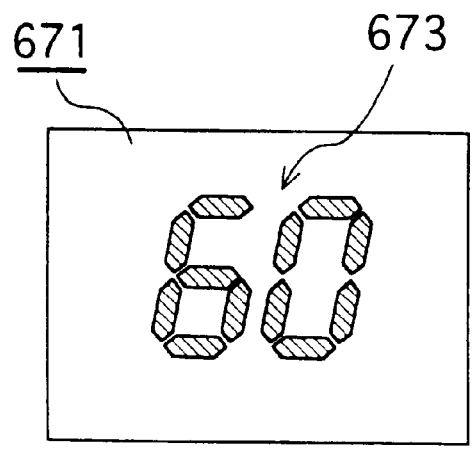
FIG. 69a is a plan view showing a first emission mode according to a modification of the speed meter as the LED display device in the twenty-sixth embodiment of the invention.
Figure 69B:
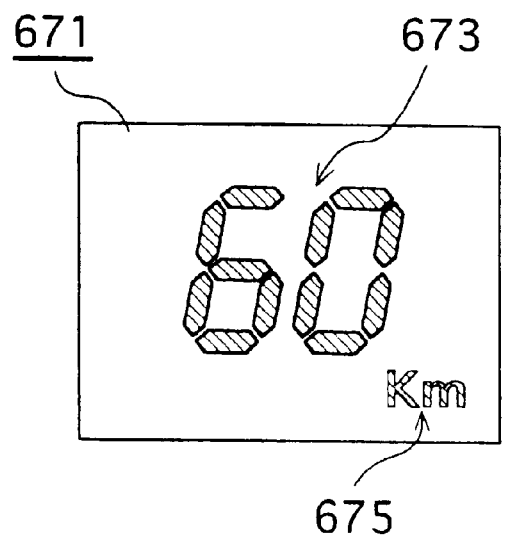
FIG. 69b is a plan view showing a second emission mode according to a modification of the speed meter in the twenty-sixth embodiment of the invention.
Figure 69C:
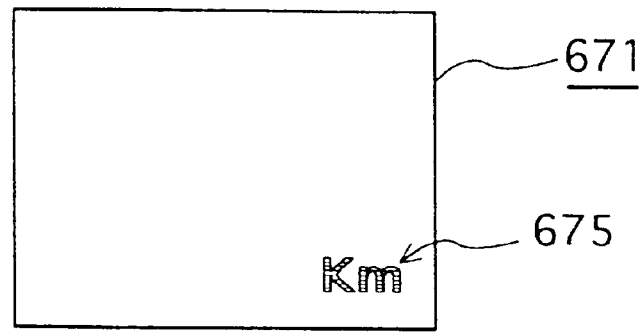
FIG. 69c is a plan view showing a third emission mode according to a modification of the speed meter in the twenty-sixth embodiment of the invention.

However, the twenty-sixth embodiment may be embodied as follows, referring to FIGS. 69a–69c.

Namely, the LC shutters are controlled to be opened or closed synchronously with the timing of light emission from the LED 615 which radiates light of red, green and/or blue, thereby obtaining a mixture of the emitted colors. For example, as shown in FIG. 69a, when the LED 615 is lit with the red color, the LC shutters of only the number display portion 673 are opened to enable the speed indication. Moreover, as shown in FIG. 69*b*, when the LED 615 is lit with the green color, the LC shutters of both the number display portion 673 and the unit display portion 675 are opened to enable their display. Furthermore, as shown in FIG. 69*c*, when the LED 615 is lit with the blue color, the LC shutters of only the unit display portion 675 are opened to enable the unit display. As mentioned above, the LEDs 615 are switched into the red, green and blue colors at high speed, while the LC shutters of the number display portion 673 and unit display portion 675 synchronously therewith. Thus, the display color of the number display portion 673 becomes yellow, which is a mixed color of red and green, by the afterimage effect. The display color of the unit display portion 675 becomes blue-green, which is a mixed color of green and blue, by the afterimage effect.

Similarly, the LEDs 615 may be switched at high speed into the red, green and blue colors in turn, while the LC shutters of the number display portion 673 are opened while being lit with at least one of these three colors. In this case, the number display portion 673 can be backlit by seven colors: red, green, blue, a mixed color of red and green, a mixed color of red and blue, a mixed color of green and blue, and a mixed color of red and green and blue. So can the unit display portion 675.

Therefore, the same advantageous effects can be attained only by controlling the opening timing of the LC shutters, so that the total structure can be simplified in comparison with the case that the LEDs 615 themselves are controlled to emit a desired color among plural colors.

Figure 70:
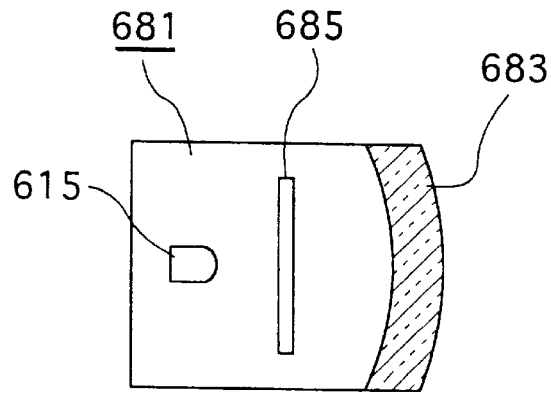
FIG. 70 is a sectional view showing a turn signal lamp as an LED display device in a twenty-seventh embodiment of the invention.

FIG. 70 shows a twenty-seventh embodiment of the LED unit of the invention.

Referring to FIG. 70, this embodiment of the LED unit is used for a turn signal indicator of a car. It has a housing 681, a lens 683 of a transparent or translucent resin material covering a front opening of the housing 681. The housing 681 has an LED 615 accommodated therein as a backlight means. A monochrome LCD element 685 is arranged having a planar LC shutter at a position in the way of the light emitted from the led 615 so that the LED is located at a rear side of the LCD element 685.

An operation of the twenty-seventh embodiment of the LCD unit is described hereafter.

In this embodiment of the LCD unit, a control means (not shown) composed of, e.g., a CPU, a ROM, a RAM and so on, controls the LC shutter of the LC element 685 to open and close synchronously with the on and off signals for a turn signal indicator. Thus, the light from the LED 615 is successively passed and blocked by the LC shutter of the LCD element 685, thereby turning on and off the turn signal indicator at the LC shutter.

The twenty-seventh embodiment can provide a flashing operation of the turn signal indicator lamp by use of the LCD, though it is performed conventionally by controlling a conventional white lamp bulb itself. Moreover, the monochrome LCD element is used as an LCD element, and the LED 615 is used as the backlight means, so that the same advantageous effects can be obtained as are obtained with the twenty-second to twenty-sixth embodiments.

Figure 71:
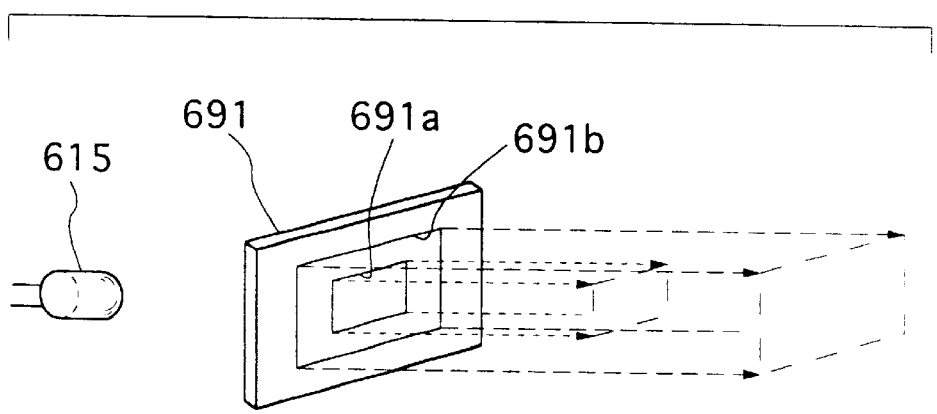
FIG. 71 is a sectional view showing a brake lamp as an LED display device in a twenty-eighth embodiment of the invention.

FIG. 71 shows a twenty-eighth embodiment of an LCD unit of the invention.

Referring to FIG. 71, the twenty-eighth embodiment of LCD unit is used for a stop lamp of a car. It has a monochrome LCD element 691 having a planar LC shutter which is capable of changing its open area 691*a*, 691*b* into a plurality of sizes. Moreover, a backlight means composed of the LED 615, which can emit different colors of light, is disposed at a rear side of the LCD element 691.

An operation of the twenty-eighth embodiment of LCD unit is described below.

In this embodiment of the LCD unit, a control means (not shown) composed of, e.g., a CPU, a ROM, a RAM and so on, controls the LC shutter of the LC element 695 to change the open area 691*a*, 691*b* depending on information showing a braking amount such as a stepping amount of a brake pedal or a deceleration. For example, if the braking amount is little, the LC shutter is opened to a small open area 691*a*. If the braking amount is large, the LC shutter is opened to a large open area 691*b*. Thus, the transmitting area for the light from the LED 615 is determined by the open area 691*a*, 691*b* of the LC shutter, and the lit area of the stop lamp is changed accordingly.

The twenty-eighth embodiment can provide an operation of the stop lamp by use of the LCD, though it is performed conventionally by a white lamp bulb. Moreover, the monochrome LCD element is used as the LCD element, and the LED 615 is used as the backlight means, so that the same advantageous effects can be obtained as for the twenty-second to twenty-seventh embodiments. Furthermore, the lighting amount of the stop lamp can be changed corresponding to the braking amount, so that more information is sent to the cars behind.

Figure 72:
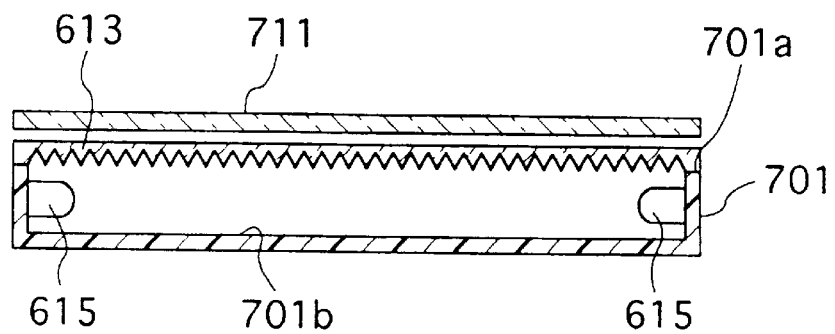
FIG. 72 is a sectional view showing a clock as an LED display device in a twenty-ninth embodiment of the invention.

FIG. 72 shows a twenty-ninth embodiment of an LCD unit of the invention.

Referring to FIG. 72, this embodiment of LCD unit is used for an LCD clock. It has a housing 701 of a square box shape provided with an opening 701*a* at an upper end thereof. The light refraction plate 613 of the twenty-first embodiment is attached to the opening 701*a* of the housing 701. The LEDs 615 are disposed at opposite longitudinal inside surfaces (right and left end of FIG. 72) of the housing 701, respectively, so as to emit light in the longitudinal direction thereof. The housing 701 has a similar structure to the housing 611 of the twenty-first embodiment, and has the inside surface made a reflection surface 701*b*. Moreover, a monochrome LCD element 711 is disposed over the refraction plate 613 so that the LEDs 615 are located at a rear side of the LCD element 711. The LCD element 711 is capable of displaying time through LC shutters.

An operation of the twenty-ninth embodiment of the LCD unit is described hereafter.

In this embodiment of the LCD unit, a control means (not shown) composed of, e.g., a CPU, a ROM, a RAM and so on, controls the LC shutter of the LC element 711 to show time. At the same time, the backlight color is changed by controlling the LEDs 615 to emit different colors of light.

The twenty-ninth embodiment of LCD unit can be structured such that it changes the display color in accordance with an atmosphere of the interior of a room or the like. Moreover, it may be structured such that it changes the display color or provides a flashing operation according to a set alarm. Furthermore, a given contrast of light can be controlled by adjusting the quantity of light from the right and left LEDs 615, so that the ornamentation can be diversified.

While the twenty-ninth embodiment provides the LEDs 615 at the right and left of the housing 701, they may be disposed at any other positions around the inside perimeter of the housing 701. For example, they may be arranged at the front and rear end (opposite lateral inside surfaces) of the housing 701 in addition to the right and left ends. In these cases, unique effects can be obtained depending on the arrangement.

The preferred embodiments described herein are therefor illustrative and not restrictive. The scope of the invention is intended to extend to variations including equivalent structures, means, and uses, such as come within the meaning of the appended claims.

What is claimed is:

1. An LED display device comprising:

a meter having a plurality of photoconductor elements each having a longitudinal direction, a first longitudinal end and first and second opposing sides facing a substantially perpendicular direction to said longitudinal direction, each photoconductor element being of an elongated shape, and being disposed side by side in a fixed direction;

an emitting element having a plurality of LEDs respectively arranged at said first longitudinal end of each photoconductor element, so as so emit light in said longitudinal direction; and a reflection element provided on said first opposing side of each photoconductor element for reflecting the light emitted in said longitudinal direction in a direction substantially perpendicular to said longitudinal direction;

an emission control element for driving each said LED at a time of a fixed warning so as to communicate an emission control warning, said emission control element including a sensing circuit for detecting a quantity of light entering the meter and an luminance control circuit for changing a quantity of light of each said LED to change a luminance of the meter according to the quantity of light detected by said sensing circuit, wherein two or more colors of LEDs are provided for the meter, and wherein said emission control element selectively combines the LEDs to be lit so as to illuminate the meter with a desired color, and wherein said sensing circuit comprises a photo detecting sensor comprising an LED not being operated to emit light into the meter.

2. An LED display device according to claim 1, wherein said LEDs includes at least a red LED and a blue LED, and wherein said omission control element further includes an omission control circuit for setting an illumination color of said meter to a bluish color when a quantity of light is not more than a predetermined value and for setting said illumination color of said meter to a reddish color when said quantity of light is more than said predetermined value.

3. An LED display device according to claim 1, each of said photoconductor elements having an elongated main portion having a substantially quadrilateral cross section, said main portion having an emitting surface at said second opposing side;

said reflection element having a substantially saw-shaped cross-section formed by a plurality of teeth successively arranged in said longitudinal direction, each of said teeth having a reflection surface generally facing said first longitudinal end, said reflection surface being slanted at such an inclination as to reflect the light advancing substantially in said longitudinal direction in a direction toward said emitting surface, thereby emitting most of the light; and said LED device further comprising a light reflection element arranged at said first longitudinal end of said main portion to reflect the light emitted from each said LED into substantially parallel rays and to radiate said parallel rays in said main portion from said longitudinal end in said longitudinal direction.

4. An LED display device according to claim 3, wherein said main portion of said photoconductor piece has a substantially sector shape of a predetermined angle, in a plan view, with the one longitudinal end wider than the other end, a number of said photoconductor pieces being closely arranged with the one longitudinal end of said main portion placed at an outer circumference and the other end at an inner circumference so as to define said indicator in a substantially sector shape of a predetermined angle, in a plan view.

5. An LED display device according to claim 4, wherein said indicator is a meter for a vehicle; and said device further comprising control means for lighting said LED corresponding to said photoconductor piece at a predetermined angular position in accordance with a vehicle speed.

6. An LED display device according to claim 4, wherein two or more colors of LEDs are provided for each photoconductor piece.

7. An LED display device comprising:

an indicator having a plurality of photoconductor pieces each having a longitudinal direction, first and second longitudinal ends and first and second opposing sides facing a substantially perpendicular direction to said longitudinal direction, each photoconductor piece being of an elongated shape, and being disposed side by side in a fixed direction;

an emitting element having a plurality of LEDs respectively arranged at said first longitudinal end of each said photoconductor piece, so as to emit light into each said photoconductor piece in said longitudinal direction;

a reflection element provided on said first opposing side of each photoconductor piece for reflecting the light emitted in said longitudinal direction in a direction substantially perpendicular to said longitudinal direction; and a printed board on which each said LED is arranged in a predetermined line shape according to a variable so as to define an LED array, wherein said indicator includes a lens array formed in a line shape corresponding to said LED array, said lens array having diffuse radiation lens elements arranged corresponding to each said LED of said LED array, respectively, wherein each of the diffuse radiation lens elements is shaped into a substantially square column and comprises an incident side having a fitting recess for fitting each said LED therein at a first side facing each said LED, a first reflection surface at a second side facing said incident side, a second reflection surface at said first side facing said first reflection surface and an emitting side at said second side facing said second reflection surface, each said LED emitting light into said incident side so that said first and second reflection surfaces reflect the light to said emitting side and said emitting side diffuses and radiates the light.

8. An LED display device according to claim 1, wherein each of said photoconductor elements further comprises:

an incident portion having a periphery defining an opening communicating with said first longitudinal end and a reflection surface at on an inner surface opposite said first longitudinal end, said incident portion permitting the light emitted from each said LED to enter at said longitudinal end in substantially said longitudinal direction; and wherein said reflection element comprises a generally flat refraction plate having a saw-shape cross section defined by teeth successively formed at a rear surface of said refraction plate in said longitudinal direction, each of said teeth refracting the light advancing substantially in said longitudinal direction in a direction substantially perpendicular thereto so as to emit the light through said refraction plate.

9. An LED display device according to claim 8, wherein said indicator has a housing integrally formed of incident portions as said photoconductor successively arranged in a width direction; and wherein said refraction plate of a flat plate shape covers the whole openings of all said incident portions and has teeth successively formed at a rear surface in the longitudinal direction of each of said incident portions.

10. An LED display device according to claim 9, wherein each of the incident portions is made into a substantially trapezoidal shape, in a plan view, with one longitudinal end wider than the other longitudinal end, and a number of said incident portions are closely arranged with the one longitudinal end placed at an outer circumference and the other end at an inner circumference so as to make said housing in a substantially sector shape, in a plan view.

11. An LED display device according to claim 9, wherein each of said incident portions comprises a substantially rectangulars shape, in a plan view, and a number of said incident portions are closely arranged in a width direction so as to form said housing in a substantially bar graph shape, in a plan view.

12. An LED display device according to claim 8, wherein said refraction plate is made of a transparent resin material of a refraction index of about 1.4 to 1.6, and wherein the tooth angle between said teeth of said refraction plate is set at an angle in a range between about 60 to 80 degrees.

13. An LED display device according to claim 8, further comprising a parabolic mirror arranged opposite to said LED so as to deflect the light from said LED to produce parallel rays radiated in the longitudinal direction of said incident portion.

14. An LED display device according to claim 8, wherein two or more colors of LEDs are provided for said incident portion.

* * * * *